US012535797B2

(12) United States Patent
Davis et al.

(10) Patent No.: US 12,535,797 B2
(45) Date of Patent: Jan. 27, 2026

(54) BUILDING MANAGEMENT SYSTEM WITH SUSTAINABILITY IMPROVEMENT

(71) Applicant: Tyco Fire & Security GmbH, Neuhausen am Rheinfall (CH)

(72) Inventors: Robbie G. Davis, Kew Gardens, NY (US); Katianne Pechauer, Milwaukee, WI (US); Surabhi Shroff, King of Prussia, PA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 369 days.

(21) Appl. No.: 18/141,088

(22) Filed: Apr. 28, 2023

(65) Prior Publication Data

US 2023/0350387 A1 Nov. 2, 2023

Related U.S. Application Data

(60) Provisional application No. 63/435,191, filed on Dec. 23, 2022, provisional application No. 63/336,935, filed on Apr. 29, 2022.

(51) Int. Cl.
G05B 19/41 (2006.01)
G05B 15/02 (2006.01)
(Continued)

(52) U.S. Cl.
CPC .......... G05B 19/4155 (2013.01); *G05B 15/02* (2013.01); *G05B 2219/25011* (2013.01);
(Continued)

(58) Field of Classification Search
None
See application file for complete search history.

(56) References Cited

U.S. PATENT DOCUMENTS 9,310,403 B2 * 4/2016 Brackney ............... G06F 30/20
10,241,505 B2 * 3/2019 Cohen .................... G06Q 50/06
(Continued)

FOREIGN PATENT DOCUMENTS

CA     2761416 A1 * 11/2010 ............. G06Q 50/10
CN  105953367 A  *  9/2016 .......... F24F 2110/20
(Continued)

OTHER PUBLICATIONS

Manic et al., "Building Energy Management Systems, The Age of Intelligent and Adaptive Buildings", Mar. 2016, Digital Object Identifier 10.1109/MIE.2015.2513749. (Year: 2016).*
(Continued)

*Primary Examiner* — Mohammad Ali
*Assistant Examiner* — Kelvin Booker
(74) *Attorney, Agent, or Firm* — Foley & Lardner LLP

(57) ABSTRACT

A building management system (BMS) can include one or more memory devices. The one or more memory devices can store instructions. The instructions, when executed by the one or more processors, can cause the one or more processors to obtain a sustainability goal established for a building, the sustainability goal pertaining to a sustainability performance of the building, determine, using a baseline value for the sustainability performance of the building and the sustainability goal, a target sustainability level for the building, and generate, using the baseline value for the sustainability performance and the target sustainability level, a plurality of energy conservation protocols, a first energy conservation protocol of the plurality of energy conservation protocols including a plurality of actions that meet at least a portion of the sustainability goal or at least a portion of the target sustainability level for the building.

20 Claims, 57 Drawing Sheets

(51) Int. Cl.
    *G05B 19/4155* (2006.01)
    *G06F 18/24* (2023.01)
    *G06F 30/13* (2020.01)
    *G06Q 40/04* (2012.01)
    *G06Q 50/06* (2024.01)

(52) U.S. Cl.
    CPC .............. *G06F 18/24* (2023.01); *G06F 30/13* (2020.01); *G06Q 40/04* (2013.01); *G06Q 50/06* (2013.01)

(56) References Cited

U.S. PATENT DOCUMENTS

| | | | |
|---|---|---|---|
| 10,845,791 B2* | 11/2020 | Cohen | G05B 15/02 |
| 11,567,466 B1 | 1/2023 | Galvez et al. | |
| 2010/0286937 A1* | 11/2010 | Hedley | G06Q 50/06 702/60 |
| 2010/0318200 A1 | 12/2010 | Foslien et al. | |
| 2012/0216468 A1* | 8/2012 | Liu | H02S 10/12 52/302.1 |
| 2013/0134962 A1 | 5/2013 | Kamel et al. | |
| 2013/0144546 A1* | 6/2013 | Brackney | G06F 30/13 702/61 |
| 2016/0103475 A1 | 4/2016 | Lee et al. | |
| 2016/0109865 A1* | 4/2016 | Bojorges Rodríguez | G01R 21/133 700/275 |
| 2018/0196456 A1 | 7/2018 | Elbsat | |
| 2018/0231967 A1* | 8/2018 | Cohen | G05B 23/0208 |
| 2018/0313563 A1 | 11/2018 | Turney et al. | |
| 2018/0340704 A1 | 11/2018 | Turney et al. | |
| 2018/0372362 A1 | 12/2018 | Turney et al. | |
| 2018/0375444 A1 | 12/2018 | Gamroth | |
| 2019/0155268 A1* | 5/2019 | Cohen | G06Q 50/06 |
| 2019/0235453 A1 | 8/2019 | Turney et al. | |
| 2019/0340709 A1 | 11/2019 | Elbsat et al. | |
| 2020/0027096 A1* | 1/2020 | Cooner | G06Q 40/04 |
| 2020/0041158 A1 | 2/2020 | Turney et al. | |
| 2020/0132328 A1 | 4/2020 | Boettcher et al. | |
| 2020/0149768 A1 | 5/2020 | Turney et al. | |
| 2020/0319610 A1 | 10/2020 | Ray et al. | |
| 2021/0200169 A1 | 7/2021 | Ploegert et al. | |
| 2021/0200807 A1 | 7/2021 | Ploegert et al. | |
| 2021/0270490 A1 | 9/2021 | Turney et al. | |
| 2021/0356916 A1 | 11/2021 | Wenzel et al. | |
| 2021/0365861 A1 | 11/2021 | Elbsat et al. | |
| 2022/0011731 A1 | 1/2022 | Risbeck et al. | |
| 2022/0042704 A1 | 2/2022 | Drees et al. | |
| 2022/0058545 A1* | 2/2022 | Warake | G06Q 10/0639 |
| 2022/0092500 A1 | 3/2022 | Drees et al. | |
| 2022/0137580 A1 | 5/2022 | Burroughs et al. | |
| 2022/0186962 A1 | 6/2022 | Turney et al. | |
| 2022/0268471 A1 | 8/2022 | Turney et al. | |
| 2022/0284519 A1 | 9/2022 | Pancholi et al. | |
| 2022/0299230 A1 | 9/2022 | Boettcher et al. | |
| 2022/0299963 A1 | 9/2022 | Waghmare et al. | |
| 2022/0335547 A1 | 10/2022 | Wenzel | |
| 2022/0381471 A1 | 12/2022 | Wenzel et al. | |
| 2022/0390137 A1 | 12/2022 | Wenzel et al. | |
| 2023/0020417 A1 | 1/2023 | Elbsat et al. | |
| 2023/0067755 A1* | 3/2023 | Raj | G06F 18/24 |
| 2023/0085641 A1 | 3/2023 | Jones et al. | |
| 2023/0152763 A1 | 5/2023 | Davis et al. | |
| 2023/0169220 A1 | 6/2023 | Ramanasankaran et al. | |
| 2023/0350387 A1 | 11/2023 | Davis et al. | |

FOREIGN PATENT DOCUMENTS

| | | | | |
|---|---|---|---|---|
| CN | 109855263 A | * | 6/2019 | G06Q 50/10 |
| CN | 113824788 A | * | 12/2021 | H04L 67/10 |
| CN | 113835348 A | * | 12/2021 | G05B 15/02 |
| CN | 215871715 U | * | 2/2022 | G06F 18/24 |
| CN | 114200839 A | * | 3/2022 | G05B 13/042 |
| EP | 2 237 201 A1 | | 10/2010 | |
| EP | 2 504 807 A2 | | 10/2012 | |
| EP | 3 675 003 A1 | | 7/2020 | |
| WO | WO-2010/129913 A1 | | 11/2010 | |

OTHER PUBLICATIONS

Corrado, "Combining Green Metrics and Digital Twins for Sustainability Planning and Governance of Smart Buildings and Cities", Aug. 2022, Sustainability 2022, 14, 12988. https://doi.org/10.3390/su142012988. (Year: 2022).*

Dalene, F., "Technology and information management for low-carbon building", Jul. 2012, J. Renewable Sustainable Energy 4, 041402 (2012). (Year: 2012).*

Dawooda et al., "Designing low carbon buildings: A framework to reduce energy consumption and embed the use of renewables", 2013, Sustainable Cities and Society 8 (2013) 63-71. (Year: 2013).*

Parvin et al., "Intelligent Controllers and Optimization Algorithms for Building Energy Management Towards Achieving Sustainable Development, Challenges and Prospects", Mar. 2021, IEEE Access. (Year: 2021).*

Wang et al., "Intelligent Multiagent Control System for Energy and Comfort Management in Smart and Sustainable Buildings", Jun. 2012, IEEE Transactions on Smart Grid, vol. 3, No. 2. (Year: 2012).*

Shakin et al., "A review on optimized control systems for building energy and comfort management of smart sustainable buildings", Dec. 2013, Renewable and Sustainable Energy Reviews 34 (2014) 409-429. (Year: 2013).*

Yang et al., "Building Energy Management Systems", 2017, Encyclopedia of Sustainable Technologies, First Edition, 2017, 291-309. (Year: 2017).*

International Search Report and Written Opinion on PCT Appl. No. PCT/US2023/020413 dated Jun. 20, 2023 (12 pages).

U.S. Appl. No. 17/668,791, filed Feb. 10, 2022, Johnson Controls TYCO IP Holdings LLP.

U.S. Appl. No. 17/692,642, filed Mar. 11, 2022, Johnson Controls TYCO IP Holdings LLP.

U.S. Appl. No. 17/827,439, filed May 27, 2022, Johnson Controls TYCO IP Holdings LLP.

International Search Report and Written Opinion on PCT Appl. No. PCT/US2022/044034 dated Dec. 20, 2022 (12 pages).

International Search Report and Written Opinion on PCT Appl. No. PCT/US2023/020414 dated Jun. 15, 2023 (22 pages).

* cited by examiner

Add Energy Conservation Measures to Plan

Recommended ECM selection for [butane]
Select the ECM plan option below that best fits your facility's needs.
You can optimize recommendations for [highest emission reduction], shortest payback, or lowest cost Building 1 | Butane | Emission Sub-Target
Reduce total emissions of butane by 50% by 2040 from a 2017 baseline year

| BASELINE 2017 | LAST YEAR 2021 | TARGET 2040 | REMAINDER 2040 |
|---|---|---|---|
| 4000 $tCO_2e$ | 6000 $tCO_2e$ | 2000 $tCO_2e$ | 4000 $tCO_2e$ |

⊞ Calculation

ECMs Impact
Emission Reduction ECM Options

Reduction Needed — 4,000
Option 1 — 3,000-4,000
Option 2 — 3,000-4,000
Option 3 — 2,800-3,200
Option 4 — 2,100-2,800

0  1,000  2,000  3,000  4,000  5,000
Emission Reduction ($tCO_2e$/yr)

⊢⊣ Estimated Reduction Range

Optimize for [ Highest Emission Reduction ∨ ]

---

○ Option 1

| No. of ECMs | 1 |
| Total estimated annual emission reduction | 3,000-4,000 $tCO_2e$ |
| Impacted sources(s) | Butane |
| Total cost | $XX,XXX-$XX,XXX |

Emission Reduction from Option 1
Reduction Needed — 4,000 $tCO_2e$
Option 1 — 3,000-4,000 $tCO_2e$

[ Click here ]

ECM Project Description

This option may reduce annual emissions from 6,000 $tCO_2e$ to 2,000 $tCO_2e$ by 2040.

[ Click here ] ( 3 ) Associated Faults ∨ [ Click here ]

ECM 1 Boiler Replacement

FIG. 17

○ Option 2

| No. of ECMs | 2 | Emission Reduction from Option 2 | This option may reduce annual emissions from 6,000 tCO$_2$e to 2,000 tCO$_2$e by 2040. |
|---|---|---|---|
| Total estimated annual emission reduction | 3,000-4,000 tCO$_2$e | Reduction Needed — 4,000 tCO$_2$e<br>Option 2 — 3,000-4,000 tCO$_2$e | |
| Impacted sources(s) | Butane | | |
| Total cost | $XX,XXX-$XX,XXX | | |

| ECM X Name Here | ECM Project Description | Associated Faults ∨ |
|---|---|---|
| ECM X Name Here | ECM Project Description | Associated Faults ∨ |

○ Option 2

| | |
|---|---|
| No. of ECMs | 2 |
| Total estimated annual emission reduction | 1000 tCO₂e |
| Impacted sources(s) | NA |
| Total cost | $15,000 |

Sub-Target ▨ 4000
Option 2 ▨ 3800

6000 tCO₂e       2000 tCO₂e
Lest Year        Target Year
2017             2040

This option may reduce annual emissions from 4000 tCO₂e to 2000 tCO₂e by 2040.

ECM 2 Boiler Replacement      Description & Assumptions ⌄

ECM 3 Boiler Replacement      Description & Assumptions ⌄

[ Customize ]  [ Accept & Finish ]

Save and Finish Later

FIG. 20

< Back to Add Energy Conservation Measures to Plan

Description and Assumptions
ECM identifying info e.g. name, no., short description

Description

| | |
|---|---|
| Why we recommend this ECM? | > |
| Faults | > |
| Boiler replacements | > |
| What is a [Boiler Replacement] OR Description? | > |

Assumptions

| | |
|---|---|
| Simple payback range | > |
| Savings | > |
| Costing (Order of Magnitude) | > |

FIG. 21

< Back to Recommendation ✕

ECM Project Description
ECM 1
Boiler Replacement
This ECM installs new domestic hot water heating or space heating condensing boiler(s), replacing existing domestic hot water or space heating boiler(s)

[ Click here ]

Description ∧

This ECM standard covers the following:
- New condensing boilers only
- Singular boiler or multiple boilers
- Natural gas, oil, propane or dual fuels
- Boilers from 700 MBH to 3 MMBtu/hr Existing domestic hot water or space heating boiler(s) will be removed and replaced with one or more new high-efficiency condensing boiler(s). The lower return temperatures (compared with non-condensing boilers) allow condensing boilers to take advantage of the efficiency gains made by extracting the latent heat from the fuel moisture. Note that for space heating the higher efficiencies will only be available under certain conditions (see attachment below).

Fuel savings will result from not only improved boiler combustion efficiency, but also reduced boiler cycling losses. Understanding of the baseline operating profile, loads and burner type is important for proper boiler selection and estimation of energy savings. Existing boilers with single stage burners will likely have excessive boiler cycling. Each cycle loses heat energy during the pre and post purge cycles. This can be reduced by using multiple boilers as well as modulating burners, with higher turndown ratios. With condensing boilers, operating at lower return temperatures, combustion efficiencies can exceed 90%. Review boiler manufacturers' documentation for efficiencies at different return temperatures.

The following document discusses the reduction in efficiency at higher return temperatures, as well as other cautions when applying this ECM. Click here ↗

Generally this ECM includes:

- Removal and disposal of the existing boiler(s)
- Furnish and install new boiler(s)
- Install new hot water pump(s) (unless existing are in good condition and are sized correctly for new boiler(s))
- Install a new AL29 4C Stainless steel or other manufacturer approved stack that complies with ANSI/UL 1738
- Install an approved method for draining the condensate (per manufacturers' specifications and the local plumbing code), note it often

FIG. 22

Add Energy Conservation Measures to Plan

Customize ECM selection for [butane]
In the table below, select the energy conservation measures you want to include in your plan. To reach your [2040 emissions target], select ECMs with annual emission reductions that add up to the target reduction amount.

Building 1 | Butane | Emission Sub-Target

Reduce total emissions of butane by 50% by 2040 from a 2017 baseline year

| BASELINE | LAST YEAR | TARGET | REMAINDER |
|---|---|---|---|
| 2017 | 2021 | 2040 | 2040 |
| 1000 tCO₂e | 1000 tCO₂e | 500 tCO₂e | 500 tCO₂e |

🖩 Calculation

ECMs Impact Chart ⓘ

Sub-Target
ECM 6000 tCO₂e      2000 tCO₂e
Last Year       Target Year
2021            2040

▨ Estimated Total Annual Emission Reduction
▣ Estimated 2040 Emissions

Optimize for: Highest Emission Reduction ▾

Select ECMs to reach the 2040 target

| ECM ID ▾ | ECM Project Name ▾ | Impacted Source(s) ▾ | Estimated Annual Emission Reduction ⓘ (%) ▾ | Estimated Annual Emission Reduction (tCO₂e/yr) ▾ | Estimated Annual Energy Reduction (mmBTU/yr) ▾ | Estimated Project Cost ($) ▾ | Payback Period ▾ (Yr) |
|---|---|---|---|---|---|---|---|
| ☐ ECM 1 | Space heating replacements — Replace existing space heating with... | Natural Gas, Diesel | 98% | 17,000-20,000 | 10,000 | 20,000 | 10-15 |
| ☑ ECM 2 | Burner replacements — Replace existing, burners with high... | Propane, Diesel | 60% | 9,000-12,000 | 12,000 | 10,000 | 4-8 |
| ☐ ECM 3 | Thermostats replacements — Replace thermostats with program... | Natural Gas, Pro... | 80% | 17,000-20,000 | 8,000 | 20,000 | 3-5 |
| ☐ ECM 4 | Burner replacements — Replace existing burners with high... | Natural Gas, Pro... | 60% | 9,000-12,000 | 2,000 | 10,000 | 1 |
| Total | | | | 52,000-64,000 | | 60,000 | |

Save & Finish Later          Back to Recommendation    Accept & Finish

FIG. 23

Add Energy Conservation Measures to Plan

Customize ECM selection for [butane]
In the table below, select the energy conservation measures you want to include in your plan. To reach your [2040] emissions target, select ECMs with annual emission reductions that add up to the target reduction amount.

Building 1 | Butane | Emission Sub-Target

Reduce total emissions of butane by 50% by 2040 from a 2017 baseline year

| BASELINE | LAST YEAR | TARGET | REMAINDER |
|---|---|---|---|
| 2017 | 2021 | 2040 | 2040 |
| 1000 tCO₂e | 1000 tCO₂e | 500 tCO₂e | 500 tCO₂e |

🖩 Calculation

ECMs Impact Chart ⓘ

Sub-Target
ECM 6000 tCO₂e          2000 tCO₂e
Last Year           Target Year
2021                2040

▨ Estimated Total Annual Emission Reduction    ▪ Estimated 2040 Emissions

Optimize for [ Highest Emission Reduction ⌄ ]

Select ECMs to reach the 2040 target

| ECM ID ▽ | ECM Project Name ▽ | Impacted Source(s) ▽ | Estimated ⓘ Annual Emission Reduction ▽ (%) | Estimated Annual Emission Reduction ▽ (tCO₂e/yr) | Estimated Annual Energy Reduction ▽ (mmBTU/yr) | Estimated Project Cost ▽ ($) | Payback Period ▽ (Yr) |
|---|---|---|---|---|---|---|---|
| ☐ ECM 1 | Space heating replacements Replace existing space heating with... | Natural Gas, Diesel | 90% | 17,000-20,000 | 10,000 | 20,000 | 10-15 |
| ☑ ECM 2 | Burner replacements Replace existing burners with high... | Propane, Diesel | 60% | 9,000-12,000 | 12,000 | 10,000 | 4-8 |
| ☑ ECM 3 | Thermostats replacements Replace thermostats with program... | Natural Gas, Pro... | 80% | 17,000-20,000 | 8,000 | 20,000 | 3-5 |
| ☐ ECM 4 | Burner replacements Replace existing burners with high... | Natural Gas, Pro... | 60% | 9,000-12,000 | 2,000 | 10,000 | 1 |
| Total | | | | 52,000-64,000 | | 60,000 | |

[ Save & Finish Later ]                                    [ Back to Recommendation ]  [ Accept & Finish ]

FIG. 24

Energy Manager  Utility Bill Manager  Net Zero Advisor  Goals & Targets  Improvement Measures Plan

Improvement measures Plan

View As [ Table ]

☑ Group by Category  ↧ Download

Emissions ▽

Building 1 | Emission | Target                                                                                              Add/Remove ECMs  ‹

| ECM ID ▾ | ECM Project ▾ Name | Impacted ▾ Source(s) | Estimated ▾ Impact | Estimated ▾ Savings ($/yr) | Estimated Project ▾ Cost ($) | Payback ▾ Period (Yr) | Start ▾ Date | End ▾ Date |
|---|---|---|---|---|---|---|---|---|
| ⋮⋮ ECM 1 | Space heating replacements Replace existing space heating with... | Natural Gas, Diesel | 20,000 $tCO_e2/yr$ | ~30,000-45,000 | ~200,000 | ~4.4-6.6 | 📅 Select Date | 📅 Select Date |
| ⋮⋮ ECM X | ECM name here ECM description here... | NA | XX,XXX $tCO_22/yr$ | ~XX,XXX | ~XXX,XXX | ~X | 📅 Select Date | 📅 Select Date |

Building 1 | Natural Gas | Sub-Target                                                                                      Add ECMs No table to show yet

Building 1 | Natural Gas | Sub-Target                                                                                      Add ECMs

FIG. 25

| Building 1 | Propane | Emission | Sub-Target | | | | | Add ECMs |
|---|---|---|---|---|---|---|---|---|
| No table to show yet | | | | | | | | |

| Building 1 | Butane | Emission | Sub-Target | | | | | Add/Remove ECMs ‹ |
|---|---|---|---|---|---|---|---|---|
| ECM ID ▸ | ECM Project Name ▸ | Impacted Source(s) ▸ | Estimated Impact ▸ | Estimated Savings ($/yr) ▸ | Estimated Project Cost ($) ▸ | Payback Period (Yr) ▸ | Start Date ▸ | End Date ▸ |
| ⋮⋮ ECM 1 | Space heating replacements ECM short description here... | Natural Gas, Diesel | 20,000 tCO₂e/yr | ~30,000-45,000 | ~200,000 | ~4.4-6.6 | 📅 Select Date | 📅 S |

FIG. 26

Energy ▽

| Building 1 | Energy Use Intensity | Target | Add/ Remove ECMs  > |
|---|---|

| Electricity | Energy Use Intensity | Sub-Target | Add ECMs |
|---|---|

| Steam | Energy Use Intensity | Sub-Target | Add ECMs |
|---|---|

| Building 1 | Energy Use Intensity | Target | Add/ Remove ECMs  < |
|---|---|

| ECM ID ▸ | ECM Project ▸ Name | Impacted Source(s) ▸ | Estimated Impact | Estimated Savings ▸ ($/yr) | Estimated Project Cost ▸ ($) | Payback Period ▸ (Yr) | Start ▸ Date | End ▸ Date |
|---|---|---|---|---|---|---|---|---|
| ∷ ECM X | Boiler replacements Replace existing space heating with... | Electricity, Chille... | XX,XXX kBtu/yr | ~XX,XXX-XX,XXX | ~XXX,XXX | ~X | Select Date | Select Date |

FIG. 27

Improvement Measures Plan

View As: Table

☐ Group by Category ⬇ Download

Selected Energy Conservation Measures

| ECM ID | ECM Project Name | Target Category | Impacted Source(s) | Estimated Impact | Estimated Savings ($/yr) | Estimated Project Cost ($) | Payback Period (Yr) | Start Date |
|---|---|---|---|---|---|---|---|---|
| ∷ ECM 1 | Space heating replacements Replace existing space heating with... | Emissions | Natural gas, Diesel | 20,000 tCO₂e/yr | ~30,000-45,000 | ~200,000 | ~4.4-6.6 | 🗓 Sel |
| ∷ ECM X | ECM name here ECM short description here... | Emissions, Ene... | NA | XX,XXX tCO₂e/yr | ~XX,XXX | ~XXX,XXX | ~X | 🗓 Sel |
| ∷ ECM 3 | Boiler replacements ECM short description here... | Energy | Electricity, Chille... | XX,XXX kBtu/yr | ~XX,XXX | ~XXX,XXX | ~X | 🗓 Sel |
| ∷ ECM 4 | Water fixture replacements ECM short description here... | Water | NA | XX,XXX gal/yr | ~XX,XXX | ~XXX,XXX | ~X | 🗓 Sel |
| ∷ ECM 5 | Waste reduction ECM short description here... | Waste | NA | XX,XXX tons/yr | ~XX,XXX | ~XXX,XXX | ~X | 🗓 Sel |

FIG. 29

Improvement Measures Plan

View As: Timeline

☐ Group by Category  ⊞ Autofit  Decade ▽  − +

| ECM ID ▽ | ECM Project Name | 2000 - 2009 | | 2010 - 2019 | | 2020 - 2029 | 203... |
|---|---|---|---|---|---|---|---|
| | | 2000 - 2004 | 2005 - 2009 | 2010 - 2014 | 2015 - 2019 | 2020 - 2024 | 2025 - 2029 |
| ⊙ ECM 1 | Space heating replacements<br>Replace existing space heating with... | | | | | ▨ | |
| | ECM Description & Assumptions    h here... <br> Edit ECM Project Info    here... | | | | | ▱ | |
| ⋯ ECM 4 | Water fixture replacements<br>ECM short description here... | | | | | | ▱ |
| ⋯ ECM 5 | SECM name here<br>ECM short description here... | | | | | ▱ | |
| ⋯ ECM X | ECM name here<br>ECM short description here... | | | | | | |

FIG. 30

| ECM ID ▼ | ECM Project Name | Impacted Sources | Category | Date | 2019 | 2015 - 2019 | 2020 - 2024 | 2025 - 2029 |
|---|---|---|---|---|---|---|---|---|
| ... ECM 1 | Space heating replacements Replace existing space heating with... | Natural Gas, Diesel | Energy | Jul '22 - Aug '23 | | | ▨ | |
| ... ECM X | ECM name here RECM short description here... | NA | Emission, Energy | Aug '23 - Dec '23 | | | | ▨ |
| ... ECM 3 | Boiler replacements ECM short description here... | Electricity, Chill... | Emission | Jan '24 - Sep '24 | | | | ▨ |
| ... ECM 4 | Water fixture replacements ECM short description here... | NA | Water | Sep '24 - Jan '25 | | | | |
| ... ECM 5 | ECM name here ECM short description here... | NA | Energy | Feb '25 - Apr '25 | | | | |
| ... ECM X | ECM name here ECM short description here... | NA | Emission | Jul '25 - Aug '25 | | | | |

☐ Group by Category  🗓 Autofit  Decade ⌄  − +

FIG. 31

Improvement Measures Plan

| Category | | | View As | Timeline | | | |
|---|---|---|---|---|---|---|---|
| | ☑ Group by Category | 🗓 Autofit | | 5 Years ∨ | | − + | |
| | | 2018 | 2019 | 2020 | 2021 | 2020 - 2024 2022 | 2023 | 2024 | 2025 | 2026 |

| Category | | |
|---|---|---|
| Emission | > | |
| Building 1 \| Emission \| Target | > | |
| Building 1 \| Emission \| Natural Gas \| Sub-Target | > | |
| Building 1 \| Emission \| Diesel \| Sub-Target | > | |
| Building 1 \| Emission \| Propane \| Sub-Target | > | |
| Building 1 \| Emission \| Butane \| Sub-Target | < | |

| ECM ID | ECM Project Name | Impacted Sources | Date |
|---|---|---|---|
| ⋮ ECM 1 | Space heating replacements<br>Replace existing space heating with... | Natural Gas, Diesel | Dec '26 - Mar '27 |

FIG. 32

Energy Manage  Utility Bill Manager  Net Zero Advisor  Goals & Targets  Improvement Measures Plan Improvement Measures Plan                                    View As [Estimated Impact ∨]

Building 1 Total Emissions Scope 1

Reduce total emissions of scope 1 by 91% by 2040 from a 2018 baseline year

ECMs Impact Chart ⓘ

Target
200 tCO₂e  ▨▨▨
ECMs  ▨▨▨

| Completed ECMs ⓘ | |
|---|---|
| ECM ▾ Name | Completion ▾ Date |
| ECM 0032 Building Envelope | 2021 |
| ECM 0055 Lighting Fixtures | 2021 |

| Planned ECMs ⓘ | | |
|---|---|---|
| ECM ▾ Name | Completion ▾ Date | Estimated Impact |
| ECM 0062 Improve Scheduling for HVAC | 2025 | |
| ECM 0073 Improve scheduling for lighting | 2025 | |
| ECM 0018 Reduce over ventilation | 2040 | |

Building 1 Total Emissions Scope 1 ∨

Water

Building 1 | Water | Target | Selected ECM Projects ⓘ | Add ECMs ⌄

Reduce water use intensity by baseline year

| Building 1 | Energy Use Intensity | Target |
|---|---|---|
| BASELINE | LAST YEAR | TARGET | REMAINDER |
| 2017 | 2021 | 2040 | 2040 |
| XXX gal/sqft | XXX gal/sqft | XXX gal/sqft | XXX gal/sqft |

ECMs Impact Chart ⓘ

Target ▨

No comparison chart to show yet

No table to show yet

Waste

Building 1 | Waste | Target | Selected ECM Projects ⓘ | Add ECMs ⌄

Reduce waste by XX% by 2040 baseline year

| Building 1 | Total Waste | Target |
|---|---|---|
| BASELINE | LAST YEAR | TARGET | REMAINDER |
| 2017 | 2021 | 2040 | 2040 |
| XXX unit | XXX unit | XXX unit | XXX kBtu |

ECMs Impact Chart ⓘ

Target ▨

No comparison chart to show yet

No table to show yet

Building 1 | Natural Gas | Emission | Sub-Target

Reduce total emissions of natural gas by xx%

Building 1|Natural Gas|Emissions|Target
| BASELINE | LAST YEAR | TARGET |
| 2018 | 2021 | 2040 |
| XX tCO$_2$e | XX tCO$_2$e | XX tCO$_2$e |

Targeted ECM Projects ⓘ     Add ECMs

ECMs Impact Chart ⓘ

Sub-Target

No comparison chart to show yet

No table to show yet

---

Building 1 | Diesel | Emission | Sub-Target

Reduce total emissions of diesel by XX% by 2

Building 1|Diesel|Emissions|Sub-Target
| BASELINE | LAST YEAR | TARGET |
| 2018 | 2021 | 2040 |
| XX tCO$_2$e | XX tCO$_2$e | X tCO$_2$e |

Targeted ECM Projects ⓘ     Add ECMs

ECMs Impact Chart ⓘ

Sub-Target

No comparison chart to show yet

No table to show yet

FIG. 41

○ Option 4
No. of ECMs  2
Total estimated annual emission reduction  20 tCO$_2$e
Impacted source(s)  NA
Total cost  $15,000

Sub-Target
Option 2

25 tCO$_2$e  0 tCO$_2$e
2018  2040

This option may reduce annual emissions from 25 tCO$_2$e to 5 tCO$_2$e by 2040.

ECM 2 Boiler Replacement — Description & Assumptions ⌄

ECM 3 Boiler Replacement — Description & Assumptions ⌄

Customize    Accept & Finish

Save and Finish Later

FIG. 44

Add Energy Conservation Measures to Plan

Recommended ECM selection for [building

Select the ECM plan option below that it fits yo
You can optimize recommendations for [highe
reduction], shortest payback, or lowest cost Building 1 | Butane | Emission | Sub-Target
Reduce total emissions of butane by 100% t
baseline year

| BASELINE | LAST YEAR | TARGET |
|---|---|---|
| 2018 | 2021 | 2040 |
| 25 tCO$_2$e | 20 tCO$_2$e | 0 tCO$_2$e |

Confirm ECM Removal

Are you sure you want to remove the following ECMs?
This action cannot be undone.

ECM Xx1 - Boiler Replacement

Back    Yes

Optimize for    Shortest Payback Period

FIG. 45

Add Energy Conservation Measures to Plan

Recommended ECM selection for [building 1]
Select the ECM plan option below that it fits your facility's needs. You can optimize recommendations for [highest emission reduction], shortest payback, or lowest cost Building 1 | Butane | Emission | Sub-Target
Reduce total emissions of butane by 100% by 2040 from a 2018 baseline year

| | BASELINE 2018 | LAST YEAR 2021 | TARGET 2040 | REMAINDER 2040 |
|---|---|---|---|---|
| | 25 $tCO_2e$ | 20 $tCO_2e$ | 0 $tCO_2e$ | 20 $tCO_2e$ |

⊞ Calculation

ECMs Impact Chart ⓘ

Sub-Target
Option 1 — 0
Option 2 — 5
Option 3 — 8
Option 4 — 10

25 $tCO_2e$ — 2018
0 $tCO_2e$ — 2040

▨ Estimated Total Annual Emission Reduction
▧ Estimated 2040 Emissions

Optimize for [Highest Emission Reduction ▾]

This option may reduce annual emissions from 25 $tCO_2e$ to 0 $tCO_2e$ by 2040.

Description & Assumptions ⌄

Sub-Target
Option 1 — 0

25 $tCO_2e$ — 2018
0 $tCO_2e$ — 2040

⊙ Option 1
No. of ECMs: 1
Total estimated annual emission reduction: 25 $tCO_2e$
Impacted source(s): Diesel, Prop...
Total cost: $35,000

ECM 1 Boiler Replacement

Add Energy Conservation Measures to Plan

Customize ECM selection for [building 1]

In the table below, select the energy conservation measures you want to include in your plan. To reach your [2040 emissions target], select ECMs with annual emission reductions that add up to the target reduction amount.

Building 1 | Butane | Emission | Sub-Target

Reduce total emissions of butane by 100% by 2040 from a 2018 baseline year

| BASELINE 2018 | LAST YEAR 2021 | TARGET 2040 | REMAINDER 2040 |
|---|---|---|---|
| 25 tCO$_2$e | 20 tCO$_2$e | 0 tCO$_2$e | 20 tCO$_2$e |

ECMs Impact Chart ⓘ

Sub-Target ▨  25 tCO$_2$e  2018
ECM ▧  0 tCO$_2$e  2040

☒ Estimated Total Annual Emission Reduction   ☒ Estimated 2040 Emissions

Optimize for [ Highest Emission Reduction ▾ ]

▦ Calculation

Select ECMs to reach the 2040 target

| ECM ID ▾ | ECM Project Name ▾ | Impacted Source(s) ▾ | Estimated ⓘ Annual Emission Reduction (%) ▾ | Estimated Annual Emission Reduction (tCO$_2$e/yr) ▾ | Estimated Annual Energy Reduction (mmBTU/yr) ▾ | Estimated Project Cost ($) ▾ | Payback Period (Yr) ▾ |
|---|---|---|---|---|---|---|---|
| ☑ ECM 1 | Space heating replacements  Replace existing space heating with... | Natural Gas, Diesel | 80% | 17,000–20,000 | 10,000 | 20,000 | 10-15 |

FIG. 48A

| | | | | | | |
|---|---|---|---|---|---|---|
| ☑ ECM 2 | Burner replacements<br>Replace existing burners with high... | Propane, Diesel | 60% | 9,000-12,000 | 12,000 | 10,000 | 4-8 |
| ☐ ECM 3 | Thermostats replacements<br>Replace thermostats with program... | Natural Gas, Pro... | 80% | 17,000-20,000 | 8,000 | 20,000 | 3-5 |
| ☐ ECM 4 | Burner replacements<br>Replace existing burners with high... | Natural Gas, Pro... | 60% | 9,000-12,000 | 2,000 | 10,000 | 1 |
| Total | | | | 52,000-64,000 | | 60,000 | |

Save and Finish Later     Back to Recommendation     Accept & Finish

FIG. 48B

Add Energy Conservation Measures to Plan

Customize ECM selection for [building 1]

In the table below, select the energy conservation measures you want to include in your plan. To reach your [2040 emissions target], select ECMs with annual emission reductions that add up to the target reduction amount.

Building 1 | Butane | Emission | Sub-Target

Reduce total emissions of butane by 100% by 2040 from a 2018 baseline year

| BASELINE | LAST YEAR | TARGET | REMAINDER |
|---|---|---|---|
| 2018 | 2021 | 2040 | 2040 |
| 25 tCO$_2$e | 20 tCO$_2$e | 0 tCO$_2$e | 20 tCO$_2$e |

⊞ Calculation

Confirm ECM Removal

Are you sure you want to remove the following ECMs? This action can not be undone.

ECM XX1 - Boiler Replacement

[Back]  [Yes]

Optimize for [Highest Emission Reduction]

Select ECMs to reach the 2040 target

| ECM ID ▾ | ECM Project Name ▾ | Impacted Source(s) ▾ | Estimated Annual Emission Reduction (%) | Estimated Annual Emission Reduction (tCO$_2$e/yr) ▾ | Estimated Annual Energy Reduction (mmBTU/yr) ▾ | Estimated Project Cost ($) ▾ | Payback Period (Yr) ▾ |
|---|---|---|---|---|---|---|---|
| ☑ ECM 1 | Space heating replacements Replace existing space heating with... | Natural Gas, Diesel | 80% | 17,000-20,000 | 10,000 | 20,000 | 10-15 |
| ☑ ECM 2 | Burner replacements Replace existing burners with high... | Propane, Diesel | 60% | 9,000-12,000 | 12,000 | 10,000 | 4-8 |

FIG. 49

Selected Energy Conservation Measures

| ECM ID | ECM Project Name | Impacted Source(s) | Estimated Impact | Estimated Project Cost ($) | Estimated Savings ($/yr) | Payback Period (yr) | Start/End Date |
|---|---|---|---|---|---|---|---|
| Emission | | | | | | | |
| ECM 1 | Space heating replacements<br>ECM short description here... | Butane | 20,000-XX,XXX tCO$_2$e/yr | 100,000 - 150,000 | 30,000-45,000 | 4.4-6.6 | Nov 01, 2022 - Au... |
| ECM X | ECM name here<br>ECM short description here... | | 20,000-XX,XXX tCO$_2$e/yr | XXX,XXX - XXX,XXX | 30,000-45,000 | 4.4-6.6 | |
| ECM X | ECM name here<br>ECM short description here... | Electricity, Chille... | XX,XXX-XX,XXX kBtu/yr | XXX,XXX - XXX,XXX | XX,XXX-XX,XXX | X.X-X.X | |

November 2022
S M T W T
2 3 4 5 6
9 10 11 12 13
16 17 18 19 20

FIG. 53B

BUILDING MANAGEMENT SYSTEM WITH SUSTAINABILITY IMPROVEMENT

CROSS-REFERENCE TO RELATED PATENT APPLICATIONS

This application claims the benefit of and priority to U.S. Provisional Patent Application No. 63/336,935 filed Apr. 29, 2022 and this application claims the benefit of and priority to U.S. Provisional Patent Application No. 63/435,191 filed Dec. 23, 2022, the entirety of each of these patent applications is incorporated by reference herein. The following applications are incorporated herein by reference in their entireties: U.S. patent application Ser. No. 17/948,118 filed Sep. 19, 2022, U.S. patent application Ser. No. 17/710,458 filed Mar. 31, 2022, U.S. patent application Ser. No. 17/134,661 filed Dec. 28, 2020, U.S. Provisional Patent Application 63/289,499 filed Dec. 14, 2021, and U.S. patent application Ser. No. 17/537,046 filed Nov. 29, 2021.

SUMMARY

At least one embodiment is directed to a building management system (BMS). The BMS can include one or more memory devices storing instructions thereon that, when executed by the one or more processors, cause the one or more processors to obtain a sustainability goal established for a building, the building can include a plurality of pieces of building equipment, and the sustainability goal can pertain to the sustainability of the building. The instructions can also cause the one or more processors to determine, using a baseline value for the sustainability performance of the building and the sustainability goal, a target sustainability level for the building. The instructions can also cause the one or more processors to generate, using the baseline value for the sustainability performance of the building and the target sustainability level, a plurality of energy conservation protocols, a first energy conservation protocol of the plurality of energy conservation protocols can include a plurality of actions that meet at least a portion of the sustainability goal or at least a portion of the target sustainability level for the building. The instructions can also cause the one or more processors to receive an indication to accept a subset of the plurality of actions included in the first energy conservation protocol, and implement, responsive to receiving the indication to accept the subset of the plurality of actions, the subset of the plurality of actions included in the first energy conservation protocol.

In some embodiments, implementing the subset of the plurality of actions included in the first energy conservation protocol includes controlling, using a plurality of control actions that pertain to the subset of the plurality of actions included in the first energy conservation protocol, at least one piece of building equipment of the plurality of pieces of building equipment, and detecting, responsive to controlling the at least one piece of building equipment of the plurality of pieces of building equipment, that the building has moved towards the target sustainability level.

In some embodiments, the instructions can cause the one or more processors to detect that a first piece of building equipment of the plurality of pieces of building equipment has been replaced by a second piece of building equipment, the second piece of building equipment can perform a role similar to that of the first piece of building equipment. The instructions can also cause the one or more processors to determine, responsive to the second piece of building equipment replacing the first piece of building equipment, an impact of the second piece of building equipment to at least one of the sustainability goal or the target sustainability level, and provide, to a user device, the impact of the second piece of building equipment to at least one of the sustainability goal or the target sustainability level.

In some embodiments, the instructions can cause the one or more processors to detect, using operational data of the building, an equipment fault condition for at least one piece of building equipment of the plurality of pieces of equipment. The instructions can also cause the one or more processors to determine that the equipment fault condition impacts the sustainability goal. The instructions can also cause the one or more processors to update at least one energy conservation protocol of the plurality of energy conservation protocols to include a first action that addresses at least a portion of the equipment fault condition, and execute the at least one energy conservation protocol of the plurality of energy conservation protocols, the at least one energy conservation protocol of the plurality of energy conservation protocols addresses the equipment fault condition.

In some embodiments, the instructions can cause the one or more processors to cause a device to display an element, the element includes at least one of the sustainability goal, a current value for the sustainability performance or at least one energy conservation protocol of the plurality of energy conservation protocols. The instructions can also cause the one or more processors to receive an indication to update at least a portion of the element, the indication includes a user defined energy conservation protocol, and update the element to include the user defined energy conservation protocol.

In some embodiments, the instructions can cause the one or more processors to execute at least one energy conservation protocol of the plurality of energy conservation protocols. The instructions can also cause the one or more processors to determine, using operational data for the building, a current value for the sustainability performance of the building, the current value for the sustainability performance of the building is determined in response to a predetermined amount of time. The instructions can also cause the one or more processors to determine a difference between the current value for the sustainability performance of the building and the baseline value for the sustainability performance of the building and determine, responsive to the difference being larger than a predetermined threshold, that the at least one energy conservation protocol of the plurality of energy conservation protocols has moved the sustainability performance of the building towards the target sustainability level.

In some embodiments, the instructions can cause the one or more processors to monitor, using operational data for the building, a status of a particular action included in at least one energy conservation protocol of the plurality of energy conservation protocols. The instructions can also cause the one or more processors to determine, responsive to monitoring the status of the particular action, that the status of the particular action has remained the same. The instructions can also cause the one or more processors to cause a device to display an element, the element includes a notice to execute the particular action, and determine, using second operational data for the building, that the particular action has been executed.

In some embodiments, determining the target sustainability level for the building includes determining a difference between the baseline value for the sustainability performance of the building and the sustainability goal, generating, using the difference between the baseline value for the sustainability performance of the building and the sustainability goal, a sustainability value that meets the sustainability goal, and determining an amount of time to reach the sustainability value, wherein the amount of time is established by the sustainability goal.

In some embodiments, generating the plurality of energy conservation protocols includes retrieving, from a database, operational data pertaining to at least one piece of building equipment of the plurality of pieces of building equipment, determining, using the operational data pertaining to the at least one piece of building equipment of the plurality of pieces of building equipment, a role in the baseline value for the sustainability performance of the building for the at least one piece of building equipment of the plurality of pieces of building equipment, retrieving, from the database, predetermined operational metrics pertaining to the at least one piece of building equipment, detecting, using the predetermined operational metrics pertaining to the at least one piece of building equipment and the operational data pertaining to the at least one piece of building equipment, a difference between the predetermined operational metrics and the operational data, and generating, responsive to detecting the difference between the predetermined operational metrics and the operational data, a set of actions that adjust the role in the baseline value for the sustainability performance of the building for the at least one piece of building equipment by decreasing the difference between the predetermined operational metrics and the operational data.

At least one embodiment is directed to a method for reducing carbon emissions for a building. The method can include obtaining, by one or more processors, a carbon reduction goal established for the building, the building including a plurality of pieces of building equipment. The method can also include determining, by the one or more processors using a baseline carbon emission level for the building and the carbon reduction goal, a target carbon emission level for the building. The method can also include generating, by the one or more processors using the baseline carbon emission level and the target carbon emission level, a plurality of energy conservation protocols, wherein a first energy conservation protocol of the plurality of energy conservation protocols includes a plurality of actions that meet at least a portion of the carbon reduction goal or at least a portion of the target carbon emission level for the building. The method can also include receiving, by the one or more processors, an indication to accept a subset of the plurality of actions included in the first energy conservation protocol. The method can also include implementing, by the one or more processors responsive to receiving the indication to accept the subset of the plurality of actions, the subset of the plurality of actions included in the first energy conservation protocol, and detecting, by the one or more processors responsive to implementing the subset of the plurality of actions included in the first energy conservation protocol, that the building has moved towards the target carbon emission level.

In some embodiments, the method can further include detecting, by the one or more processors, that a first piece of building equipment of the plurality of pieces of building equipment has been replaced by a second piece of building equipment, wherein the second piece of building equipment performs a role similar to that of the first piece of building equipment. The method can also include determining, by the one or more processors responsive to the second piece of building equipment replacing the first piece of building equipment, an impact of the second piece of building equipment to at least one of the carbon reduction goal or the target carbon emission level, and providing, by the one or more processors to a user device, the impact of the second piece of building equipment to at least one of the carbon reduction goal or the target carbon emission level.

In some embodiments, the method can further include detecting, by the one or more processors using operational data of the building, an equipment fault condition for at least one piece of building equipment of the plurality of pieces of equipment. The method can also include determining, by the one or more processors, that the equipment fault condition impacts the carbon reduction goal. The method can also include updating, by the one or more processors, at least one energy conservation protocol of the plurality of energy conservation protocols to include a first action that addresses at least a portion of the equipment fault condition, and executing, by the one or more processors, the at least one energy conservation protocol of the plurality of energy conservation protocols, wherein the at least one energy conservation protocol of the plurality of energy conservation protocols addresses the equipment fault condition.

In embodiments, the method can further include causing, by the one or more processors, a device to display an element, wherein the element includes at least one of the carbon reduction goal, a current carbon emission level or at least one energy conservation protocol of the plurality of energy conservation protocols. The method can also include receiving, by the one or more processors, an indication to update at least a portion of the element, wherein the indication includes a user defined energy conservation protocol, and updating, by the one or more processors, the element to include the user defined energy conservation protocol.

In some embodiments, the method can further include executing, by the one or more processors, at least one energy conservation protocol of the plurality of energy conservation protocols. The method can also include determining, by the one or more processors using operational data for the building, a current carbon emission level, wherein the current carbon emission level is determined in response to a predetermined amount of time. The method can also include determining, by the one or more processors, a difference between the current carbon emission level and the baseline carbon emission level, and determining, by the one or more processors responsive to the difference being larger than a predetermined threshold, that the at least one energy conservation protocol of the plurality of energy conservation protocols has moved the sustainability of the building towards the target carbon emission level.

In some embodiments, the method can further include monitoring, by the one or more processors using operational data for the building, a status of a particular action included in at least one energy conservation protocol of the plurality of energy conservation protocols. The method can also include determining, by the one or more processors responsive to monitoring the status of the particular action, that the status of the particular action has remained the same. The method can also include causing, by the one or more processors, a device to display an element, wherein the element includes a notice to execute the particular action, and determining, by the one or more processors using second operational data for the building, that the particular action has been executed.

In some embodiments, determining the target carbon emission level for the building includes determining, by the one or more processors, a difference between the baseline carbon emission level and the carbon reduction goal, generating, by the one or more processors using the difference between the baseline carbon emission level and the carbon reduction goal, a sustainability value that meets the carbon reduction goal, and determining, by the one or more processors an amount of time to reach the sustainability value, wherein the amount of time is established by the carbon reduction goal.

In some embodiments, generating the plurality of energy conservation protocols includes retrieving, by the one or more processors from a database, operational data pertaining to at least one piece of building equipment of the plurality of pieces of building equipment, determining, by the one or more processors using the operational data pertaining to the at least one piece of building equipment of the plurality of pieces of building equipment, a role in the baseline sustainability performance for the at least one piece of building equipment of the plurality of pieces of building equipment, retrieving, by the one or more processors from the database, predetermined operational metrics pertaining to the at least one piece of building equipment, detecting, by the one or more processors using the predetermined operational metrics pertaining to the at least one piece of building equipment and the operational data pertaining to the at least one piece of building equipment, a difference between the predetermined operational metrics and the operational data, and generating, by the one or more processors responsive to detecting the difference between the predetermined operational metrics and the operational data, a set of actions that adjust the role in the baseline sustainability performance for the at least one piece of building equipment by decreasing the difference between the predetermined operational metrics and the operational data.

At least one embodiment is directed to one or more non-transitory storage media. The one or more non-transitory storage media can have instructions stored thereon. The instructions can, when executed by one or more processors, cause the one or more processors to implement operations including obtaining a sustainability goal established for a building, the building including a plurality of pieces of building equipment, and wherein the sustainability goal pertains to a sustainability performance of the building. The operations can also include determining, using a baseline value for the sustainability performance of the building and the sustainability goal, a target sustainability level for the building. The operations can also include generating, using the baseline value for the sustainability performance of the building and the target sustainability level, a plurality of energy conservation protocols, wherein a first energy conservation protocol of the plurality of energy conservation protocols includes a plurality of actions that meet at least a portion of the sustainability goal or at least a portion of the target sustainability level for the building. The operations can also include receiving an indication to accept a subset of the plurality of actions included in the first energy conservation protocol. The operations can also include controlling, using a plurality of control actions that pertain to the subset of the plurality of actions included in the first energy conservation protocol, at least one piece of building equipment of the plurality of pieces of building equipment, and detecting, responsive to controlling the at least one piece of building equipment of the plurality of pieces of building equipment, that the building has moved towards the target sustainability level.

In some embodiments, the operations can further include detecting that a first piece of building equipment of the plurality of pieces of building equipment has been replaced by a second piece of building equipment, wherein the second piece of building equipment performs a role similar to that of the first piece of building equipment. The operations can also include determining, responsive to the second piece of building equipment replacing the first piece of building equipment, an impact of the second piece of building equipment to at least one of the sustainability goal or the target sustainability level, and providing, to a user device, the impact of the second piece of building equipment to at least one of the sustainability goal or the target sustainability level.

In some embodiments, the operations can further include detecting, using operational data of the building, an equipment fault condition for at least one piece of building equipment of the plurality of pieces of equipment. The operations can also include determining that the equipment fault condition impacts the sustainability goal. The operations can also include updating at least one energy conservation protocol of the plurality of energy conservation protocols to include a first action that addresses at least a portion of the equipment fault condition, and executing the at least one energy conservation protocol of the plurality of energy conservation protocols, wherein the at least one energy conservation protocol of the plurality of energy conservation protocols addresses the equipment fault condition.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 14 is a user interface displaying an improvement measures plan dashboard, according to an exemplary embodiment.

FIG. 15 is a user interface displaying an improvement measures plan dashboard, according to an exemplary embodiment.

FIG. 16 is a user interface displaying an improvement measures plan dashboard, according to an exemplary embodiment.

FIG. 17 is a user interface displaying an energy conservation measure window, according to an exemplary embodiment.

FIG. 18 is a user interface displaying an energy conservation measure window, according to an exemplary embodiment.

FIG. 19 is a user interface displaying an energy conservation measure window, according to an exemplary embodiment.

FIG. 20 is a user interface displaying an energy conservation measure window, according to an exemplary embodiment.

FIG. 21 is a user interface displaying a description window that pertains to an energy conservation measure, according to an exemplary embodiment.

FIG. 22 is a user interface displaying a description window that pertains to an energy conservation measure, according to an exemplary embodiment.

FIG. 23 is a user interface displaying a customization window that pertains to an improvement plan, according to an exemplary embodiment.

FIG. 24 is a user interface displaying a customization window that pertains to an improvement plan, according to an exemplary embodiment.

FIG. 25 is a user interface displaying an improvement measures plan dashboard, according to an exemplary embodiment.

FIG. 26 is a user interface displaying an improvement measures plan dashboard, according to an exemplary embodiment.

FIG. 27 is a user interface displaying an improvement measures plan dashboard, according to an exemplary embodiment.

FIG. 29 is a user interface displaying an improvement measures plan dashboard, according to an exemplary embodiment.

FIG. 30 is a user interface displaying an improvement measures plan dashboard, according to an exemplary embodiment.

FIG. 31 is a user interface displaying an improvement measures plan dashboard, according to an exemplary embodiment.

FIG. 32 is a user interface displaying an improvement measures plan dashboard, according to an exemplary embodiment.

FIG. 33 is a user interface displaying an improvement measures plan dashboard, according to an exemplary embodiment.

FIG. 35 is a user interface displaying an improvement measures plan dashboard, according to an exemplary embodiment.

FIG. 38 is a user interface displaying an improvement measures plan dashboard, according to an exemplary embodiment.

FIG. 39 is a user interface displaying an energy conservation window, according to an exemplary embodiment.

FIG. 41 is a user interface displaying an improvement measures plan dashboard, according to an exemplary embodiment.

FIG. 44 is a user interface displaying an energy conservation measure window, according to an exemplary embodiment.

FIG. 45 is a user interface displaying an energy conservation measure window, according to an exemplary embodiment.

FIG. 46 is a user interface displaying an energy conservation measure window, according to an exemplary embodiment.

FIG. 47 is a user interface displaying an energy conservation measure window, according to an exemplary embodiment.

FIG. 48A is a user interface displaying an energy conservation measure window, according to an exemplary embodiment.

FIG. 48B is a user interface displaying an energy conservation measure window, according to an exemplary embodiment.

FIG. 49 is a user interface displaying an energy conservation measure window, according to an exemplary embodiment.

FIG. 53B is a user interface displaying a table including a number of energy conservation measures, according to an exemplary embodiment.

DETAILED DESCRIPTION

Referring generally to the FIGURES, systems and methods are provided for sustainability assessment and/or improvement for one or more buildings, according to various exemplary embodiments. A sustainability optimization system can be configured to collect various pieces of information regarding a building, e.g., energy supply data, on-site energy generation systems, demand data, indications of building equipment, etc. The sustainability optimization system can be configured to run an optimization on the collected data to identify improvements for the building that result in sustainable operation of the building. For example, the optimization can optimize for various metrics of the building, e.g., carbon footprint, energy usage, financial cost, etc. The result of the optimization could be to retrofit certain pieces of building equipment, install on-site solar panels, purchase renewable energy credits (RECs), generate a building control plan, etc. In some implementations, the system can additionally or alternatively provide an assessment of historical, present, and/or future sustainability performance of the building, spaces of the building, occupants of the building, equipment of the building, etc., either with or without recommendations for improving the performance.

The optimization can, in some embodiments, result in building planning that causes the building to meet a sustainability goal in a particular timeline. For example, the user may have a goal for their building to reach net-zero carbon emissions (or a predefined and/or user-defined level of carbon emissions) over a certain timeframe (e.g., the next thirty years). The optimization can run periodically, e.g., every year, to optimize over an optimization period (e.g., the next five years) and to meet the goal over the total planning period (e.g., the next thirty years). In some embodiments, the optimization can additionally or alternatively be run on request/demand of a user, upon the occurrence of certain events/targets, etc.

Building Management System and HVAC System

Figure 1:
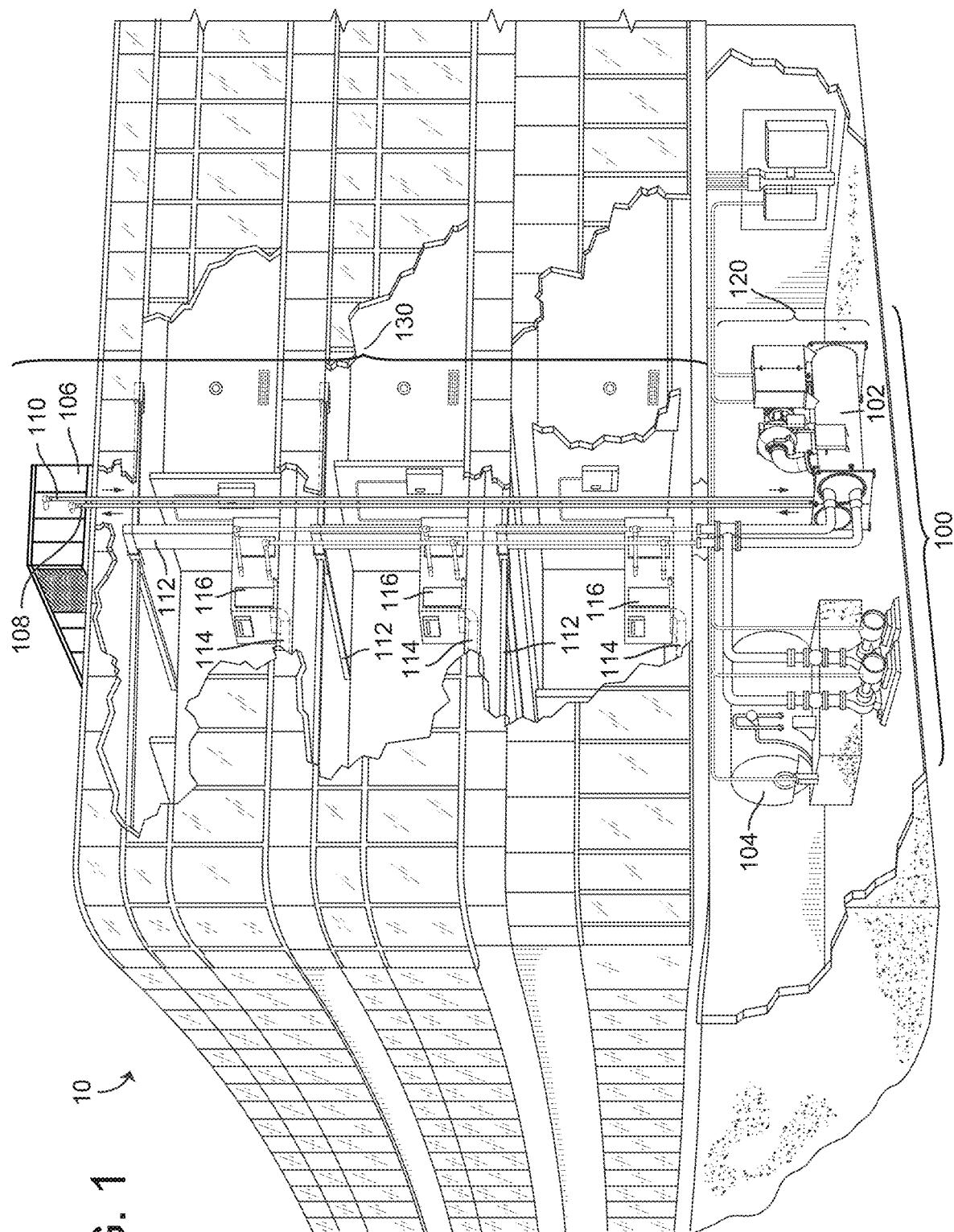
FIG. 1 is a drawing of a building equipped with a heating, ventilation, and/or air conditioning (HVAC) system, according to an exemplary embodiment.

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices, or any combination thereof.

The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
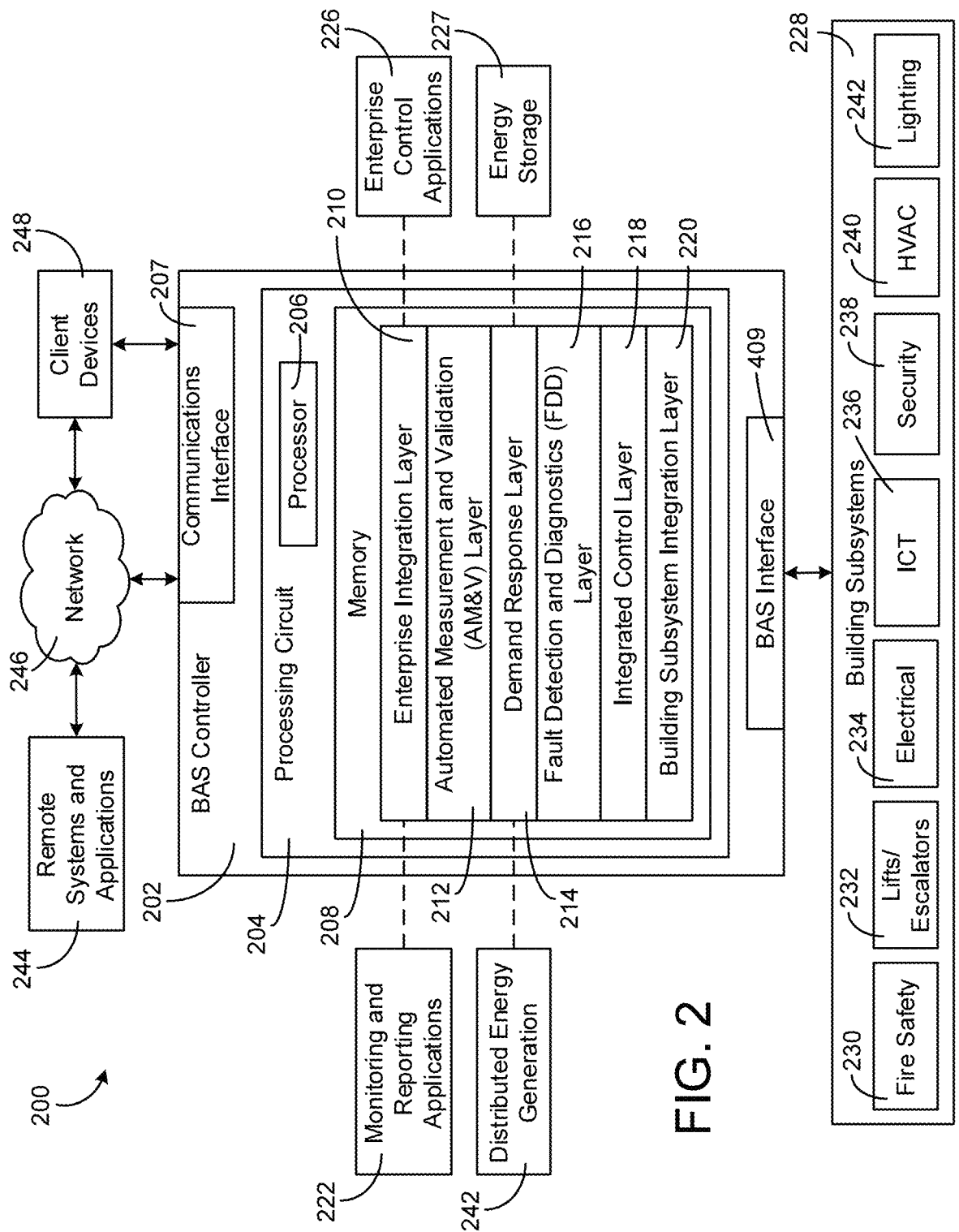
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 202 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 202 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 204 and includes computer code for executing (e.g., by processing circuit 204 and/or processor 206) one or more processes described herein.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 2 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 is configured to receive inputs from building subsystems 228 and other data sources, determine optimal control actions for building subsystems 228 based on the inputs, generate control signals based on the optimal control actions, and provide the generated control signals to building subsystems 228 in some embodiments. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translate communications (e.g., sensor data, input signals, output signals, etc.) across multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Figure 3:
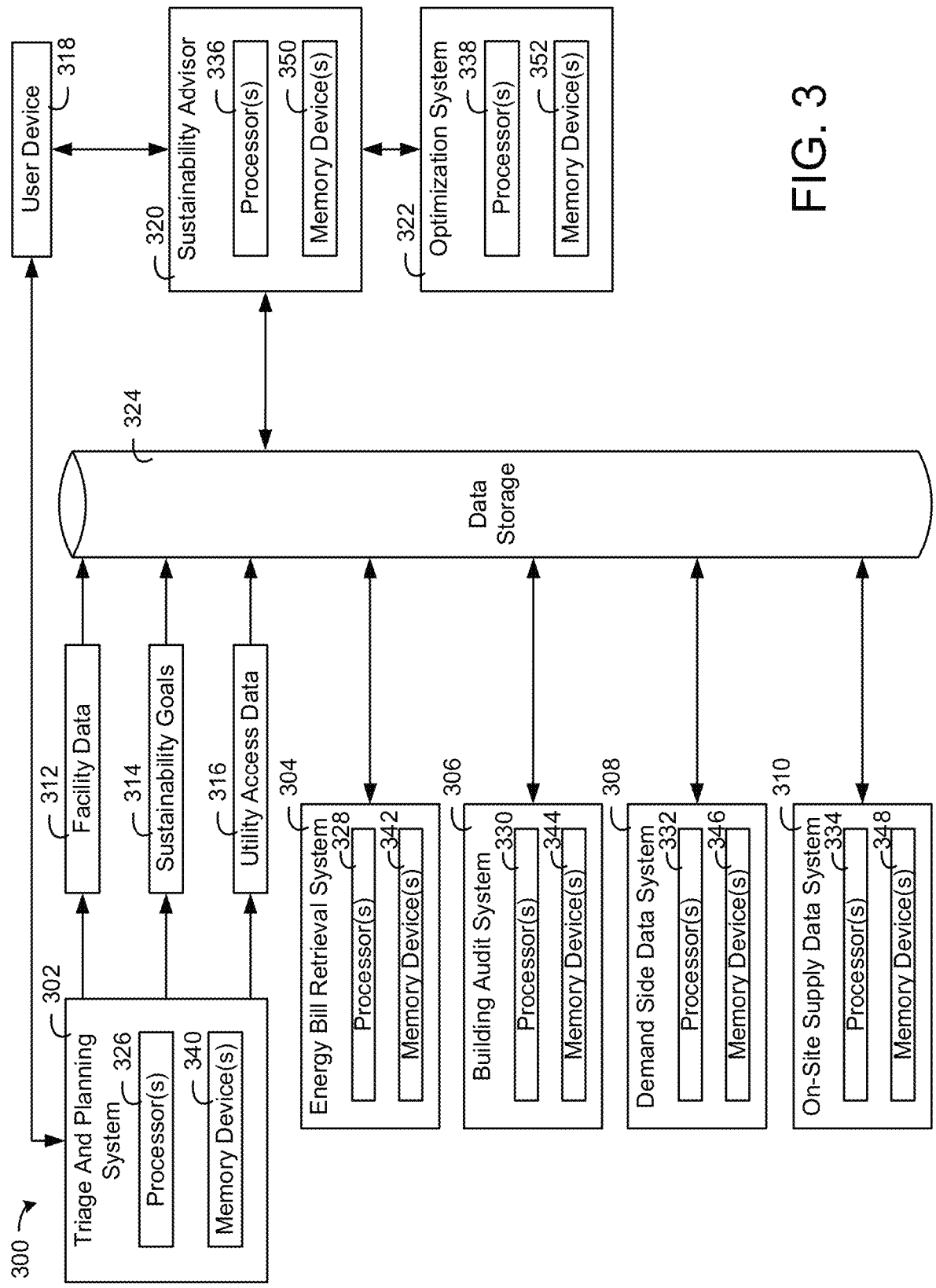
FIG. 3 is a block diagram of a system for sustainability optimization for planning a building, according to an exemplary embodiment.

Referring now to FIG. 3, a system 300 for sustainability optimization for planning a building is shown, according to an exemplary embodiment. The system 300 includes a triage and planning system 302 that is configured to interact with a user, via a user device 318. The system 300 further includes an energy bill retrieval system 304 configured to retrieve energy bills for a building. The system 300 further includes a building audit system 306 configured to collect and aggregate audit data for the building. The system 300 further includes a demand side data system 308 configured to collect demand related data from various building subsystems of a building.

Furthermore, the system 300 includes an on-site supply data system 310 configured to collect data regarding on-site supply systems of the building. Furthermore, the system 300 includes a sustainability advisor 320 configured to present sustainability related optimization results to a user via the user device 318. The system 300 includes an optimization system 322 configured to run an optimization that can identify optimal building retrofit decisions, building improvements, and/or operating plans.

The components of the system 300 can, in some embodiments, be run as instructions on one or more processors. The instructions can be stored in various memory devices. The processors can be the processors 326-338 and the memory devices can be the memory devices 340-352. The processors 326-338 can be implemented as a general purpose processor, an application specific integrated circuit (ASIC), one or more field programmable gate arrays (FPGAs), a group of processing components, or other suitable electronic processing components. The memory devices 340-352 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. The memory devices 340-352 can be or include volatile memory and/or non-volatile memory.

The memory devices 340-352 can include object code components, script components, or any other type of information structure for supporting the various activities and information structures described in the present application. According to some embodiments, the memory 406 is communicably connected to the processors 326-338 and can include computer code for executing (e.g., by the processors 326-338) one or more processes of functionality described herein.

The system 300 includes data storage 324. The data storage 324 can be a database, a data warehouse, a data lake, a data lake-house, etc. The data storage 324 can store raw data, aggregated data, annotated data, formatted data, etc. The data storage 324 can act as a repository for all data collected from the triage and planning system 302, the energy bill retrieval system 304, the building audit system 306, the demand side data system 308, the on-site supply data system 310, the sustainability advisor 320, the optimization system 322, and/or any other system. In some embodiments, the data storage 324 can, in some embodiments, be a digital twin. The digital twin can, in some embodiments, be a graph data structure. The digital twin can be the digital twin described with reference to U.S. patent application Ser. No. 17/134,664 filed Dec. 28, 2020.

The triage and planning system 302 can provide one or more user interfaces to a user via the user device 318. The user interfaces can allow the user to interact and provide various pieces of information describing a building while the building is in a design phase and/or for an onboarding phase where a user first registers with the system 300 to begin sustainability planning for their building. The triage and planning system 302 can receive facility data 312, sustainability goals 314, and/or utility access data 316. The facility data 312 can describe a building facility, e.g., provide a name of the facility or campus, identify a number of buildings in the facility or campus, identify a use of each building, include a name of each building, indicate campus layout, indicate building size, indicate building square footage, indicate campus square footage, indicate geographic location, etc.

The triage and planning system 302 can receive sustainability goals 314 from the user devices 318. The sustainability goals 314 can be customer goals for their building with respect to energy reduction, carbon creation, carbon footprint, water usage reduction, switching to renewable energy, purchasing a certain number of renewable energy credits, etc. The goals can include target levels for energy consumption, carbon production, net zero carbon emissions, renewable energy, etc. The goals can further include timelines for the various target levels. For example, the timeline could be a period of time into the future, e.g., a number of days, weeks, months, years, decades, etc. The timeline can indicate a target date. For example, the timeline could be that a building is energy independent in the next forty years, or that the building is at a net-zero carbon emissions level in the next twenty five years. In some embodiments, the timelines for the sustainability goals can be returned to the user via the user device 318 with recommendations for meeting certain goals, e.g., a recommendation could be to extend a recommendation by five years (e.g., to 25 year) to hit a certain carbon emissions level which would be more financially feasible than attempting to meet the carbon emissions level in 20 years.

Figure 4:
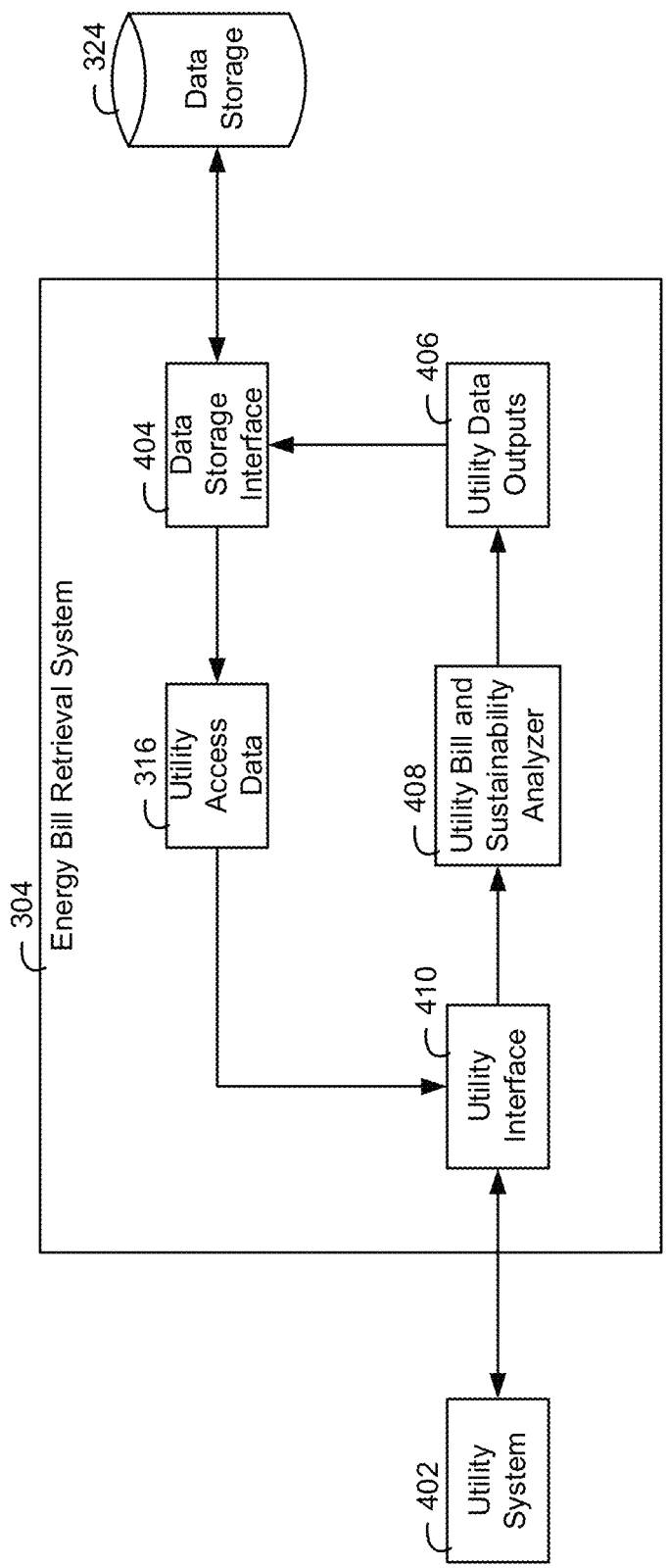
FIG. 4 is a block diagram of an energy bill retrieval system of the sustainability optimization system of FIG. 3, the energy bill retrieval system retrieving utility bills for the building, according to an exemplary embodiment.

Referring now to FIG. 4, energy bill retrieval system 304 of the sustainability optimization system 300, the energy bill retrieval system retrieves utility bills for the building, according to an exemplary embodiment. The energy bill retrieval system 304 can be configured to retrieve utility access data 316 from the data storage 324 via a data storage interface 404. The bills can be electric bills, natural gas bills, water bills, etc. The data storage interface 404 can be an interface that integrates with the data storage 324 via an application programming interface (API) or otherwise exposes and API to external systems. A utility interface 410 can receive the utility access data 316 and retrieve utility bills from a utility system 402 based on the utility access data 316. The utility access data 316 can include a username, a login credential, an email address, an access code, an account number, a name of the energy provider, etc.

A utility interface 410 can, in some embodiments, integrate with the utility system 402 via the utility access data 316. The utility bills can include electricity consumption, water consumption, gas consumption, solar power electric consumption, wind turbine electric consumption, the utility interface 410 can provide the energy bills to a utility bill and sustainability analyzer 408. The analyzer 408 can run various analytics on the utility bills.

For example, the analyzer 408 could identify invoice data, perform an audit on utility bill data, and/or perform an analysis on energy rates and/or tariffs for the energy (e.g., environmental penalties for various forms of energy). The analyzer 408 can identify an energy consumption baseline for the building, identify benchmarking for the building (e.g., compare the baseline of the building to other peer buildings or an industry to determine a benchmark index), determine facility key performance indicators (KPIs), etc.

The analyzer 408 can identify sustainability data, for example, a carbon emissions baseline for the building (e.g., carbon emissions produced from natural gas or carbon emissions from electricity consumption), sustainability benchmarking (e.g., a peer comparison of the emissions baseline for the building against other buildings), renewable energy usage tracking, etc. The analyzer 408 can generate sustainability reports (e.g., an indication between a baseline emissions and a current emissions to show sustainability tracking), management and verification (M&V) reports, etc. The results of the analysis performed by the analyzer 408 can be the utility data outputs 406 which can be stored in the data storage 324 by the data storage interface 404. In some embodiments, the M&V reporting could illustrate savings between a baseline and an improvement for the building. For example, the M&V reporting could indicate a carbon emissions reduction that results (compared to a baseline) from a particular FIM.

Figure 5:
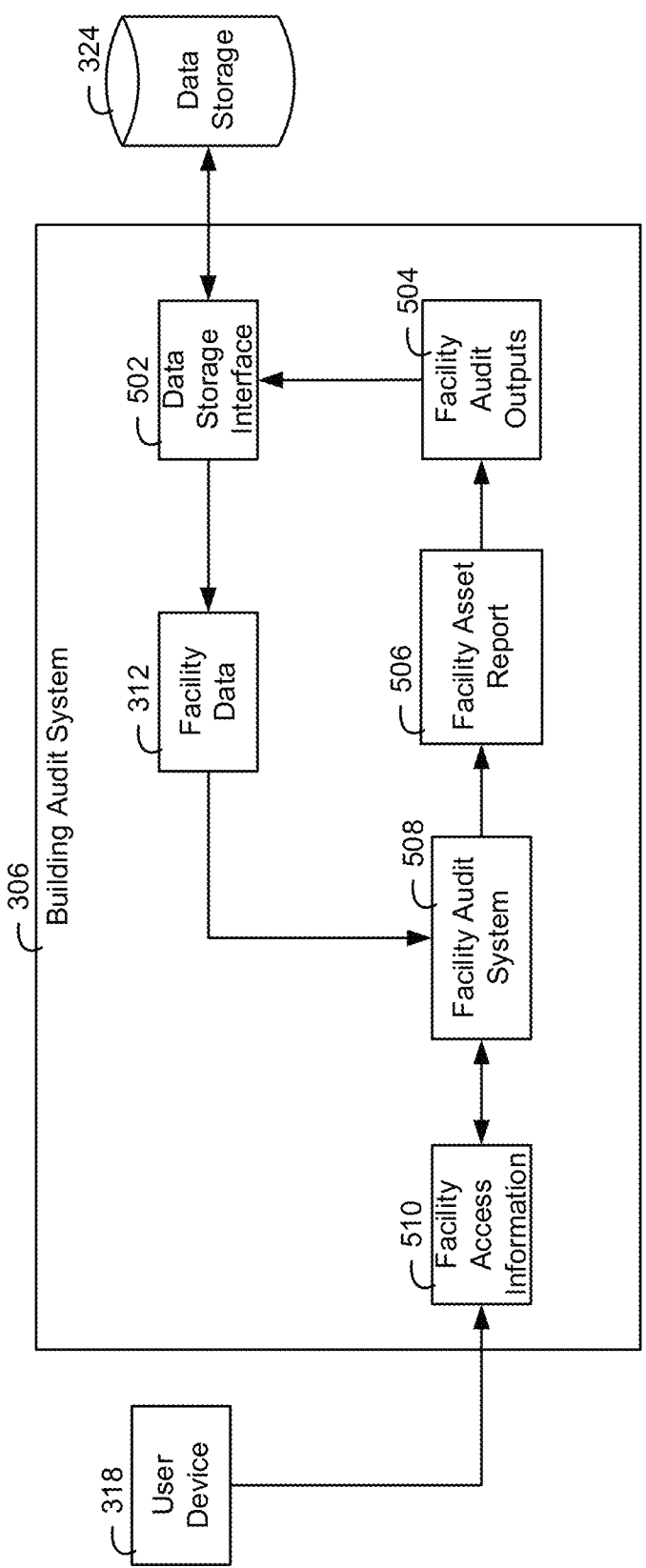
FIG. 5 is a block diagram of a building audit system of the system of FIG. 3, the facility audit system configured to collect building data of the building via an audit, according to an exemplary embodiment.

Referring now to FIG. 5, the building audit system 306 of the system 300 is shown, the facility audit system 306 is configured to collect building data of the building via an audit, according to an exemplary embodiment. The building audit system 306 includes a data storage interface 502 that can be the same as, or similar to the data storage interface 404. The interface 504 can retrieve the facility data 312 from the data storage 324. The facility data 312 can be provided to a facility audit system 508. Furthermore, a user, via the user device 318, can provide facility access information 510 (e.g., key codes, registration details, access directions, etc.) to the facility audit system 508. The facility audit system 508 can receive audit details from audit personnel who visit the physical building and record information regarding the building.

Based on the audit data collected by the audit personnel and provided to facility audit system 508, the facility audit system 508 can compile a facility asset report 506. The facility asset report can include information such as a detailed facility description. The facility description can identify each room, zone, and/or floor of a building and indicate the square footage and/or ceiling height of each area of the building. The report 506 can include an equipment inventory. The equipment inventory can indicate the number, make, model, etc. of each piece of equipment in the building. For example, the number and type of chillers in the building could be indicated in the report 506. Furthermore, a maintenance log of all maintenance operations of equipment inventory can be included in the report 506. Furthermore, the report 506 could include photos of all pieces of equipment of the building. The report 506 could further include building envelop information. The result of all the audit outputs of the system 508, including the facility asset report 506, can be stored in the data storage 324 by the data storage interface 502.

Figure 6:
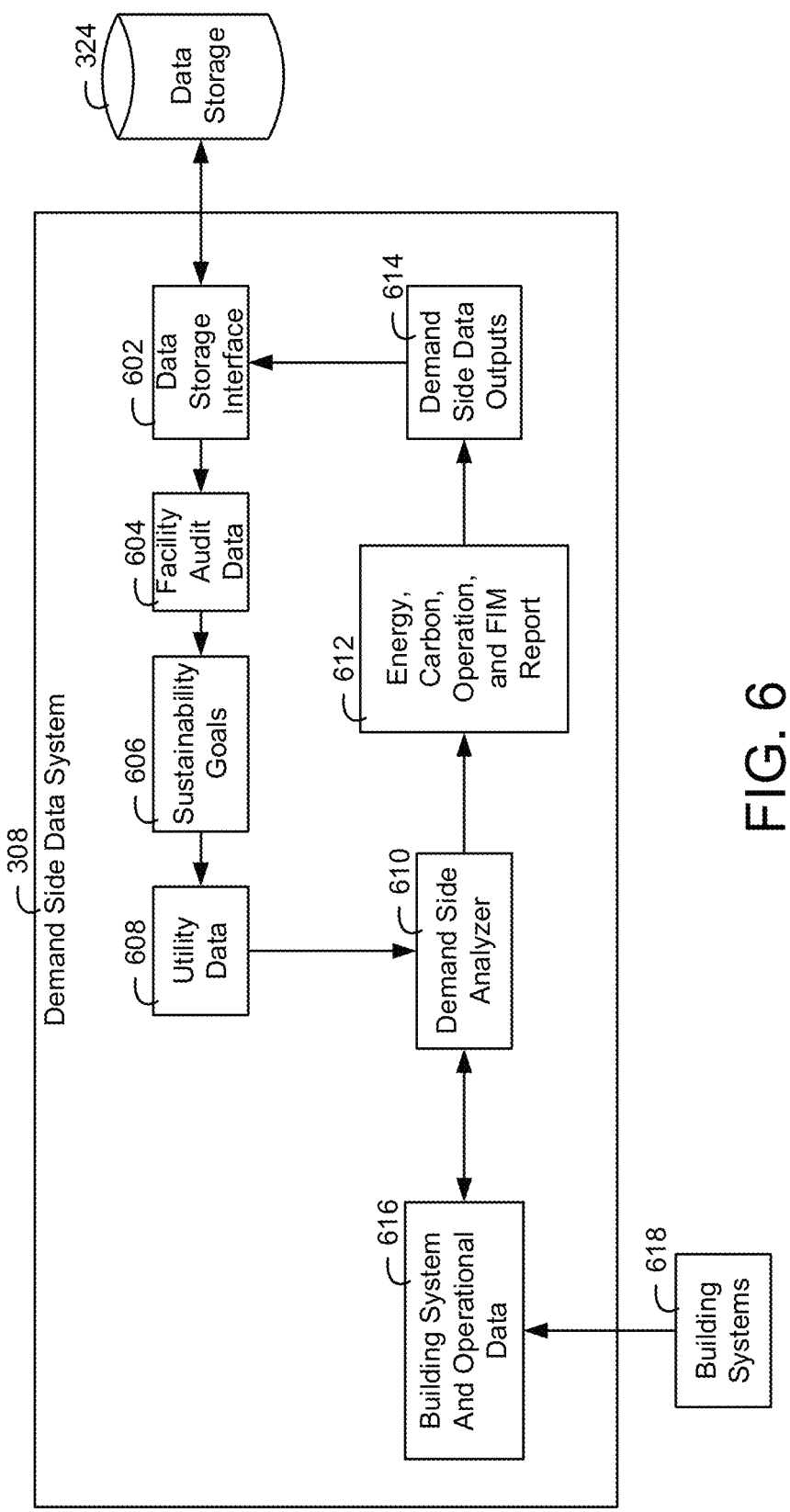
FIG. 6 is a block diagram of a demand side data system of the system of FIG. 3, the demand side data system configured to collect building system and operational data from a building and calculate energy metrics, carbon metrics, operational metrics, and facility improvement measures (FIMs) for the building, according to an exemplary embodiment.

Referring now to FIG. 6, a demand side data system 308 of the system 300, the demand side data system configured to collect building system and operational data from a building and calculate energy metrics, carbon metrics, operational metrics, and facility improvement measures (FIMs) for the building, according to an exemplary embodiment. The system 308 can retrieve facility audit data 604, sustainability goals 606, and/or utility data 608 from the data storage 324 via the data storage interface 602. The data storage interface 602 can be the same as, or similar to, the data storage interface 404. A demand side analyzer 610 can receive the data 602-608. Furthermore, the demand side analyzer 610 can receive building system and/or operational data 616 from the building systems 618. The building system and/or operational data 616 could be metadata for building systems, operating settings for the building systems, runtime data for the building systems, energy usage for the building systems 618, etc. The building systems 618 can be fire safety systems, environmental cooling systems, environmental heating systems, ventilation systems, lighting systems, etc. The building systems 618 can be the systems described with reference to FIGS. 1 and 2.

The demand side analyzer 610 can run an analysis based on the demand related data 602-608 and the building system and/or operational data 616. The analyzer 610 can generate the report 612. The report 612 can indicate an energy breakdown and/or carbon breakdown for demand related systems of the building, e.g., systems that consume energy. The report 612 can indicate an energy consumption level and/or a carbon emissions level for cooling systems of a building, heating systems of a building, lighting systems of the building, etc. The energy consumption level and/or carbon emission level can attribute a portion (e.g., a percentage) of total building energy consumption and/or carbon emissions to specific pieces of equipment, equipment subsystems, subsystem types, building operation modes (heating or cooling), etc.

The analyzer 610 can further identify facility improvement measures (FIMs) for improving and/or reducing energy usage and/or carbon emissions of the building. The FIMs could be replacing a boiler with a newer energy efficient boiler which would result in a particular reduction in energy consumption and/or carbon emission. Furthermore, the analyzer 610 can identify operational improvements, e.g., reducing a temperature setpoint by one degree Fahrenheit during heating over a particular time period to result in a particular energy reduction and/or carbon emissions production. The report 612 can include savings reports. The report 612 can be provided as a demand side data outputs 614 to the interface 602. The interface 602 can store the outputs 614 in the data storage 324. In some embodiments, if the demand side data system 308 is unable to pull data from the building systems 618, the building audit system 306 retrieves the data (e.g., via manual reporting, such as from a building manager, or via other methods).

Figure 7:
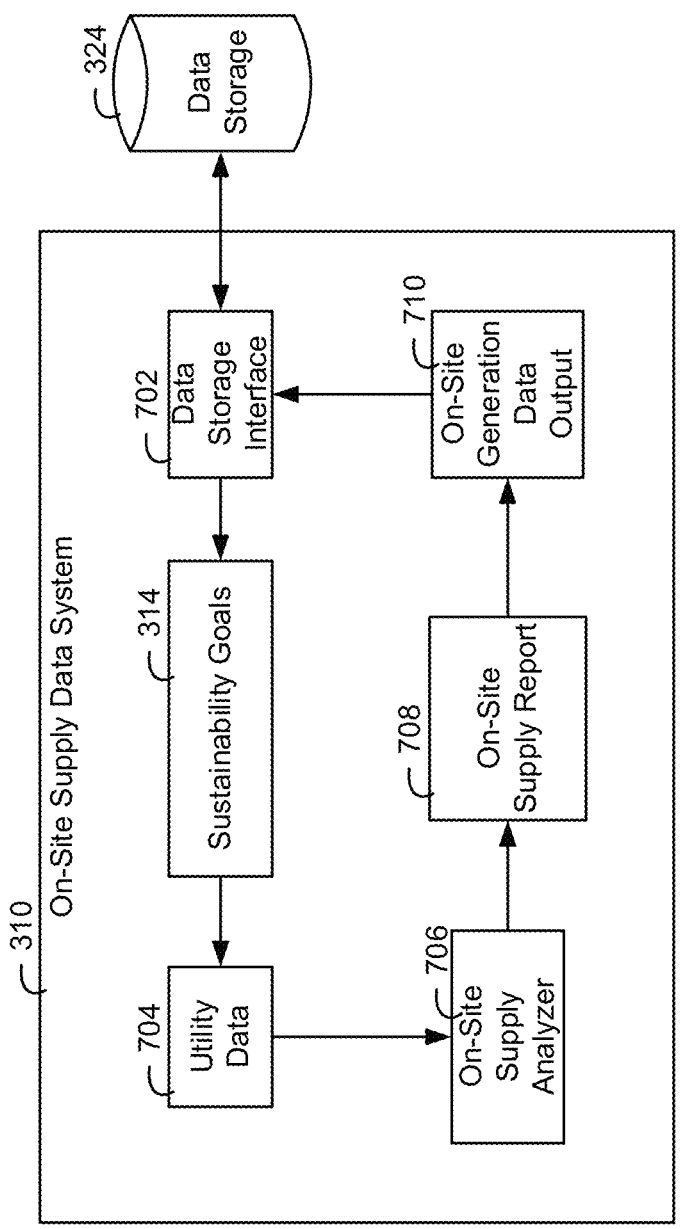
FIG. 7 is a block diagram of an on-site supply data system of the system of FIG. 3, the on-site supply system configured to collect data from an on-site energy supply system for the building, according to an exemplary embodiment.

Referring now to FIG. 7, the on-site supply data system 310 is shown, the on-site supply data system 310 is configured to collect data regarding an on-site energy supply system for the building, according to an exemplary embodiment. The on-site supply data system 310 can include a data storage interface 702 configured to retrieve data from the data storage 324, e.g., the sustainability goals 314 and/or utility data 704 determined by the system 304. The interface 702 can be similar to or the same as the interface 404 described with reference to FIG. 4.

An on-site supply analyzer 706 can analyze the utility data 704 and/or the sustainability goals 314 to determine an on-site supply report 708 that can be stored as on-site generation data output 710 in the data storage 324 by the interface 702. The analyzer 706 can analyze the utility data 704 and/or the sustainability goals 314 to identify opportunities to reduce energy usage and/or carbon emissions through on-site energy supply systems, e.g., solar panels, wind power, hydro-electric dams, re-chargeable batteries, etc. The analyzer 706 can identify opportunities to shift power consumption from an energy grid to an on-site energy supply system.

The report 708 can include the results of an analysis on solar photovoltaic (PV) cells, fuel cells, energy storage, etc. The report 708 can further indicate a renewable energy report, e.g., reports on opportunities to shift energy consumption of the building to renewable energy sources that are on-site. The report 708 can further indicate cost savings for energy, e.g., if solar PV cells were installed in a building, how much financial savings in energy cost would result. Furthermore, the report 708 can indicate sustainability data, e.g., how much carbon savings or carbon production would result from consuming various amounts of energy from on-site PV cells, on-site wind turbines, etc.

Figure 8:
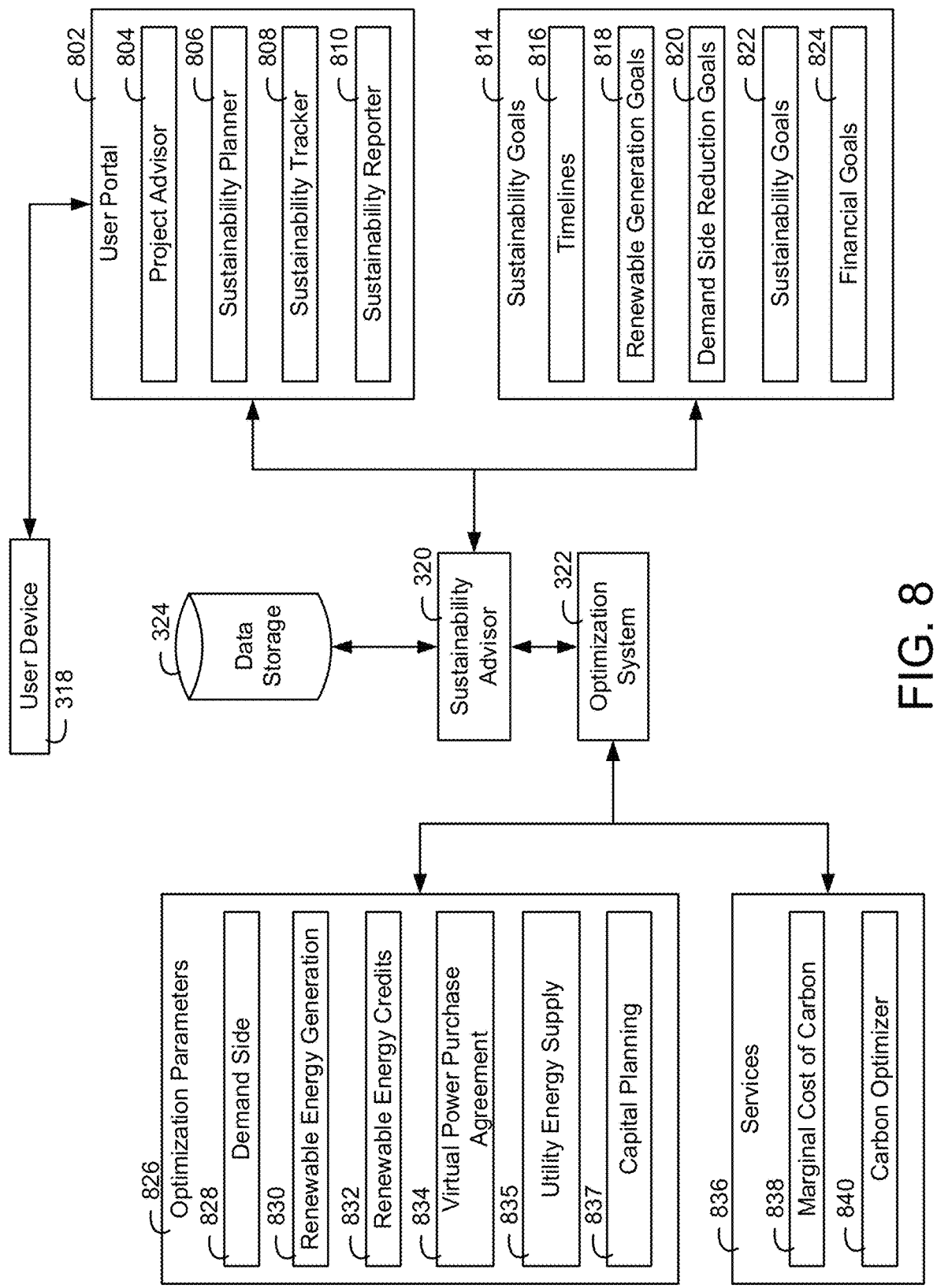
FIG. 8 is a block diagram of a sustainability advisor and an optimization system of the system of FIG. 3, the sustainability advisor configured to provide sustainability data to a user and receive input from the user and the optimization system configured to run sustainability optimizations for the building, according to an exemplary embodiment.

Referring now to FIG. 8, the sustainability advisor 320 and the optimization system 322 are shown, the sustainability advisor 320 is configured to provide sustainability data to a user and receive input from the user and the optimization system 322 is configured to run sustainability optimizations for the building, according to an exemplary embodiment. The sustainability advisor 320 is configured to retrieve data from the data storage 324 (e.g., the data described with reference to FIGS. 3-7) and cause the optimization system 322 to run optimizations based on the data. The sustainability advisor 320 can be configured to manage a user portal 802 which can provide various pieces of information to a user and receive input from the user.

The user portal 802 can interact with a user by causing the user device 318 to display various user interfaces with information regarding cost improvements, energy reduction improvements, and/or carbon emissions reduction improvements for the building. The information displayed in the user portal 802 can be based on the results of the optimizations run by the optimization system 322. The portal 802 can provide various reports and/or recommendations to the user (e.g., recommended FIMs, recommendations to purchase renewable energy credits (RECs), recommendations to adopt updated control strategies, etc.) for planning the construction, retrofit, and/or operation of a building to meet one or more sustainability goals.

The project advisor 804 can allow a user to review, define, and/or update a project. The project may be to plan sustainability for a particular building and/or building. The advisor 804 can allow a user to set and/or update their sustainability goals. Furthermore, the advisor 804 can allow a user to review their progress in meeting the sustainability goals for their project.

The sustainability planner 806 can provide a plan for meeting sustainability goals for a particular project. The plan generated by the sustainability planner 806 can be based on the optimizations run by the optimization system 322. In some embodiments, the plan generated by the sustainability planner 806 can be a plan for a time horizon, e.g., a thirty year plan, a twenty year plan, etc. The plan can provide the steps for meeting the sustainability goal of the user. The steps can indicate what equipment retrofits should be performed at a present time or at a specified time in the future, how many RECs should be purchased every year or every decade, what control schemes should be adopted, etc. As time passes, the sustainability planner 806 can update the sustainability plan based on new optimizations run by the optimization system 322. This can keep the plan on track to meet a goal as the environment or technology changes and allows the user to meet their goals in more cost effective manners. The planner 806 can generate plans based on the sustainability planning data 814.

The sustainability tracker 808 can track the progress of the building towards meeting various sustainability goals. The sustainability tracker 808 can, in some embodiments, retrieve operational building data from the data storage 324, energy bills from the data storage 324, receipts of REC purchases from the data storage 324, etc. The sustainability tracker 808 can identify carbon emissions levels for a building at various times in the past and/or at the present. The sustainability tracker 808 can identify a level of renewable energy consumed by the building at times in the past and/or at the present. Furthermore, the sustainability tracker 808 can identify a level of energy consumed by the building at times in the past and/or at the present. The sustainability tracker 808 can provide a user with a historical trend of the sustainability progress of the building towards the one or more sustainability goals.

The user portal 802 includes a sustainability reporter 810. The sustainability report generator 804 can generate various reports indicating sustainability information for the building. The report can indicate a construction plan, retrofit plan, and/or operational plan for a building, e.g., the amounts of energy to consume from various different energy sources, indications of RECs to purchase, indications of equipment retrofits, indications of physical building retrofits (e.g., energy efficient windows, energy efficient insulation, etc.), indications of new equipment installation (e.g., on-site PV cells, on-site wind turbines, etc.). The report generated by the generator 804 can indicate how the plan meets one or more sustainability, energy efficiency, and/or financial goals of the user. The reporter 810 can include a summary report of sustainability planning for the building. The reporter 810 can compile a report based on the data generated by the components 804-808.

The sustainability planning data 814 includes the planning data that can be used to run the optimization system 322. The planning data 814 can indicate the various goals and/or expectations of the user. The optimization run by the optimization system 322 can use the planning data 814 as constraints for an optimization, e.g., run an optimization that results in a plan that meets or exceeds the various goals and/or expectations. In some embodiments, the optimization can find a sustainability plan for the building that meets the various sustainability goals of the user at a minimum financial cost.

The sustainability planning data 814 can be or can be based on the sustainability goals 314. The timelines 816 can indicate the length of time that the user wants the building to meet various goals (e.g., the goals 818-824). The renewable generation goals 818 indicate a level of energy consumption by the building that the user wants to be generated from renewable energy sources (e.g., solar, wind, etc.). The demand side reduction goals 820 can indicate goals for the demand side systems, e.g., that the demand side systems be energy efficient (e.g., that lighting systems of the building include energy efficient light bulbs). The sustainability goals 822 can be a goal that the operation of the building creates a level of carbon emission, net zero emissions goals, etc. The financial goals 824 can indicate financial goals of the building, e.g., annual energy costs, monthly energy costs, etc.

The optimization parameters 826 include demand side parameters 828 related to the energy demand of a building. The demand side parameters 828 can indicate different types of building equipment retrofits, building equipment maintenance operations, new building equipment installation, building equipment replacement, etc. The demand side parameters 828 can indicate actions that can be taken to modify, change, and/or update the demand side equipment of the building. The parameters 828 can further be linked to renewable energy generation, carbon emissions, energy usage, etc.

The renewable energy generation 830 can indicate parameters for installing renewable energy generation equipment at the building. The parameters 830 can further indicate allocations of energy consumption between external power generation systems, e.g., coal power, hydroelectric power, PV cell systems, wind power systems, etc. The parameters 830 can be linked to various levels of carbon emissions, financial cost, etc.

The parameters 826 include renewable energy credits 832. The renewable energy credits 832 can be various different types of RECs that could be purchased for the building. The parameters can indicate carbon emissions reduction resulting from purchasing RECs and/or financial return from RECs sold by the building. For example, if the building includes on-site renewable energy generation, the building could sell RECs, in some embodiments. Furthermore, the parameters 826 include a virtual power purchase agreement 834 which can represent an agreed price for renewable energy generation. The parameters can further indicate capital planning 837, e.g., plans for replacing, purchasing, and/or repairing capital of the building (e.g., lighting of the building, conference rooms of the building, audio visual systems, insulation of the building, chillers for the building, AHUs for the building, etc.)

The optimization system 322 can include model services 836. The services 836 can include a marginal cost of carbon 838. The marginal cost of carbon 838 can indicate how much carbon emissions results from the next amount of energy consumed by the building. The marginal cost of carbon can be calculated for external utility services and/or on-site energy generation systems of the building. The marginal cost of carbon can be identified from the various energy bills and/or operational decisions of the building. The marginal cost of carbon can, in some embodiments, be based on the optimization parameters 826. The carbon optimizer 840 can run an optimization that identifies decisions for the parameters 826 that results in a particular carbon emissions level. The optimization can be run for a year, five years, ten years into the future, tec. The optimization can be run to slowly reduce the carbon emissions by a particular level every year so that a particular carbon emissions goal is met in the future. The optimization can be run based on the sustainability goals 814 such that the decisions for the parameters 826 are such that the goals 814 are met.

Figure 9:
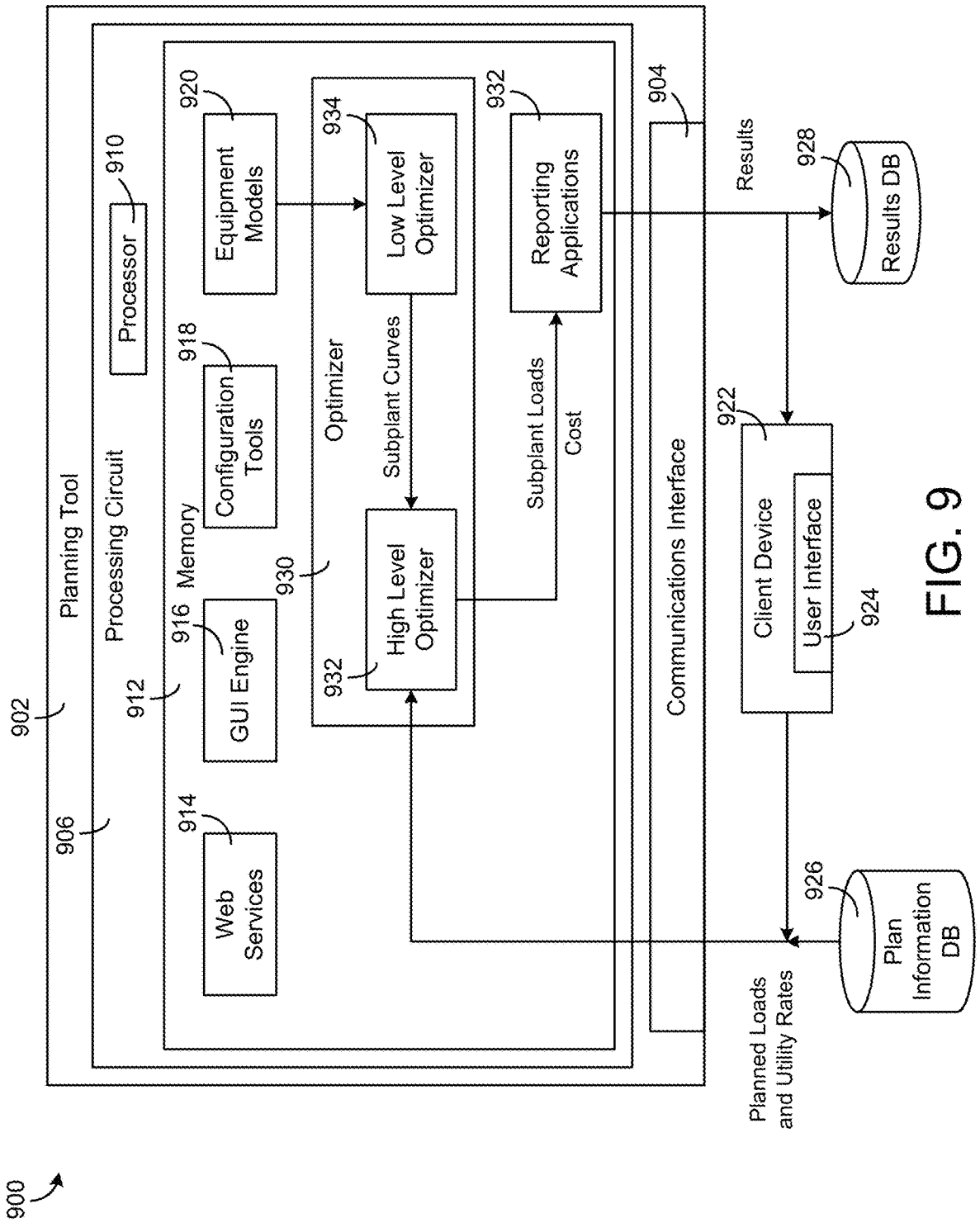
FIG. 9 is a block diagram of a planning tool which can be used to determine the benefits of investing in a battery asset and calculate various financial metrics associated with the investment, according to an exemplary embodiment.
Figure 10:
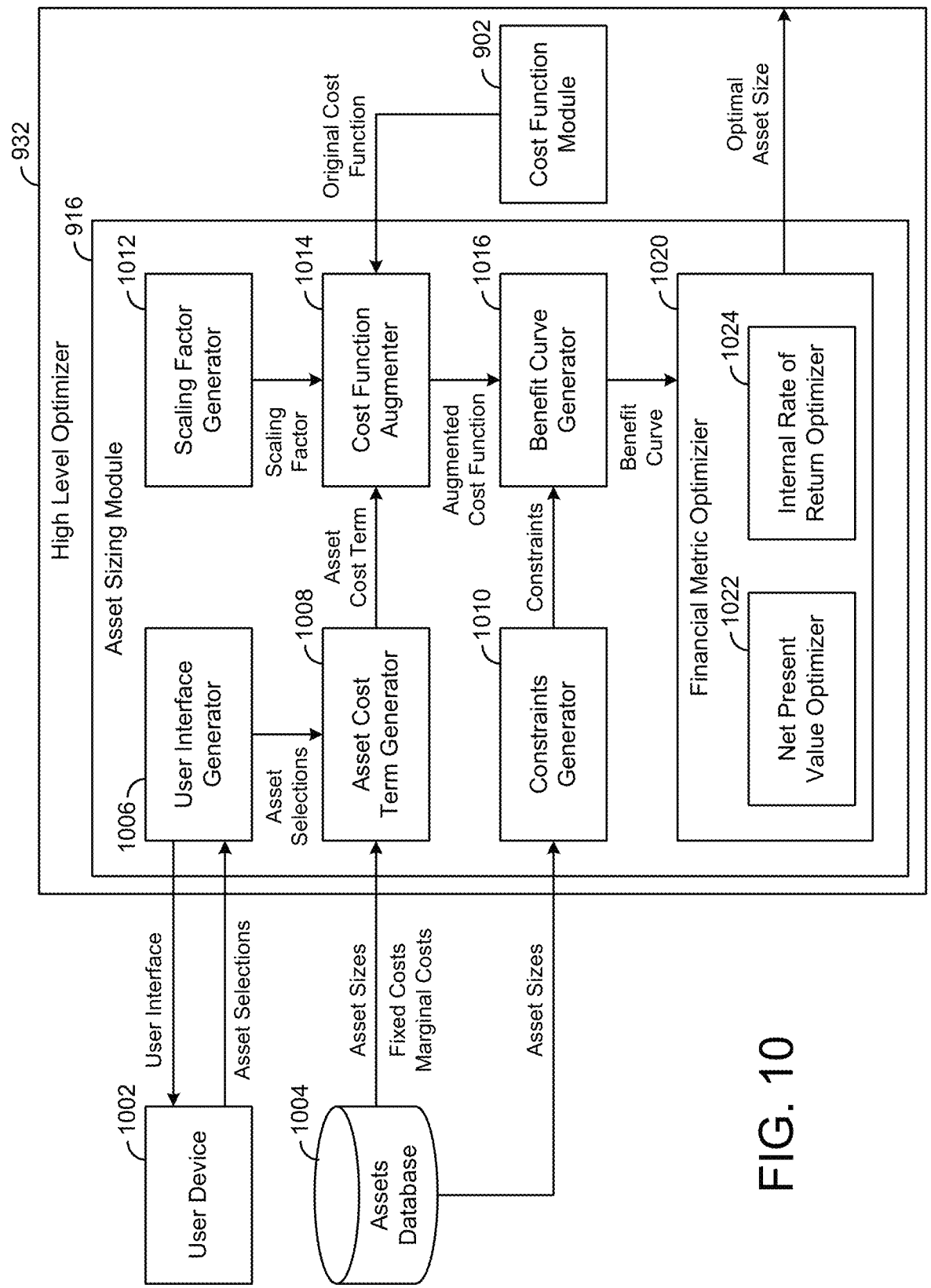
FIG. 10 is a block diagram illustrating the asset sizing module, according to an exemplary embodiment.

In some embodiments, the optimization run by the optimization system 322 can be based on the optimization described in FIGS. 9 and 10. The optimization can be run with the various linear programming techniques described in FIGS. 9 and 10. Furthermore, the optimization of the optimization system 322 can be based on, and/or can utilize, the techniques described in U.S. patent application Ser. No. 16/518,314 filed Jul. 22, 2019, the entirety of which is incorporated by reference herein.

Referring now to FIG. 9, a block diagram of a planning system 900 is shown, according to an exemplary embodiment. Planning system 900 may be configured to use optimizer 930 as part of a planning tool 902 to simulate the operation of a central plant over a predetermined time period (e.g., a day, a month, a week, a year, etc.) for planning, budgeting, and/or design considerations. The optimizer 930 can optimize for planning a building, e.g., identify construction decisions, retrofit decisions, control plans, etc. The optimizer 930 can run an optimization to minimize carbon emissions, minimize energy consumption, minimize energy cost, maximize renewable energy use, etc. In some embodiments, the optimizer 930 can consider building load in addition to sustainability related features. For example, optimizer 930 may use building loads and utility rates to determine an optimal resource allocation to minimize cost over a simulation period. However, planning tool 902 may not be responsible for real-time control of a building management system or central plant, in some embodiments, while in other embodiments planning tool 902 may provide real-time or near real-time control of a building management system or portions thereof to help achieve the particular goals. In some implementations, planning tool 902 may provide actionable insights or suggestions that, upon approval by a user, are automatically implemented by the building management system or automatically generate changes to a building plan (e.g., pre-construction building plan).

Planning tool 902 can be configured to determine the benefits of investing in a battery asset and the financial metrics associated with the investment. Such financial metrics can include, for example, the internal rate of return (IRR), net present value (NPV), and/or simple payback period (SPP). Planning tool 902 can also assist a user in determining the size of the battery which yields optimal financial metrics such as maximum NPV or a minimum SPP. In some embodiments, planning tool 902 allows a user to specify a battery size and automatically determines the benefits of the battery asset from participating in selected IBDR programs while performing PBDR. In some embodiments, planning tool 902 is configured to determine the battery size that minimizes SPP given the IBDR programs selected and the requirement of performing PBDR. In some embodiments, planning tool 902 is configured to determine the battery size that maximizes NPV given the IBDR programs selected and the requirement of performing PBDR.

In planning tool 902, high level optimizer 932 may receive planned loads and utility rates for the entire simulation period. The planned loads and utility rates may be defined by input received from a user via a client device 922 (e.g., user-defined, user selected, etc.) and/or retrieved from a plan information database 926. High level optimizer 932 uses the planned loads and utility rates in conjunction with subplant curves from low level optimizer 934 to determine an optimal resource allocation (i.e., an optimal dispatch schedule) for a portion of the simulation period. The low level optimizer 934 can receive equipment models 920, in some embodiments.

The portion of the simulation period over which high level optimizer 932 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 932 requests all of the subplant curves used in the simulation from low level optimizer 934 at the beginning of the simulation. Since the planned loads and environmental conditions are known for the entire simulation period, high level optimizer 932 may retrieve all of the relevant subplant curves at the beginning of the simulation. In some embodiments, low level optimizer 934 generates functions that map subplant production to equipment level production and resource use when the subplant curves are provided to high level optimizer 932. These subplant to equipment functions may be used to calculate the individual equipment production and resource use (e.g., in a post-processing module) based on the results of the simulation.

Still referring to FIG. 9, planning tool 902 is shown to include a communications interface 904 and a processing circuit 906. Communications interface 904 may include wired or wireless interfaces (e.g., jacks, antennas, transmitters, receivers, transceivers, wire terminals, etc.) for conducting data communications with various systems, devices, or networks. For example, communications interface 904 may include an Ethernet card and port for sending and receiving data via an Ethernet-based communications network and/or a WiFi transceiver for communicating via a wireless communications network. Communications interface 904 may be configured to communicate via local area networks or wide area networks (e.g., the Internet, a building WAN, etc.) and may use a variety of communications protocols (e.g., BACnet, IP, LON, etc.).

Communications interface 904 may be a network interface configured to facilitate electronic data communications between planning tool 902 and various external systems or devices (e.g., client device 922, results database 928, plan information database 926, etc.). For example, planning tool 902 may receive planned loads and utility rates from client device 922 and/or plan information database 926 via communications interface 904. Planning tool 902 may use communications interface 904 to output results of the simulation to client device 922 and/or to store the results in results database 928.

Still referring to FIG. 9, processing circuit 906 is shown to include a processor 910 and memory 912. Processor 910 may be a general purpose or specific purpose processor, an application specific integrated circuit (ASIC), one or more field programmable gate arrays (FPGAs), a group of processing components, or other suitable processing components. Processor 910 may be configured to execute computer code or instructions stored in memory 912 or received from other computer readable media (e.g., CDROM, network storage, a remote server, etc.).

Memory 912 may include one or more devices (e.g., memory units, memory devices, storage devices, etc.) for storing data and/or computer code for completing and/or facilitating the various processes described in the present disclosure. Memory 912 may include random access memory (RAM), read-only memory (ROM), hard drive storage, temporary storage, non-volatile memory, flash memory, optical memory, or any other suitable memory for storing software objects and/or computer instructions. Memory 912 may include database components, object code components, script components, or any other type of information structure for supporting the various activities and information structures described in the present disclosure. Memory 912 may be communicably connected to processor 910 via processing circuit 906 and may include computer code for executing (e.g., by processor 910) one or more processes described herein.

Still referring to FIG. 9, memory 912 is shown to include a GUI engine 916, web services 914, and configuration tools 918. In an exemplary embodiment, GUI engine 916 includes a graphical user interface component configured to provide graphical user interfaces to a user for selecting or defining plan information for the simulation (e.g., planned loads, utility rates, environmental conditions, etc.). Web services 914 may allow a user to interact with planning tool 902 via a web portal and/or from a remote system or device (e.g., an enterprise control application).

Configuration tools 918 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 918 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 926) and adapt it or enable it for use in the simulation.

Still referring to FIG. 9, memory 912 is shown to include optimizer 930. Optimizer 930 may use the planned loads and utility rates to determine an optimal resource allocation over a prediction window. With each iteration of the optimization process, optimizer 930 may shift the prediction window forward and apply the optimal resource allocation for the portion of the simulation period no longer in the prediction window. Optimizer 930 may use the new plan information at the end of the prediction window to perform the next iteration of the optimization process. Optimizer 930 may output the applied resource allocation to reporting applications 932 for presentation to a client device 922 (e.g., via user interface 924) or storage in results database 928.

Still referring to FIG. 9, memory 912 is shown to include reporting applications 932. Reporting applications 932 may receive the optimized resource allocations from optimizer 930 and, in some embodiments, costs associated with the optimized resource allocations. Reporting applications 932 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation.

Referring now to FIG. 10, a block diagram illustrating asset sizing module 916 in greater detail is shown, according to an exemplary embodiment. Asset sizing module 916 can be configured to determine the optimal sizes of various assets in a building, group of buildings, or a central plant. As described above, assets can include individual pieces of equipment (e.g., boilers, chillers, heat recovery chillers, steam generators, electrical generators, thermal energy storage tanks, batteries, etc.), groups of equipment, or entire subplants of a central plant. Asset sizes can include a maximum loading of the asset (e.g., maximum power, maximum charge/discharge rate) and/or a maximum capacity of the asset (e.g., maximum stored electric energy, maximum fluid storage, etc.).

In some embodiments, asset sizing module 916 includes a user interface generator 1006. User interface generator 1006 can be configured to generate a user interface for interacting with asset sizing module 916. The user interface may be provided to a user device 1002 (e.g., a computer workstation, a laptop, a tablet, a smartphone, etc.) and presented via a local display of user device 1002. In some embodiments, the user interface prompts a user to select one or more assets or types of assets to be sized. The selected assets can include assets currently in a building or central plant (e.g., existing assets the user is considering upgrading or replacing) or new assets not currently in the building or central plant (e.g., new assets the user is considering purchasing). For example, if the user is considering adding thermal energy storage or electrical energy storage to a building or central plant, the user may select "thermal energy storage" or "battery" from a list of potential assets to size/evaluate. User interface generator 1006 can identify any assets selected via the user interface and provide an indication of the selected assets to asset cost term generator 1008.

Asset cost term generator 1008 can be configured to generate one or more cost terms representing the purchase costs of the assets being sized. In some embodiments, asset cost term generator 1008 generates the following two asset cost terms:

$$c_f^T v + c_s^T s_a$$

where $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_a$ is a vector of continuous decision variables corresponding to the asset sizes. Advantageously, the binary purchase decisions in vector v and asset size decisions in vector $s_a$ can be treated as decision variables to be optimized along with other decision variables x in the augmented cost function $J_a(X)$, described in greater detail below.

It should be noted that the values of the binary decision variables in vector v and the continuous decision variables in vector $s_a$ indicate potential asset purchases and asset sizes which can be evaluated by asset sizing module 916 to determine whether such purchases/sizes optimize a given financial metric. The values of these decision variables can be adjusted by asset sizing module 916 as part of an optimization process and do not necessarily reflect actual purchases or a current set of assets installed in a building, set of buildings, or central plant. Throughout this disclosure, asset sizing module 916 is described as "purchasing" various assets or asset sizes. However, it should be understood that these purchases are merely hypothetical. For example, asset sizing module 916 can "purchase" an asset by setting the binary decision variable $v_j$ for the asset to a value of $v_j=1$. This indicates that the asset is considered purchased within a particular hypothetical scenario and the cost of the asset is included in the augmented cost function $J_a(x)$. Similarly, asset sizing module 916 can choose to not purchase an asset by setting the binary decision variable $v_j$ for the asset to a value of $v_j=0$. This indicates that the asset is considered not purchased within a particular hypothetical scenario and the cost of the asset is not included in the augmented cost function $J_a(x)$.

The additional cost terms $c_f^T v$ and $c_s^T s_a$ can be used to account for the purchase costs of any number of new assets. For example, if only a single asset is being sized, the vector $c_f$ may include a single fixed cost (i.e., the fixed cost of buying any size of the asset being considered) and v may include a single binary decision variable indicating whether the asset is purchased or not purchased (i.e., whether the fixed cost is incurred). The vector $c_s$ may include a single marginal cost element and $s_a$ may include a single continuous decision variable indicating the size of the asset to purchase. If the asset has both a maximum loading and a maximum capacity (i.e., the asset is a storage asset), the vector $c_s$ may include a first marginal cost per unit loading and a second marginal cost per unit capacity. Similarly, the vector $s_a$ may include a first continuous decision variable indicating the maximum loading size to purchase and a second continuous decision variable indicating the maximum capacity size to purchase.

If multiple assets are being sized, the vectors $c_f$, v, $c_s$, and $s_a$ may include elements for each asset. For example, the vector $c_f$ may include a fixed purchase cost for each asset being sized and v may include a binary decision variable indicating whether each asset is purchased. The vector $c_s$ may include a marginal cost element for each asset being considered and $s_a$ may include a continuous decision variable indicating the size of each asset to purchase. For any asset that has both a maximum loading and a maximum capacity, the vector $c_s$ may include multiple marginal cost elements (e.g., a marginal cost per unit loading size and a marginal cost per unit capacity size) and the vector $s_a$ may include multiple continuous decision variables (e.g., a maximum loading size to purchase and a maximum capacity size to purchase). By accounting for the purchase costs of multiple assets in terms of their respective sizes, the cost terms $c_f^T v$ and $c_s^T s_a$ allow high level optimizer 932 to optimize multiple asset sizes concurrently.

Still referring to FIG. 10, asset sizing module 916 is shown to include a constraints generator 1010. Constraints generator 1010 can be configured to generate or update the constraints on the optimization problem. As discussed above, the constraints prevent high level optimizer 932 from allocating a load to an asset that exceeds the asset's maximum loading. For example, the constraints may prevent high level optimizer 932 from allocating a cooling load to a chiller that exceeds the chiller's maximum cooling load or assigning a power setpoint to a battery that exceeds the battery's maximum charge/discharge rate. The constraints may also prevent high level optimizer 932 from allocating resources in a way that causes a storage asset to exceed its maximum capacity or deplete below its minimum capacity. For example, the constraints may prevent high level optimizer 932 from charging a battery or thermal energy storage tank above its maximum capacity or discharging below its minimum stored electric energy (e.g., below zero).

When asset sizes are fixed, the loading constraints can be written as follows:

$$x_{j,i,load} \leq x_{j,load_{max}} \quad \begin{array}{l} \forall j = 1 \ldots N_a \\ \forall i = k \ldots k+h-1 \end{array}$$

where $x_{j,i,load}$ is the load on asset j at time step i over the horizon, $x_{j,load_{max}}$ is the fixed maximum load of the asset j, and $N_a$ is the total number of assets. Similarly, the capacity constraints can be written as follows:

$$0 \leq x_{j,i,cap} \leq x_{j,cap_{max}} \quad \begin{array}{l} \forall j = 1 \ldots N_a \\ \forall i = k \ldots k+h-1 \end{array}$$

where $x_{j,i,cap}$ is the capacity of asset j at time step i over the horizon and $x_{j,cap_{max}}$ is the fixed maximum capacity of the asset j. However, these constraints assume that the maximum load $x_{j,load_{max}}$ and maximum capacity $x_{j,cap_{max}}$ of an asset is fixed. When asset sizes are treated as optimization variables, the maximum load and capacity of an asset may be a function of the asset size purchased in the optimization problem (i.e., the size of the asset defined by the values of the binary and continuous decision variables in vectors v and $s_a$).

Constraints generator 1010 can be configured to update the loading constraints to accommodate a variable maximum loading for each asset being sized. In some embodiments, constraints generator 1010 updates the loading constraints to limit the maximum load of an asset to be less than or equal to the total size of the asset purchased in the optimization problem. For example, constraints generator 1010 can translate the loading constraints into the following:

$$\begin{array}{l} x_{j,i,load} \leq s_{a_{j,load}} \\ s_{a_{j,load}} \leq M_j v_j \end{array} \quad \forall j = 1 \ldots N_a$$

where $s_{a_{j,load}}$ is the loading size of asset j (i.e., the jth load size element of the continuous variable vector $s_a$), $v_j$ is the binary decision variable indicating whether asset j is purchased (i.e., the jth element of the binary variable vector v), and $M_j$ is a sufficiently large number. In some embodiments, the number $M_j$ is set to the largest size of asset j that can be purchased. The first inequality in this set of constraints ensures that the load on an asset $x_{j,i,load}$ is not greater than the size of the asset $s_{a_{j,load}}$ that is purchased. The second inequality forces the optimization to pay for the fixed cost of an asset before increasing the load size of the asset. In other words, asset j must be purchased (i.e., $v_j=1$) before the load size $s_{a_{j,load}}$ of asset j can be increased to a non-zero value.

Similarly, constraints generator 1010 can be configured to update the capacity constraints to accommodate a variable maximum capacity for each storage asset being sized. In some embodiments, constraints generator 1010 updates the capacity constraints to limit the capacity of an asset between zero and the total capacity of the asset purchased in the optimization problem. For example, constraints generator 1010 can translate the capacity constraints into the following:

$$\begin{array}{l} 0 \leq x_{j,i,cap} \leq s_{a_{j,cap}} \\ s_{a_{j,cap}} \leq M_j v_j \end{array} \quad \forall j = 1 \ldots N_a$$

where $s_{a_{j,cap}}$ is the capacity size of asset j (i.e., the jth capacity size element of the continuous variable vector $s_a$), $v_j$ is the binary decision variable indicating whether asset j is purchased (i.e., the jth element of the binary variable vector v), and $M_j$ is a sufficiently large number. In some embodiments, the number $M_j$ is set to the largest size of asset j that can be purchased. The first inequality in this set of constraints ensures that the capacity of an asset $x_{j,i,cap}$ at any time step i is between zero and the capacity size of the asset $s_{a_{j,cap}}$ that is purchased. The second inequality forces the optimization to pay for the fixed cost of an asset before increasing the capacity size of the asset. In other words, asset j must be purchased (i.e., $v_j=1$) before the capacity size $s_{a_{j,cap}}$ of asset j can be increased to a non-zero value.

The constraints generated or updated by constraints generator 1010 may be imposed on the optimization problem along with the other constraints generated by high level optimizer 932. In some embodiments, the loading constraints generated by constraints generator 1010 replace the power constraints generated by power constraints module 904. Similarly, the capacity constraints generated by constraints generator 1010 may replace the capacity constraints generated by capacity constraints module 906. However, the asset loading constraints and capacity constraints generated by constraints generator 1010 may be imposed in combination with the switching constraints generated by switching constraints module 908, the demand charge constraints generated by demand charge module 910, and any other constraints imposed by high level optimizer 932.

Still referring to FIG. 10, asset sizing module 916 is shown to include a scaling factor generator 1012. The cost of purchasing an asset is typically paid over the duration of a payback period, referred to herein as a simple payback period (SPP). However, the original cost function J(x) may only capture operational costs and benefits over the optimization period h, which is often much shorter than the SPP. In order to combine the asset purchase costs $c_f^T v$ and $c_s^T s_a$ with the original cost function J(x), it may be necessary to place the costs on the same time scale.

In some embodiments, scaling factor generator 1012 generates a scaling factor for the asset cost terms $c_f^T v$ and $c_s^T s_a$. The scaling factor can be used to scale the asset purchase costs $c_f^T v$ and $c_s^T s_a$ to the duration of the optimization period h. For example, scaling factor generator 1012 can multiply the terms $c_f^T v$ and $c_s^T s_a$ by the ratio as shown in the following equation:

$$C_{scaled} = \frac{h}{8760 \cdot SPP}(c_f^T v + c_s^T s_a)$$

where $C_{scaled}$ is the purchase cost of the assets scaled to the optimization period, h is the duration of the optimization period in hours, SPP is the duration of the payback period in years, and 8760 is the number of hours in a year.

In other embodiments, scaling factor generator 1012 generates a scaling factor for the original cost function J(x). The scaling factor can be used to extrapolate the original cost function J(x) to the duration of the simple payback period SPP. For example, scaling factor generator 1012 can multiply the original cost function J(x) by the ratio SPP/h as shown in the following equation:

$$J(x)_{scaled} = \frac{8760 \cdot SPP}{h} J(x)$$

where $J(x)_{scaled}$ is the scaled cost function extrapolated to the duration of the simple payback period SPP, h is the duration of the optimization period in hours, SPP is the duration of the payback period in years, and 8760 is the number of hours in a year.

Still referring to FIG. 10, asset sizing module 916 is shown to include a cost function augmenter 1014. Cost function augmenter 1014 can be configured to augment the original cost function J(x) with the scaled purchase cost of the assets $C_{scaled}$. The result is an augmented cost function $J_a(x)$ as shown in the following equation:

$$J_a(x) = J(x) + \frac{h}{8760 \cdot SPP}(c_f^T v + c_s^T s_a)$$

where h is the duration of the optimization period in hours, SPP is the duration of the payback period in years, and 8760 is the number of hours in a year.

High level optimizer 932 can perform an optimization process to determine the optimal values of each of the binary decision variables in the vector v and each of the continuous decision variables in the vector $s_a$. In some embodiments, high level optimizer 932 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_a$ may correspond to a particular asset and/or a particular asset size. Accordingly, high level optimizer 932 can determine the optimal assets to purchase and the optimal sizes to purchase by identifying the optimal values of the binary decision variables in the vector v and the continuous decision variables in the vector $s_a$.

Still referring to FIG. 10, asset sizing module 916 is shown to include a benefit curve generator 1016. Benefit curve generator 1016 can be configured to generate a benefit curve based on the augmented cost function $J_a(x)$. In some embodiments, the benefit curve indicates the relationship between the initial investment cost $C_0$ of an asset (i.e., the cost of purchasing the asset) and the annual benefit C derived from the asset. For example, the benefit curve may express the initial investment cost $C_0$ as a function of the annual benefit C, as shown in the following equation:

$$C_0 = f(C)$$

where both the initial investment cost $C_0$ and the annual benefit C are functions of the asset size. Several examples of benefit curves which can be generated by benefit curve generator 1016 are shown in FIGS. 12-15 (discussed in greater detail below).

In some embodiments, the initial investment cost $C_0$ is the term $c_f^T v + c_s^T s_a$ in the augmented cost function $J_a(x)$. The benefit of an asset over the optimization horizon h may correspond to the term J(x) in the augmented cost function $J_a(x)$ and may be represented by the variable $C_h$. In some embodiments, the variable $C_h$ represents the difference between a first value of J(x) when the asset is not included in the optimization and a second value of J(x) when the asset is included in the optimization. The annual benefit C can be found by extrapolating the benefit over the horizon $C_h$ to a full year. For example, the benefit over the horizon $C_h$ can be scaled to a full year as shown in the following equation:

$$C = \frac{8760}{h} C_h$$

where h is the duration of the optimization horizon in hours and 8760 is the number of hours in a year.

Increasing the size of an asset increases both its initial cost $C_0$ and the annual benefit C derived from the asset. However, the benefit C of an asset will diminish beyond a certain asset size or initial asset cost $C_0$. In other words, choosing an asset with a larger size will not yield any increased benefit. The benefit curve indicates the relationship between $C_0$ and C and can be used to find the asset size that optimizes a given financial metric (e.g., SPP, NPV, IRR, etc.). Several examples of such an optimization are described in detail below. In some embodiments, benefit curve generator 1016 provides the benefit curve to financial metric optimizer 1020 for use in optimizing a financial metric.

Still referring to FIG. 10, asset sizing module 916 is shown to include a financial metric optimizer 1020. Financial metric optimizer 1020 can be configured to find an asset size that optimizes a given financial metric. The financial metric may be net present value (NPV), internal rate of return (IRR), simple payback period (SPP), or any other financial metric which can be optimized as a function of asset size. In some embodiments, the financial metric to be optimized is selected by a user. For example, the user interface generated by user interface generator 1006 may prompt the user to select the financial metric to be optimized. In other embodiments, asset sizing module 916 may automatically determine the financial metric to be optimized or may optimize multiple financial metrics concurrently (e.g., running parallel optimization processes).

Energy Conservation Measures

The systems and methods described herein can include and/or be implemented by an Energy Conservation Measure (ECM) manager. The ECM manager can be or included in the BMS described herein. The ECM manager can generate at least one ECM. The ECMs can be or included in at least one energy conservation protocol. The ECMs can include at least one action that can be taken or executed by or in relation to the building served by the ECM manager. The actions included in the ECMs can be single actions (e.g., replace a piece of building equipment) and/or the ECMs can be continual or semi continual actions (e.g., control strategies that pertain to building operations).

A company, business, firm, organization, corporation, agency, establishment or any other possible entity can decide that they want to reduce emissions and/or improve the sustainability of at least one building that corresponds to the company. However, companies struggle to actually reduce emissions and/or improve the sustainability of their buildings as the sustainability of a building is an ever changing scenario.

The ECM manager provides a seamless process that improves a buildings ability to reduce emissions and/or increase the sustainability of the company. This technical solution provides the ability for a company to establish actions that can achieve the sustainability goals (e.g., reduce emissions, increase sustainability, etc.) that the company has decided to create. Additionally, the ECM manager can track the progress made towards the sustainability goals, detect additional data that suggests previously absent sustainability factors are now impacting the sustainability of the building and generate actions that can correct the newly determined sustainability factors. Additionally, this technical solution provides a flexible and dynamic process that can address the ever changing and evolving nature of the sustainability of buildings. The sustainability of a building is not properly and effectively achieved by just establishing a goal.

The ECM manager can obtain at least one sustainability goal. The sustainability goal can pertain to the sustainability of a building. For example, the sustainability goal can pertain to the sustainability of the building 10. The sustainability goal can be, include and/or pertain to at least one of a company goal, a location goal and/or a building goal. The company goal can be or include at least one of a company goal, a company level goal a portfolio goal and/or a portfolio level goal. The sustainability goals can be, include and/or pertain to at least one sustainability category. The sustainability categories can be or include emissions, energy consumption, water and/or waste. The emissions category can pertain to at least one of carbon emissions, greenhouse gas emissions, emission that pertain to energy sources (e.g., natural gas, electricity, propane, butane, etc.). The energy consumption category can pertain to at least one of total energy consumption, energy use intensity, resource consumption, steam consumption, etc. The water category can pertain to the amount of water that is consumed, used or otherwise associated with a building. The waste category can pertain to garbage production, paper waste, electronic components, etc. The sustainability categories described herein can pertain to at least one of, at least one company that includes at least one location and the locations include at least one building, at least one location and the locations include at least one building, and/or at least one building that can pertain to at least one location and/or company.

The sustainability goal can be to reduce emissions for the building 10. For example, the sustainability goal can be to reduce carbon emission for the building 10 by a certain percentage and/or value. Similarly, the sustainability goal can be to reduce energy consumption for the building 10. For example, the sustainability goal can be to reduce energy consumption from a power grid and/or increase an amount of solar generated energy. Examples of the goals described herein can be found in U.S. Provisional Patent Application No. 63/336,935 filed Apr. 29, 2022 the entirety of which is incorporate herein by reference. The ECM manager can determine, detect or otherwise identify that the goals pertain to at least one sustainability categories. The sustainability categories can be or include at least one emissions The ECM manager can, responsive to obtaining the sustainability goal, determine a target sustainability level for the building. The ECM manager can determine the target sustainability level for the building using a baseline sustainability performance and the sustainability goal. The baseline sustainability performances can be or include at least one baseline level for at least one sustainability category and/or a baseline value for at least one source that impacts at least one of the sustainability categories. For example, the baseline sustainability performance can be a baseline emission level. The baseline sustainability performance can also be a baseline energy consumption level and/or a baseline electricity consumption level for the building.

The ECM manager can generate at least one energy conservation protocol. The ECM manager can generate the energy conservation protocols using the baseline sustainability performance the target sustainability level. The energy conservation protocols can include at least one action that can meet at least a portion of the sustainability goal. For example, a first action included in at least one energy conservation protocol can be to replace an HVAC system with an HVAC that is more energy efficient. A second action can be to retrofit the building 10 with solar photovoltaic (PV) cells, fuel cells, energy storage, etc. The actions including the energy conservation protocols can meet at least one of the sustainability goal and/or the target sustainability level. For example, the sustainability goal can be for the building 10 to consume 40% of its total electricity consumption from electricity that is generated from solar. In this example, the energy conservation protocol can be or include at least one action that involves retrofitting, over a period of time, a certain amount of PV cells so that the building 10 can consume 40% of its total electricity consumption from electricity that is generated from solar. Similarly, the energy conservation protocol can include control actions that can be implemented to decrease the amount of electricity that the building 10 consumes from the grid. In doing so the building 10 could increase its percentage of electricity consumption from electricity that is generated from solar by decreasing the amount of electricity consumed from the grid.

The ECM manager can receive an indication to accept a subset of the plurality of actions included in at least one energy conservation protocol. For example, the ECM manager can provide the energy conservation protocols to a user via the user device 318. The user device 318 can provide, present, show, create or otherwise display a user interface that includes the energy conservation protocols. The user can select, via an icon included in the user interface, at least one energy conservation protocol and/or at least one action included in the energy conservation protocols. The ECM manager can receive, responsive to the user selecting the icon, the subset of the plurality of actions included in the energy conservation protocols.

The ECM manager can implement the subset of the plurality of actions included in the energy conservation protocols. The ECM manager can implement the subset of the plurality of actions included in the energy conservation protocols by generating, providing and or executing the actions included in the energy conservation protocols. For example, the ECM manager can provide, to pieces of building equipment included in and/or that service the building 10, control signals to control the pieces of building equipment. The controlling of the pieces of building equipment can cause the building 10 to move towards the target sustainability level. For example, the control actions can be modifying and maintaining a setpoint for a piece of equipment. Maintaining the setpoint can reduce an amount of energy that is consumed by the piece of equipment, and reducing the amount of energy consumed by the piece of building equipment can reduce the amount of energy consumption (e.g., a sustainability goal) for the building 10.

The ECM manager can, responsive to controlling pieces of building equipment, detect that the building 10 has moved towards the target sustainability level. For example, the sustainability goal can be to reduce the amount of electricity that is consumed from the power grid. The ECM manager can, using utility bills for the building 10, determine that the electricity consumption for the building 10 from the power grid has decreased. Similarly, the ECM manager can also determine that an amount of energy consumed from electricity generated by solar has increased. The reducing of the amount of electricity consumed from the power grid and the increasing of the amount of electricity consumed from solar generated electricity can both indicate that the building 10 has moved towards the target sustainability level.

The sustainability categories described herein can have at least one source. For example, the energy consumption can include the amount of electricity that a building consumes, uses or otherwise receives. The ECM manager can generate ECMs that can target at least one source that impacts at least one of the sustainability categories. For example, the ECM manager can identify an ECM that will impact the butane usage associated with a building. Additionally, the ECM manager can organize the generated ECMs and provide them to the company. For example, the ECM manager can organize the generate ECMs by highest reduction (e.g., the ECM that reduces the source by the highest amount is listed first), shortest payback (e.g., the ECM that provides the fastest return is listed first) and/or lowest cost (e.g., the ECM that has the lowest implementation cost is listed first).

The ECM manager organizing the generated ECMs provides companies with the ability to easily and seamlessly view ECMs that improve the sustainability of the buildings while also allowing the companies to have additional priorities (e.g., highest reduction, shortest payback, lowest cost).

Figure 11:
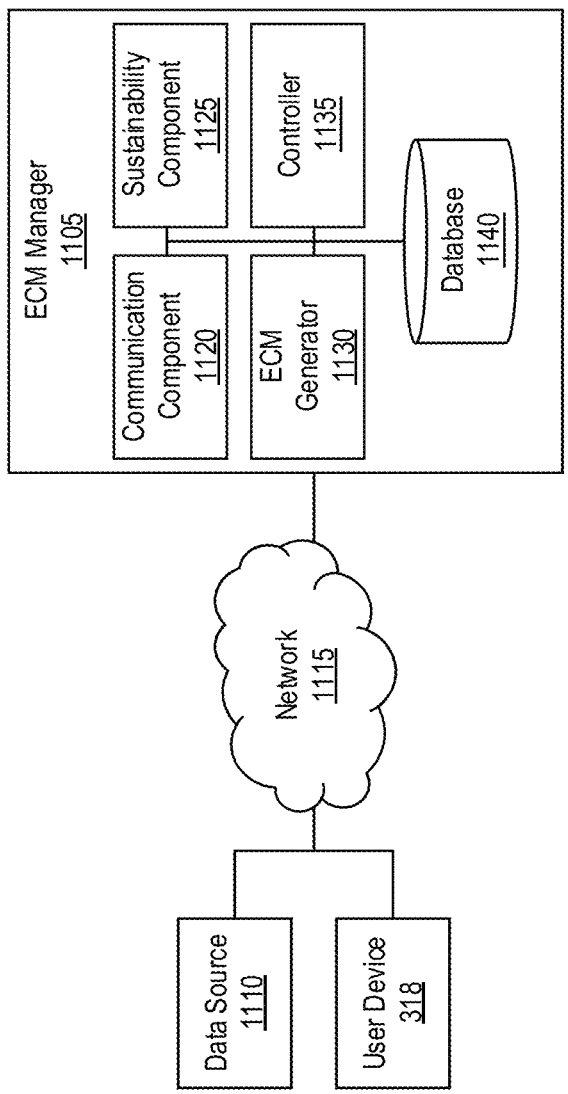
FIG. 11 is a block diagram of a system for energy conservation, according to an exemplary embodiment.

Referring now to FIG. 11, a block diagram of a system 1100 for energy conservation is shown, according to an exemplary embodiment. The system 1100 can include an Energy Conservation Measure (ECM) manager 1105 (e.g., the ECM manager described herein), at least one data source 1110, at least one network 1115 and the user device 318. The ECM manager 1105 can include at least one communication component 1120, at least one sustainability component 1125, at least one ECM generator 1130, at least one controller 1135 and at least one database 1140. The ECM manager 1105 can perform similar functionality to that of the BAS 200 and/or the ECM manager 1105 can include components that are similar to the components of the BAS 200. The ECM manager 1105 can perform similar functionality to that of the system 300 and/or the ECM manager 1105 can include components that are similar to the components of the system 300. Similarly, the ECM manager 1105 can perform similar functionality to that of at least one component shown in FIG. 9 and/or FIG. 10.

The data source 1110 can be or include at least one of the building subsystems 228, the data storage 324, the utility system 402, the building system 618, the plan information database 926, the assets database 1004 or any other possible data source. In some embodiments, the data source 1110 can be a separate component that receives data from at least one of the building subsystems 228, the data storage 324, the utility system 402, the building system 618, the plan information database 926, the assets database 1004 or any other possible data source and then provides the data to the ECM manager 1105. The data provided by the data source 1110, to the ECM manager 1105, can be or include at least one the facility data 312, the sustainability goals 314, the utility access data 316 or any other possible data described herein.

In some embodiments, the data source 1110 can provide data that includes data similar to that described in U.S. Provisional Patent Application No. 63/336,935 filed Apr. 29, 2022, the entirety of which is incorporated herein by reference. For example, the ECM manager 1105 can receive data that pertains to the business goal and/or the business level goal, the location level goal, the building level goal or the building sub-target goal. Similarly, the data that is received by the ECM manager 1105 can be or include operational data that pertains to at least one piece of building equipment that is included in and/or that serves the building 10. For example, the data can be operational data that pertains to and/or that includes the building subsystems 228 and/or pieces of building equipment thereof. The business level goals, the location level goals, the building level goal, and/or the building sub-target goal can be or include at least one sustainability goal. In some embodiments, the ECM manager 1105 can perform similar functionality to that of the sustainability manager and/or the ECM manager 1105 can include components that are similar to the component of the sustainability manager described in U.S. Provisional Patent Application No. 63/336,935 filed Apr. 29, 2022. The data provided by the data source 1110 can pertain to at least one building (e.g., building 10) and the building 10 can be included in at least one location and the location and the building 10 can be included in at least one company and/or business.

The communication component 1120, via the network 1115, can interact with, interface with or otherwise communicate with at least one of the data source 1110 or the user device 318. For example, the communication component 1120 can communicate with the data source 1110 and the data source 1110 can provide data (e.g., utility access data 316) that pertains to a building (e.g., building 10) to the communication component 1120. Similarly, the user device 318 can provide data the pertains to at least one of user settings, user preferences, user selections, configuration data, sustainability targets and/or sustainability goals (e.g., the business level goals and/or targets, the location level goals and/or targets, the building level goals and/or targets or the building sub-target goals) and/or customizations that pertain to the sustainability targets.

The sustainability component 1125 can obtain, from the communication component 1120, the data received from the data source 1110 and/or the user device 318. For example, the sustainability component 1125 can obtain a sustainability target (e.g., a sustainability goal) that was established for a building. The sustainability target can include a parameter that pertains to the sustainability of the building. For example, the sustainability target can be to reduce the emissions (e.g., the parameter) of the building by 90%. The parameters can be and/or include the sustainability performances described herein. The parameter can be or include at least one of at least one emission parameter (e.g., carbon emission, greenhouse gas emission or any other possible emission), at least one energy parameter (e.g., energy consumption, energy usage intensity or any other possible), at least one water parameter (e.g., water usage, water consumption or any other possible water metric) and/or at least one waste parameter (e.g., waste production, recycle rate).

In some embodiments, the sustainability component 1125 can, using data that pertains to the building, determine a baseline value for the parameter (e.g., a baseline sustainability performance). For example, the baseline value can be the total carbon emissions of the building in the previous year. The sustainability component 1125 can, using the baseline value for the parameter and the sustainability target, determine a target value for the parameter (e.g., a target sustainability level). For example, the parameter can be water consumption, the baseline value for water consumption of the building can be 10,000 gallons and the sustainability target can be to reduce the yearly water consumption of the building by 80%. The sustainability component 1125, using the baseline value (10,000 gallons) and the sustainability target (reduce water consumption by 80%) can determine that the target value is 2,000 gallons of yearly water consumption. The sustainability component 1125 can, responsive to determining the target value of the parameter, communicate with the ECM generator 1130. The sustainability component 1125 can provide, to the ECM generator 1130, at least one of the sustainability target, the baseline value of the parameter, the target value of the parameter or any other possible information that pertains to the sustainability target.

The sustainability component 1125 can determine the target value for the parameter (e.g., the target sustainability level) by determining a difference between the baseline sustainability performance and the sustainability goal. For example, the building 10 can have a sustainability goal pertaining to carbon emissions and the baseline sustainability performance for the building 10 can be 8,000 tCO2e/yr. The sustainability component 1125 can determine that the sustainability goal is to reduce carbon emissions by 60% and the sustainability component 1125 can use the baseline sustainability performance of 8,000 tCO2e/yr. and the carbon reduction goal of 60% to determine a difference. For example, the sustainability component 1125 can determine that a reduction (e.g., a difference) of carbon emissions by 4,800 tCO2e/yr. can result in the sustainability goal being reached.

In some embodiments, the sustainability component 1125 can use the difference between the baseline sustainability performance and the sustainability goal to generate a sustainability value. The sustainability value can be a value that meets the sustainability goal. For example, the sustainability component 1125 can use the baseline sustainability performance of 8,000 tCO2e/yr. and the difference of 4,800 tCO2e/yr. to generate a sustainability value of 3,200 tCO2e/yr. In this non-limiting example, the sustainability component 1125 can determine that the building reaching a carbon emission value of 3,200 tCO2e/yr. can result in the building 10 meeting the sustainability goal (e.g., reduce carbon emissions by 60%). The sustainability component 1125 can then determine an amount of time to reach the sustainability value. For example, the sustainability goal can establish an amount of time to reach the sustainability goal (e.g., reduce carbon emissions by 60% in the next 15 years). The sustainability component 1125 can use the amount of time to reach the sustainability value when tracking and/or monitoring the progress made towards the sustainability goal.

In some embodiments, the ECM generator 1130 can, responsive to communicating with the sustainability component 1125, generate at least one energy conservation protocol. The energy conservation protocols can include at least one energy conservation measure (ECM). The ECMs can be or include at least one action that can be taken or executed where in response to the actions being taken or executed the sustainability target can be reached, achieved, satisfied, accomplished or otherwise met. The actions can be at least one of building improvements (e.g., FIMs), control strategies (e.g., temperature settings, lighting settings, HVAC settings, circulation settings, ventilation settings, etc.) and/or employee actions (e.g., carpool schedules, work-from-home schedules, incentive programs or any other possible action that can be used to achieve the sustainability target. The ECM generator 1130 can, in response to generating the energy conservation protocols, communicate with the communication component 1120. The ECM generator 1130 can provide, to the communication component 1120, the energy conservation protocols.

In some embodiments, the communication component 1120 can, in response to receiving the energy conservation protocols, provide, to at least one of the data source 1110 or the user device 318, the energy conservation protocols. The communication component 1120 providing the energy conservation protocols to the user device 318 can cause the user device 318 to display, via a user interface associated with the user device 318, at least a portion of the energy conservation measures. For example, the user interface displayed by the user device 318 can display, show, present or otherwise include the energy conservation protocols and the actions included in the energy conservation protocols.

The operator of the user device 318 can interact with, interface with or otherwise engage with the user interface displayed by the user device 318. For example, the operator of the user device 318 can view the energy conservation protocols and the actions included in the energy conservation protocols. The operator of the user device 318 can accept, decline and/or customize at least one of the energy conservation protocols, the actions included in the energy conservation protocols and/or a subset of the actions included in the energy conservation protocols. For example, the actions included in the energy conservation protocols can be or include at least one of a control strategy for the HVAC system of the building that can decrease the energy consumption of the building, a FIM (e.g., replace the HVAC system) that pertains to the HVAC system and/or a building setpoint (e.g., a temperature setting). Additionally, the subset of the actions included in the energy conservation protocols can be at least one of the actions included in the energy conservation protocols. For example, the subset of the actions included in the energy conservation protocols can be the control strategy for the HVAC system. The operator can accept the subset of the actions included in the energy conservation protocols by hovering over, selecting or otherwise interacting with an icon included in the user interface displayed by the user device 318.

In some embodiments, the communication component 1120 can, in response to the operator of the user device 318 selecting the icon to accept the subset of the actions included in the energy conservation protocols, receive an indication. The indication can be an indication to accept the subset of the actions included in the energy conservation protocols. For example, the user device 318 can, in response to the operator selecting the icon to accept the subset of the actions included in the energy conservation protocols, provide, to the communication component 1120, a signal. The signal provided to the communication component 1120 can include the indication to accept the subset of the actions included in the energy conservation protocols. The indication can also be an indication that the operator of the user device 318 has accepted the entire energy conservation protocols and/or an indication that the energy conservation protocols have been customized by the operator. The indication can also be an indication that the operator of the user device 318 has provided a user defined energy conservation protocol. The communication component 1120 can, in response to receiving the indication, provide, to the ECM generator 1130, the indication. For example, the ECM generator 1130 can be provided the indication to accept the subset of the actions included in the energy conservation protocols.

The ECM generator 1130 can, using the indication provided by the communication component 1120, implement, establish, modify, update, change or otherwise proceed with the energy conservation protocols. For example, the indication can be an indication to accept a subset of the actions included in the energy conservation protocols and the ECM generator 1130 can use the indication to update the energy conservation protocols. The ECM generator 1130 can update the energy conservation protocols to reflect the subset of the actions included in the indication. For example, the ECM generator 1130 can update the energy conservation protocols to include the subset of the actions that were included in the indication and remove, from the energy conservation protocols, the actions not included in the indication. The ECM generator 1130 can, in response to receiving the indication provided by the communication component 1120 and/or in response to updating the energy conservation protocols, provide, establish the energy conservation protocols. The ECM generator 1130 can establish the energy conservation protocols by providing, to the database 1140, the energy conservation protocols and the database 1140 can store, maintain or otherwise hold the energy conservation protocols. The ECM generator 1130 can provide, to the communication component 1120, the sustainability component 1125 and the controller 1135, an indication that the energy conservation protocols have been established.

In some embodiments, the controller 1135 can, in response to receiving the indication that the energy conservation protocols have been established, implement the energy conservation protocols and/or the actions included in the energy conservation protocols. The controller 1135 can control and/or operate at least one piece of building equipment. For example, the controller 1135 can provide a signal to a HVAC system that pertains to a building (e.g., the building 10) that causes the ventilation rate of the HVAC system to be adjusted. As described herein the energy conservation protocols can include control strategies and the controller 1135 can, using the control strategies, control the pieces of building equipment. For example, the control strategy can be have a lighting system produce a certain amount of light at a particular time of day and the controller 1135 can provide a signal, to the lighting system, that causes the certain amount of light to be produced.

The communication component 1120 can, in response to receiving the indication that the energy conservation protocols have been established, provide, to the data source 1110 and/or the user device 318, the indication that the energy conservation protocols have been established. The communication component 1120 providing, to the user device 318, the indication that the energy conservation protocols have been established can cause the user device 318 to display a user interface that includes a notice that the energy conservation protocols have been established.

In some embodiments, the sustainability component 1125 can, in response to receiving the indication that the energy conservation protocols have been established, monitor and/or implement the energy conservation protocols. For example, the sustainability component 1125 can determine that the energy conservation protocols include a FIM and the sustainability component 1125 can determine, using the FIM, a person, entity or object that can implement and/or is impacted by the FIM. For example, the FIM can be replacing a boiler and the sustainability component 1125 can determine the location of the boiler (e.g., the location of the boiler in the building), a person or company that can replace the boiler and/or employees that can be impacted by the boiler being replaced.

In some embodiments, the sustainability component 1125 can, in response to determining the person, entity or object, implement the energy conservation protocols. The sustainability component 1125 can implement the energy conservation protocols by providing, to the company that can perform the FIM, a work order request and the sustainability component 1125 can schedule when the FIM will be executed. For example, the sustainability component 1125 can determine a device (e.g., the user device 318) that is associated with the company that can perform the FIM and the sustainability component 1125 can provide, to the user device 318, a signal that causes the user device 318 to display a work order request. The work order request can include what piece of equipment will be replaced and an identifier (e.g., a serial number) of the piece of equipment that will replace the previous piece. The sustainability component 1125 can provide, in the work order request, a time (e.g., Monday at 7:00) where the FIM can be performed.

The ECMs can include at least one ECM saving category, and the ECM saving categories can include at least one of projects, actions, steps and/or measures that can be implemented. The ECM saving categories can include lighting savings, air handler savings, boiler/heat savings, chiller savings, pumping savings, zone savings, and floor zones. The example ECM saving categories are not limiting in any way and there can be several other ECM saving categories. The energy conservations protocols, the ECM saving categories and/or the ECMs can be stored, located, and/or otherwise maintained in the database 1140.

The lighting savings category actions can include adjusting lighting operation hours, adjusting lighting operation parameters and/or setpoints, adjusting an amount of lights activated, and/or among other possible actions. The air handler savings category actions can include initiating a night setback and shutdown protocol (e.g., the air handler runtime frequency is setback at night), developing an optimum start time for the air handler, detecting low leakage dampers (e.g., air is escaping the ventilation resulting in air handler runtime increasing) and correcting the low leakage dampers, reduce an amount of ventilation, install high efficiency motors, install high efficiency Air Handler Unit (AHU) motors, install Variable Frequency Drives (VFDs) on Variable Air Volume (VAV) systems, perform a supply air reset, perform a cold deck reset, perform a hot deck reset, convert Multi zone (MZ)/Dual Duct (DD) to VAV's, and/or install an air-to-air economizer. The boiler/heat savings category actions can include initiating and/or performing a hot water reset, initiating and/or performing a steam reset, initiating and/or performing boiler replacement, initiating and/or performing a boiler maintenance routine, replacing burners, updating controls, initiating and/or performing an electric to heat pump conversion, and/or among other possible boiler/heat actions. The chiller savings category actions can include initiating and/or performing a chilled water reset, initiating and/or performing a condenser water rest, replacing a chiller, and/or among other possible chiller actions. The pumping savings category actions can include installing and/or using a VSD chilled water pump, installing and/or using a VSD heating water pump, installing and/or using high efficiency CHW/CW pump motors, installing and/or using high efficiency HW pump motors, and/or among other possible pumping actions.

The database 1140 can store, keep, hold and/or otherwise maintain the different types of data described herein. For example, the database 1140 can store the operational data 616 and the utility data 608. The database 1140 can also store data that pertains to the building 10. The data that pertains to the building 10 can include at least one of operational metrics, building metrics, occupancy metrics, equipment inventory, maintenance records, building improvement records, building upkeep information, and/or among other possible data that can pertain to the building 10. The database 1140 can also store weather data, weather predictions, weather impact information, and/or among other possible data pertaining to the weather around the building 10. The database 1140 can also store data pertaining to equipment standards, equipment protocols, equipment efficiency metrics, equipment energy consumption, equipment performance metrics, and/or among other possible equipment information. The database 1140 can also store data pertaining to cost associated with equipment retrofits, equipment maintenance, and/or among other possible cost associated with equipment.

The data stored by the database 1140 can be at least one of building specific data (e.g., the entire building), floor specific data (e.g., the building is divided into a number of floors in the building and the data is separated based on the respective floors), zone specific data (e.g., a floor is divided into a number of zones and the data is separated based on the respective zones), room specific data (e.g., a zone is divided into a number of rooms and the data is separated based on the respective rooms), equipment category specific data (e.g., chiller data is separated from air handler data, lighting data is separated from boiler data, etc.), and/or equipment specific data (e.g., chiller data is separated to each respective unit that contributed to the chiller data, lighting data is separated to each respective unit that contributed to the lighting data, etc.).

The data pertaining to the operational metrics can be and/or include at least one of operational times for pieces of equipment, number of cycles performed by the pieces of equipment, equipment setpoints, a number of heating weeks, a number of cooling weeks, and/or among other possible operational data. For example, the data pertaining to the operational metrics can include that the HVAC systems runs for 50 hours each week, that the interior lights of the building 10 are on for 60 hours each week, and that the average heating temperature is 72 degrees Fahrenheit. The data pertaining to the building metrics can be add/or include at least one of total square footage of the building, number of windows in the building, number of floors in the building, a floor to floor height of the building, an energy transfer rate of the building, and/or among other possible building metrics data. For example, the data pertaining to the building metrics can include that the building is 100,000 square feet and that the windows have an average shading coefficient of 0.8.

The data pertaining to the occupancy metrics of the building can be and/or include at least one of a number of hours that the building is occupied, a number of days that the building is occupied, a number of occupants in the building, and/or among other possible occupancy metrics. For example, the data pertaining to the occupancy metrics can include that the building is occupied for 65 hours/week and that the building is occupied six days/week.

The data pertaining to the equipment inventory can be and/or include at least one of a number of chillers, a number of lighting units, a number of heating of systems, and/or among other possible equipment inventory data. The data pertaining to the maintenance records can be and/or include at least one of dates, times, frequency and/or actions that were taken to performance maintenance on the building and/or equipment of the building. For example, the data pertaining to the maintenance records can include that the air filters are replaced every three months The data pertaining to the building improvement records can be and/or include at least one of equipment replacements, equipment additions, equipment retrofits, building remodeling, building repair and/or among other possible building improvement records. For example, the building improvement records can include that the windows of the building were recently replaced.

The data pertaining to weather predictions and/or weather impact information can be and/or include an average temperature for each day of the year, an average number of sunlight for each day of the year, an average air quality for each day of the year, a predicted temperature for a given day of the year, a predicted number of sunlight for a given day of the year, a predicted air quality for a given day of the year, and/or among other possible weather data. For example, the weather data can include an average outside air temperature during heating weeks and an average number of sunlight during cooling weeks.

The data pertaining to equipment protocols, equipment efficiency metrics, equipment energy consumption, and/or equipment performance metrics can be and/or include at least one of a shading factor for windows, an insulation rating for windows, a wattage rating for lighting units, a efficiency rating for equipment motors, and/or among other possible equipment metric information. For example, the equipment efficiency metrics can include that a first type of light fixture has a wattage rating of 200 watts and that a second type of light fixture has a wattage ratting of 100 watts.

The ECM generator 1130 can generate the energy conservations protocols by retrieving, from the database 1140, operational data pertaining to at least one piece of building equipment of the plurality of pieces of building equipment. For example, the ECM generator 1130 can retrieve operational data pertaining to boilers. The ECM generator 1130 can then determine, using the operational data pertaining to the at least one piece of building equipment of the plurality of pieces of building equipment, a role in the baseline sustainability performance for the at least one piece of building equipment of the plurality of pieces of building equipment. For example, the ECM generator 1130 can determine an amount of carbon emissions contributed to the at least one piece of building equipment. The ECM generator 1130 can then retrieve, from the database 1140, predetermined operational metrics pertaining to the at least one piece of building equipment. For example, the predetermined operational metrics can include an amount of runtime cycles (e.g., how many times the pieces of equipment execute a run cycle). The ECM generator 1130 can then detect, using the predetermined operational metrics pertaining to the at least one piece of building equipment and the operational data pertaining to the at least one piece of building equipment, a difference between the predetermined operational metrics and the operational data. For example, the ECM generator 1130 can determine a difference between the number of runtime cycles for the boiler that was included in the operational data and the number of runtime cycles for boilers that was included in the predetermined operational metrics. The ECM generator 1130 can then generate, responsive to detecting the difference between the predetermined operational metrics and the operational data, a set of actions that adjust the role in the baseline sustainability performance for the at least one piece of building equipment by decreasing the difference between the predetermined operational metrics and the operational data. For example, the ECM generator 1130 can generate a maintenance schedule (e.g., a set of actions) for the boiler and the maintenance schedule can result in the number of runtime cycles for the boiler decreasing. The decreasing in the number of runtime cycles for the boiling can decrease the role of the boiler in the baseline sustainability performance (e.g., the boiler running less can result in a reduction in carbon emissions attributed to the boiler).

As a non-limiting example, the ECM Manager 1105 and/or a component thereof can perform the following functions to generate at least one of the ECMs and/or energy conservation protocols described herein. The ECM generator 1130 can retrieve, from the database 1140, data pertaining to the building 10. For example, the ECM generator 1130 can retrieve a number of heating weeks for the building 10, data pertaining to the heating system of the building 10, a temperature setpoint for the building 10, and/or among other possible information. The ECM generator 1130 can, responsive to retrieving the data pertaining to the building 10, generate at least one ECM. The ECM generator 1130 can generate the ECMs using the number of heating weeks for the building 10 and the data pertaining to the heating systems. For example, the number of heating weeks for the building 10 can be 30 weeks and the data pertaining to the heating systems can include an efficiency rating for the heating system. The ECM generator 1130 can, using the number of heating weeks and the efficiency rating, generate the ECMs. For example, a first ECM of the plurality of ECMs can be replacing the heating system with a more efficient heating system. The first ECM can also include information pertaining to the impact of the ECM. The information can include an energy savings, a carbon reduction, and/or among other possible information. The ECM generator 1130 can determine the impact of the first ECM by comparing the replacement heating system with the current heating system of the building 10. For example, the replacement heating system can be 25% more efficient than the current heating system and given the 25% difference the ECM generator 1130 can determine the impact of replacing the current heating system with the replacement heating system.

As another non-limiting example, the ECM manager 1105 and/or a component thereof can perform the following functions to generate at least one ECM and/or energy conservation protocol described herein. The ECM generator 1130 can retrieve, from the database 1140, data pertaining to the building 10. For example, the ECM generator 1130 can retrieve information pertaining to the windows, building maintenance, and the air infiltration rate of the building. The ECM generator 1130 can generate, using the data retrieved from the database 1140, at least one ECM. For example, the ECM generator 1130 can generate a first ECM pertaining to replacing the caulk around the windows of the building and/or a second ECM pertaining to replacing the windows on a side of the building that have a given amount of sun exposure. The ECM generator 1130 can determine that replacing the caulk around the building 10 can result in a decrease in building equipment runtime (e.g., the internal temperature of the building 10 is maintained better given a decrease in air infiltration). The ECM generator 1130 can also determine that replacing the windows on the side of the building that have the given amount of sun exposure can also result in a decrease in building equipment runtime. The decrease in building equipment runtime can result in a decrease in energy consumption for the building 10. The decrease in building equipment runtime can also result in a decrease in carbon emission for the building 10.

As another non-limiting example, the ECM manager 1105 and/or a component thereof can perform the following functions to generate at least one ECM and/or energy conservation protocol described herein. The ECM generator 1130 can retrieve, from the database 1140, operational data pertaining to a piece of building equipment for the building 10. For example, the ECM generator 1130 can retrieve operational data pertaining to lighting equipment. The ECM generator 1130 can use the operational data to determine a role in the baseline sustainability performance for the lighting system. For example, the baseline sustainability performance for the building 10 can pertain to energy consumption and the ECM generator 1130 can determine an amount of energy consumption attributed to the lighting equipment (e.g., the role). The ECM generator 1130 can retrieve, from the database 1140, predetermined operational metrics that pertain to the lighting equipment. For example, the ECM generator 1130 can retrieve energy consumption metrics (e.g., how many watts does a piece of lighting equipment consume, how many lumens does a piece of lighting equipment emit, etc.). The ECM generator 1130 can detect, using the predetermined operational metrics and the operational data, a different between the predetermined operational metrics and the operational data. For example, the predetermined operational metrics can include pieces of lighting equipment that consume 60 watts of power and the operational data can indicate that the pieces of lighting equipment in the building consume 100 watts of power. The ECM generator 1130 can generate, responsive to detecting the difference between the predetermined operational metrics and the operational data, a set of cations that adjust the role in the baseline sustainability performance for the pieces of lighting equipment. For example, the set of actions can include replacing the lighting equipment with lighting equipment that consume 60 watts, lowering a brightness setting for the lighting equipment that can result in the lighting equipment consuming a reduced wattage, and/or among other possible actions. The role in the baseline sustainability performance for the pieces of lighting equipment can be adjusted responsive to a reduction in the amount of energy being consumed by the pieces of lighting equipment.

Figure 12:
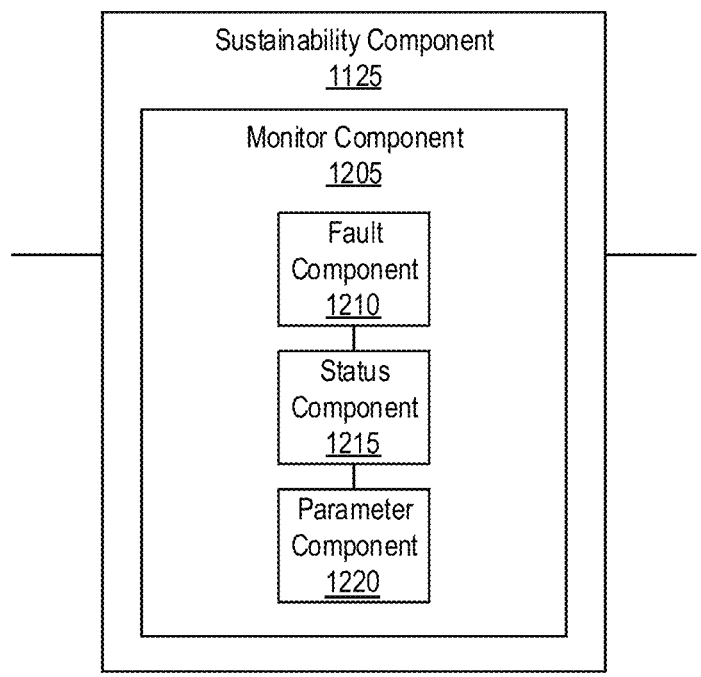
FIG. 12 is a block diagram of a sustainability component of the system of FIG. 11, according to an exemplary embodiment.

Referring now to FIG. 12, a block diagram of the sustainability component 1125 is shown, according to an exemplary embodiment. The sustainability component 1125 can include at least one monitor component 1205. The monitor component 1205 can include at least one fault component 1210, at least one status component 1215 and at least one parameter component 1220. The sustainability component 1125 and/or at least one of the components thereof can perform similar functionality to that of the BAS 200. For example, the fault component 1210 can perform similar functionality to that of the FDD layer 216.

The communication component 1120 can receive, from the data source 1110 and/or the user device 318, data that pertains to a building (e.g., the building 10). The communication component 1120 can provide, to the sustainability component 1125, the data that pertains to the building. The fault component 1210 can detect, using the data that pertains to the building, at least one fault condition. The fault condition can be that a piece of building equipment failed to properly run. For example, the fault component 1210 can detect that a boilers heating and cooling valves were simultaneously open. The fault component 1210 can, in response to detecting the fault condition, determine that the fault condition impacts the sustainability target. For example, the fault condition can be that a HVAC system startup runtime is higher than a predetermined threshold (e.g., the HVAC systems startup should have been completed) and the fault component 1210 can determine that the addition startup runtime has resulted in additional energy consumption. The fault component 1210 can determine that the additional energy consumption has impacted the sustainability target.

In some embodiments, the fault component 1210, in response to determining that the fault condition impacts the sustainability target, can provide, to the ECM generator 1130, an indication. The indication can include at least one of the fault condition, the one or more pieces of building equipment associated with the fault condition and/or an action that can be taken to correct the fault condition (e.g., replace the pieces of equipment, perform maintenance on the pieces of equipment, etc.). The ECM generator 1130 can, in response to receiving the indication from the fault component 1210, update the energy conservation protocols to include at least one action that can address the fault condition and/or a portion of the fault condition. For example, the ECM generator 1130 can update the energy conservation protocol by adding a FIM, to the energy conservation protocols, that can address the fault condition. The ECM generator 1130 can, in response to updating the energy conservation protocols, provide, the updated energy conservation protocols, to the database 1140 and to the sustainability component 1125. The database 1140 can maintain the updated energy conservation protocols. The sustainability component 1125 can execute the updated energy conservation protocols. For example, the sustainability component 1125 can generate a work order than includes maintenance work that pertains to the pieces of equipment included in the fault condition.

The parameter component 1220 can determine, using the data that pertains to the building, a current value of the parameter included in the sustainability target. For example, the parameter component 1220 can include a current value for the energy consumption of the building that is included in the sustainability target. The parameter component 1220 can determine the current value of the parameter in response to a predetermined amount of time. For example, the parameter component 1220 can determine the current value after the energy conservation protocols have been established for 1 day, 1 month, 1 year or any other possible amount of time. The parameter component 1220 can determine a difference between the current value of the parameter and the baseline value of the parameter. For example, the parameter can be water consumption, the current value can be 5,000 gallons and the baseline value can be 6,000 gallons. The parameter component 1220 can determine, responsive to the difference between the current value and the baseline value being larger than a predetermined threshold, that the energy conservation protocols have impacted the parameter that pertains to the sustainability target.

The status component 1215 can monitor, using the data that pertains to the building, a status of the energy conservation protocols and/or the actions included in the energy conservation protocols. For example, the status component 1215 can monitor the status of a particular action (e.g., a FIM) included in the energy conservation protocols. The status component 1215 can determine, responsive to monitoring the status of energy conservation protocols, that the status of the energy conservation protocols and/or the actions included in the energy conservation protocols have remained the same. For example, the status of a FIM can be that a piece of equipment will be replaced by a predetermined date. The status component 1215 can determine, in response to the passing of the predetermine date, that the status of the FIM is the same (e.g., the piece of equipment was not replaced by the predetermined date).

In some embodiments, the status component 1215 can, in response to determining that the status of the energy conservation protocols and/or the actions included in the energy conservation protocols have remained the same, can provide, to the communication component 1120, an indication. The indication can be an indication that the status has remained the same. For example, the indication can be that the FIM included in the energy conservation protocol has not yet completed. The indication can also include information that pertains to a person, object or entity that pertains to the energy conservation protocols, the actions included in the energy conservation protocols and/or the pieces of building equipment associated with the energy conservation protocols and/or actions. For example, the indication can include the person or company that has been assigned to replace a piece of building equipment. The communication component 1120 can, using the indication, identify a device (e.g., the user device 318) associated with the energy conservation protocols. The communication component 1120 can, in response to identifying the device, provide, to the device, a signal that causes the device to display, via a user interface, a notice to execute at least one action that is included in the energy conservation protocol. For example, the notice can include an indication that a FIM has yet to be performed. The status component 1215 can, in response to the communication component 1120 providing the signal to the device, monitor the status of the energy conservation protocols.

The status component 1215 can determine, using the data that pertains to the building, that the action included in the notice provided by the communication component 1120 has been executed. The status component 1215 can determine that the action has been executed by identifying at least one of data that has been produced by a new piece of equipment that was added to the building based on a FIM, an indication from the person or the company performing the FIM that the FIM has been completed, data that indicates the previous piece of equipment was removed (e.g., the piece of equipment is no longer sending data) or any other possible data that can indicate that the action included in the notice has been executed.

In some embodiments, the status component 1215 can, responsive to determining that the action has been executed, detect that a first piece of building equipment has been replaced by a second piece of building equipment. The second piece of building equipment can perform a similar role to the first piece of building equipment. For example, the first piece of building equipment can be a boiler and the second piece of building equipment can also be a boiler.

The status component 1215 can determine, responsive to the second piece of building equipment replacing the first piece of building equipment, an impact of the second piece of building equipment to at least one of the sustainability goal or the target sustainability level. For example, the status component 1215 can determine an impact that the second piece of equipment can have on an amount of energy consumed by the building 10. To continue this example, the status component 1215 can determine the impact by determining a difference between an amount of energy that was consumed by the first piece of building equipment over a certain amount of time and an amount of energy that the second piece of building equipment is predicted to consume of the same certain amount of time. The difference between the amount of energy that was consumed by the first piece of building equipment and the predicted amount of energy for the second piece of building equipment can indicate the impact that the second piece of building equipment can have on the sustainability goal and/or the target sustainability level.

The status component 1215 can communicate with the communication component 1120. The status component 1215 can provide, to the communication component 1120, the impact of the second piece of building equipment on the sustainability goal and/or the target sustainability level. The communication component 1120 can, in response to receiving the impact of the second piece of building equipment on the sustainability goal and/or the target sustainability level, provide, to the data source 1110 and/or the user device 318, the impact of the second piece of building equipment on the sustainability goal and/or the target sustainability level. The communication component 1120 providing, to the user device 318, the impact of the second piece of building equipment on the sustainability goal and/or the target sustainability level can cause the user device 318 to display a user interface that includes the impact of the second piece of building equipment on the sustainability goal and/or the target sustainability level.

Figure 13:
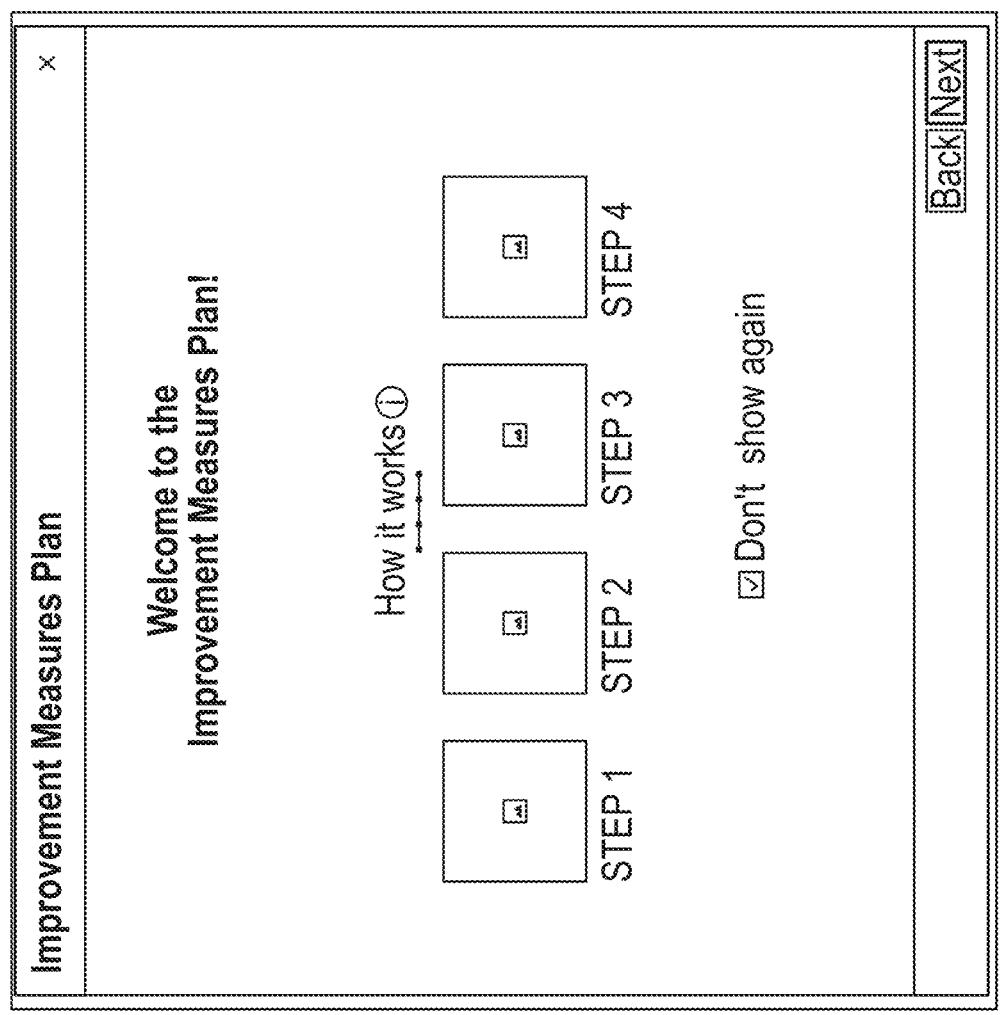
FIG. 13 is a user interface displaying a setup window for facility improvement measures, according to an exemplary embodiment.

Referring now to FIG. 13, a user interface is displayed. The user interface can be shown, displayed or otherwise provided by a device (e.g., the user device 318). The user interface can be displayed, in response to the ECM manager 1105 providing signals to the device, by the device. The user interface can include a setup window. The setup window can pertain to at least one of building improvement plans, sustainability targets, energy conservation protocols and/or any other possible sustainability tracking that pertains to a building.

The setup window can be displayed by the device in response to an operator of the device establishing a sustainability target. For example, the setup window can be displayed after the operator has established a business level goal (e.g., a sustainability goal) or target sustainability level, a location level goal or target, a building level goal or target and/or a building sub-target goal or target similar to that described in U.S. Provisional Patent application No. 63/336, 935 filed Apr. 29, 2022. The setup window can include at least one icon that indicates at least one step that can be taken, performed or otherwise executed to generate at least one energy conservation protocol. For example, a step 1 icon can include information that the operator of the device displaying the user interface shown in FIG. 13 can generate an energy conservation protocol. The user interface can also include a back icon and a next icon. The operator can select the next icon to initiate the establishing of the energy conservation protocols. The operator can select the back icon to pause the establishing of the energy conservation protocols.

Figure 14:
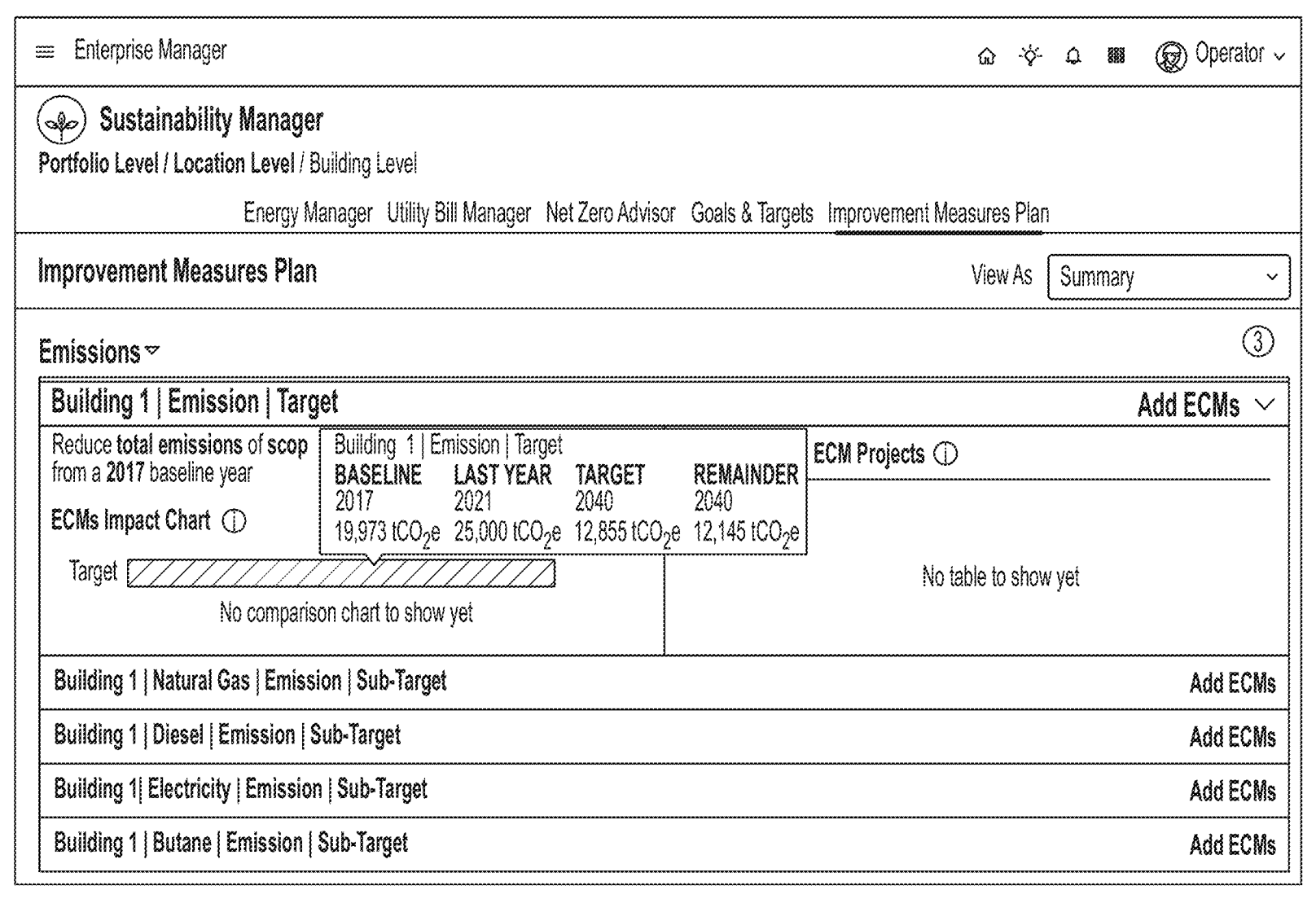

Referring now to FIG. 14, a user interface is shown, in accordance with an exemplary embodiment. The user interface can include an improvement measures plan dashboard. The user interface can be generated in response to the operator selecting the next icon shown in FIG. 13. The improvement measures plan dashboard can include a view as icon. The operator of the device displaying the user interface shown in FIG. 14 can hover over, select or otherwise interact with the view as icon to adjust the view, appearance or presentation of the improvement measures plan. The view as icon can include at least one option. For example, the view as icon can include a summary view, a table view, a timeline view and/or an estimated impact view. FIG. 14 depicts an example of the improvement measures plan dashboard in the summary view.

The improvement measures plan dashboard can include an emissions window. The emissions window can include information that pertains to a particular building. For example, FIG. 14 shows that the information pertains to building 1. The information can include a baseline value, a previous year value, a target value and a remainder value that all pertain to the same parameter. FIG. 14 shows that the values all pertain to carbon emissions. The emissions window can also include sub-target windows that pertain to one or more sources of the emissions. FIG. 14 shows that the sub-targets windows can include a window for natural gas, diesel, electricity and butane. The emission window as well as each sub-target window can include an add ECM icon. The operator of the device displaying the user interface shown in FIG. 14 can hover over, select or other interact with at least one of the add ECM icons to add an ECM to that particular window. For example, the operator can add an ECM to the emissions window by selecting the add ECM icon that pertains to the emissions window.

Figure 15:
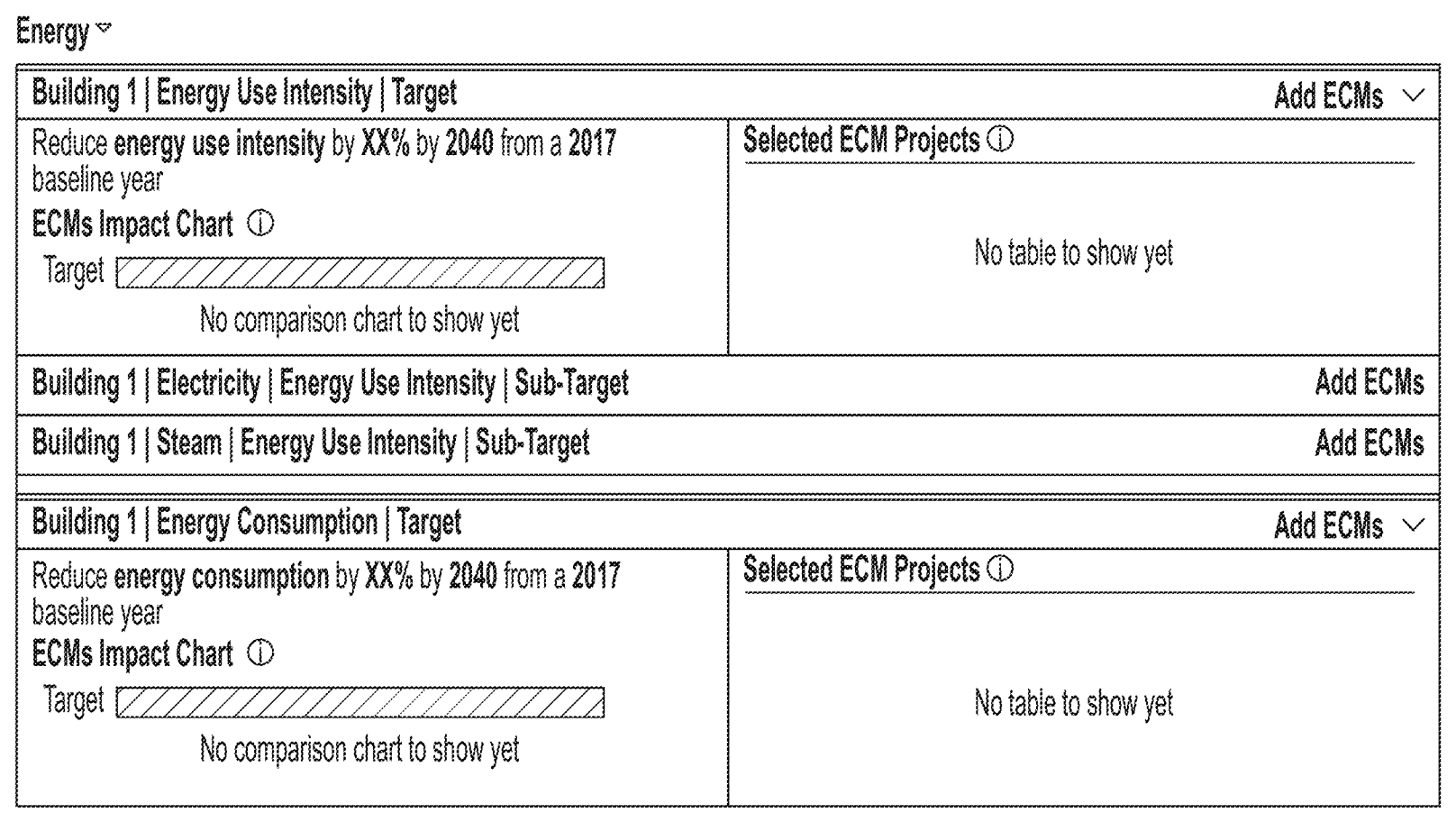

Referring now to FIG. 15, a user interface is shown, in accordance with an exemplary embodiment. The user interface can include the improvement measures plan dashboard and the improvement measures plan dashboard can include at least one energy window. The energy window can include at least one energy use intensity window and at least one energy consumption window. The user interface can be an extension of, a scroll down, an overlay or otherwise included in or with the user interface shown in FIG. 14.

Figure 16:
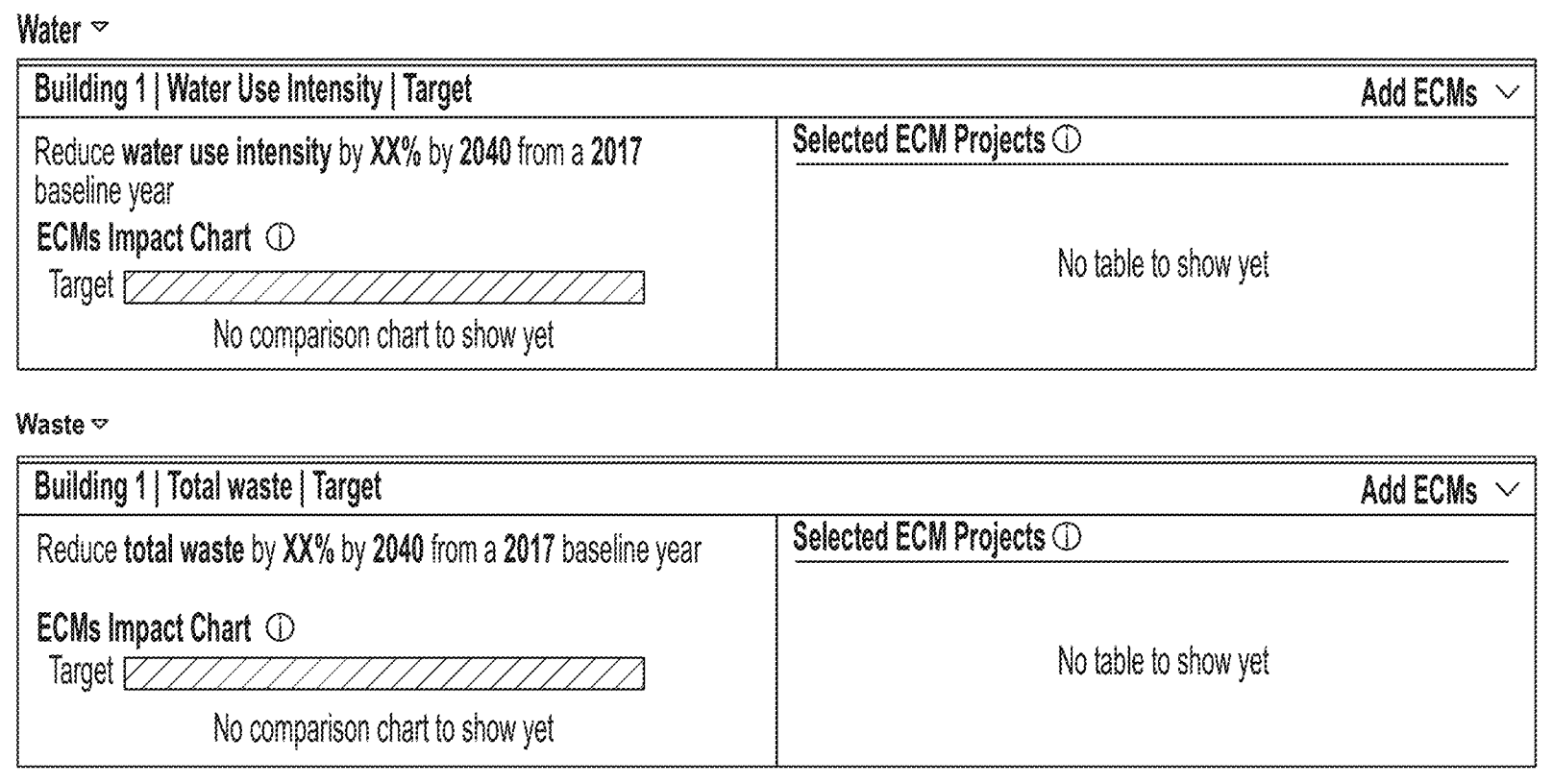

Referring now to FIG. 16, a user interface is shown, in accordance with an exemplary embodiment. The user interface can include the improvement measures plan dashboard and the improvement measures plan dashboard can include at least one water window and at least one waste window. The user interface can be an extension of, a scroll down, an overlay or otherwise included in or with at least one the user interface shown in FIG. 14 and/or the user interface shown in FIG. 15

Referring now to FIG. 17, a user interface is shown, in accordance with an exemplary embodiment. The user interface can include an energy conservation measure window. The user interface shown in FIG. 17 can be generated in response to an operator selecting at least one of the add ECM icons shown in at least one of FIGS. 14-16. The user interface shown in FIG. 17 can be displayed, provided, shown or otherwise presented as an overlay on top of at least one of the user interfaces shown in FIGS. 14-16. The user interface shown in FIG. 17 can also be generated as a new user interface that replaces a user interface previously shown by a device.

The user interface shown in FIG. 17 can include a ECMs impact chart. The ECMs impact chart can include a graphical representation of at least one sub-target goal that pertains to the sustainability target and/or the energy conservation protocols that were generated and/or obtained by the ECM manager 1105. The ECMs impact chart can include a sub-target portion and at least one portion that pertains to at least one option (e.g., at least one FIM, action, etc.). The ECMs impact chart can show the impact that each option can have. FIG. 17 shows that the energy conservation measure window pertains to the butane emissions associated with building 1. FIG. 17 can also include at least one window that pertains to the options included in the ECMs impact chart.

FIG. 17 shows that option 1 pertains to replacing a boiler. The windows that pertain to the options can be filtered, sort or otherwise organized using an optimize for icon. The optimize for icon can include at least one option. For example the optimize for icon can include a highest emission reduction option, a shortest payback period option and/or a lowest cost option. FIG. 17 depicts an example of the option windows being sorted by the highest emission reduction option. The user interface can also include a description and assumptions icon can provide additional information that pertains to a particular option window.

Referring now to FIG. 18, a user interface is shown, in accordance with an exemplary embodiment. The user interface can include an option window that pertains to at least one option that was included in an ECMs impact chart. The user interface can also include a customize icon and an accept and finish icon. The operator of the device displaying the user interface shown in FIG. 18 can select the customize icon to customize at least one of the options shown in the user interface. The operator can select the accept and finish icon to establish at least one option that has been selected by the operator. The filled in circle next to option 2 indicates that that operator has selected option 2. Option 2 can be established responsive to the operator selecting the accept and finish icon and/or option 2 can be customized responsive to the operator selecting the customize icon. The user interface shown in FIG. 18 can be an extension of, a scroll down, an overlay or otherwise included in or with the user interface shown in FIG. 17. Similarly, the information shown in FIG. 18 can be displayed or shown in the user interface shown in FIG. 17

Figure 19:
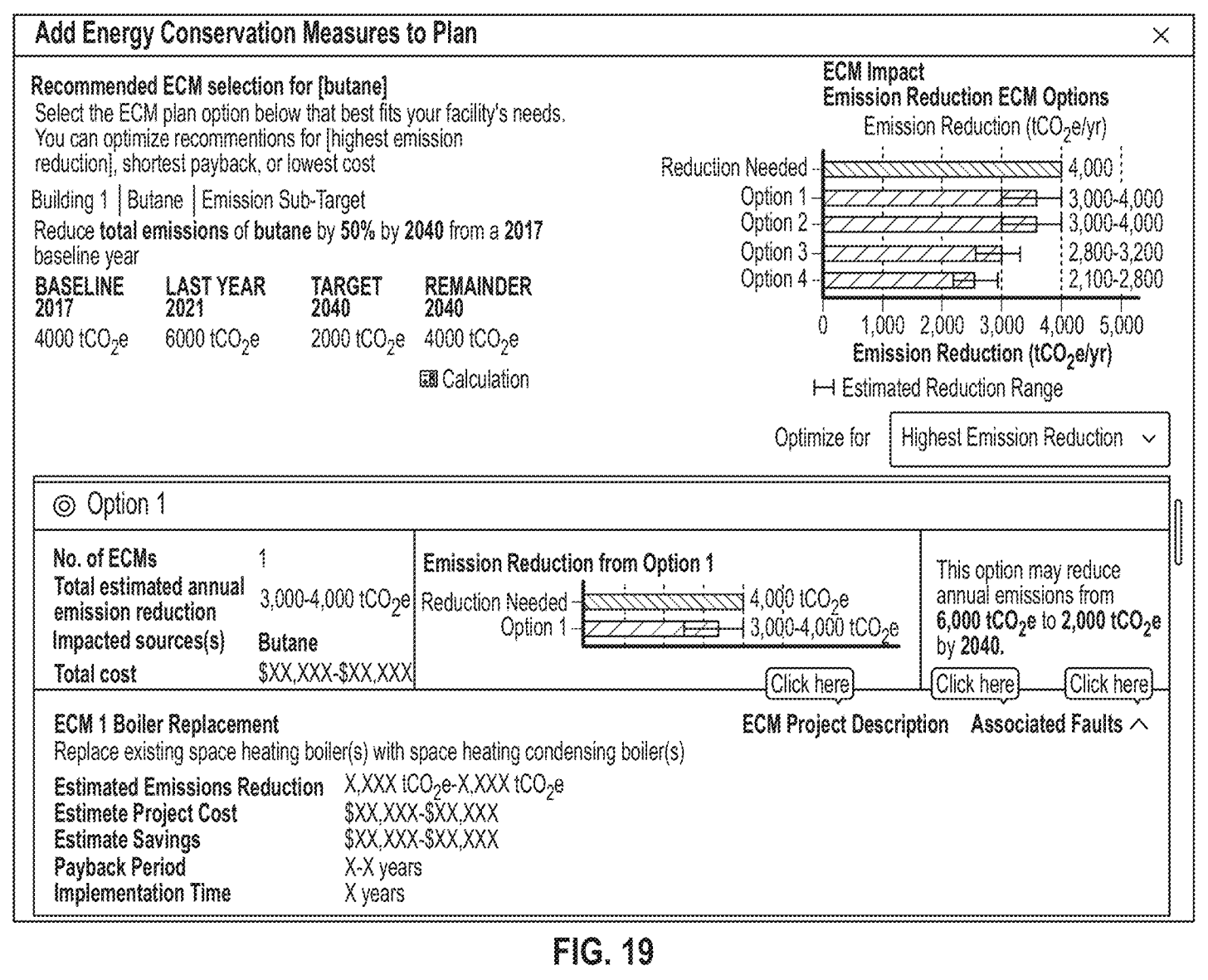

Referring now to FIG. 19, a user interface is shown, in accordance with an exemplary embodiment. FIG. 19 depicts an example of the user interface shown in FIG. 17 after the operator has selected the description and assumptions icon. A drop down window has opened to include information that pertains to option 1.

Referring now to FIG. 20, a user interface is shown, in accordance with an exemplary embodiment. FIG. 20 can include similar information to that shown in FIG. 18. FIG. 20 can be an extension of, a scroll down, an overlay or otherwise included in or with the user interface shown in FIG. 19.

Referring now to FIG. 21, a user interface is shown, in accordance with an exemplary embodiment. The user interface can include a description window. The user interface shown in FIG. 21 can be displayed, provided, shown or otherwise presented as an overlay on top of at least one of the user interfaces shown in FIGS. 17-20. The user interface shown in FIG. 21 can also be generated as a new user interface that replaces a user interface previously shown by a device. The user interface shown in FIG. 21 can include similar information to that shown in FIG. 19. The description window can provide information pertaining to why given ECMs where recommended, faults associated with building equipment, information pertaining a given ECM, a description of the given ECM, example payback ranges, savings associated with implementing ECMs, and/or cost associated with ECMs.

Referring now to FIG. 22, a user interface is shown, in accordance with an exemplary embodiment. The user interface can include a description window. The user interface shown in FIG. 22 can be the same user interface to that shown in FIG. 21. FIG. 22 shows the boiler replacements icon has been selected and that a window has opened to provide additional information that pertains to the boiler replacement that pertains to a particular ECM.

Referring now to FIG. 23, a user interface is shown, in accordance with an exemplary embodiment. The user interface can include a customization window that pertains to the improvement measures plan. The user interface shown in FIG. 23 can be generated in response to the operator selecting the customize icon shown in at least one of FIG. 18 or 20. The user interface shown in FIG. 23 can be displayed, provided, shown or otherwise presented as an overlay on top of at least one of the user interfaces shown in FIGS. 17-20. The user interface shown in FIG. 23 can also be generated as a new user interface that replaces a user interface previously shown by a device. The user interface shown in FIG. 23 can include similar information to that shown in FIGS. 17-20. Additionally, the operator can customize, adjust or otherwise update at least one of the options included in FIGS. 17-20.

Referring now to FIG. 24, a user interface is shown, in accordance with an exemplary embodiment. The user interface can include a customization window that pertains to the improvement measures plan. The user interface shown in FIG. 24 can be generated in response to the operator selecting the customize icon shown in at least one of FIG. 18 or 20. The user interface shown in FIG. 24 can be displayed, provided, shown or otherwise presented as an overlay on top of at least one of the user interfaces shown in FIGS. 17-20. The user interface shown in FIG. 24 can also be generated as a new user interface that replaces a user interface previously shown by a device. Additionally, the user interface shown in FIGS. 23 and 24 can be included within a single user interface (e.g., the user interfaces are combined).

Referring now to FIG. 25, a user interface is shown, in accordance with an exemplary embodiment. The user interface shown in FIG. 25 can include the same improvement measures plan dashboard shown in at least one of FIGS. 14-16. FIG. 25 depicts an example view of the improvement measures plan dashboard responsive to the operator interacting with the view as icon and selecting the table option. Additionally, in response to the operator selecting the table option a group by category icon is shown to toggle between grouping and not grouping ECMs by category. The categories can be or include the different sustainability categories (emission, energy, water and/or waste) described herein. The categories can also include the sources that pertain to each category. For example, the emission category can include natural gas, diesel, propane, butane, electricity or any other possible emission source.

Referring now to FIG. 26, a user interface is shown, in accordance with an exemplary embodiment. The user interface shown in FIG. 26 can include the improvement measures plan dashboard described herein. The user interface can also include a window that pertains to the emission source butane. The window can include ECMs that can impact emissions associated with butane. The user interface can be an extension of, a scroll down, an overlay or otherwise included in or with the user interface shown in FIG. 25. Additionally, the user interface shown in FIGS. 25 and 26 can be included within a single user interface (e.g., the user interfaces are combined).

Referring now to FIG. 27, a user interface is shown, in accordance with an exemplary embodiment. The user interface shown in FIG. 27 can include the improvement measures plan dashboard described herein. The user interface can also include a window that pertains to energy category.

The window can include ECMs that impact the energy use intensity and/or the energy consumption associated with the building. The user interface can be an extension of, a scroll down, an overlay or otherwise included in or with at least one the user interfaces shown in FIGS. 25-26. Additionally, the user interface shown in FIGS. 25, 26 and 27 can be included within a single user interface (e.g., the user interfaces are combined).

Figure 28:
FIG. 28 is a user interface displaying an improvement measures plan dashboard, according to an exemplary embodiment.

Referring now to FIG. 28, a user interface is shown, in accordance with an exemplary embodiment. The user interface shown in FIG. 28 can include the improvement measures plan dashboard described herein. The user interface can also include a window that pertains to water category and/or the waste category. The window can include ECMs that impact the water use intensity and/or the waste production associated with the building. The user interface can be an extension of, a scroll down, an overlay or otherwise included in or with at least one the user interfaces shown in FIGS. 25-27. Additionally, the user interface shown in FIGS. 25, 26, 27 and 28 can be included within a single user interface (e.g., the user interfaces are combined).

Referring now to FIG. 29, a user interface is shown, in accordance with an exemplary embodiment. The user interface can include the improvement measures plan dashboard and the user interface can include similar information to that of FIGS. 14-16 and/or 25-28 The user interface shown in FIG. 29 can be displayed, shown or otherwise generated in response to the operator unselecting the group by category icon shown in FIG. 25. Additionally, the user interface shown in FIG. 29 can be displayed, shown or otherwise generated in response to the operator interacting with the view as icon shown in FIG. 14 and selecting the table option.

Referring now to FIG. 30, a user interface is shown, in accordance with an exemplary embodiment. The user interface can include the improvement measures dashboard. FIG. 30 depicts an example of the information associated with the improvement measures dashboard being displayed in the timeline view. As shown in FIG. 30 the dashboard can include at least one ECM associated with the building and timeline chart that pertains to each ECM. The timeline chart can provide a graphical representation of a predicted amount of time that the ECM can take to be either completed or fully executed. The amount of time can be the duration of time it will take to perform a FIM (e.g., replace a piece of equipment). The amount of time can also be how long the ECM can be in place prior to a target value being reached. For example, the ECM is replacing a boiler and the amount of time for the new boiler to decrease the emissions associated with the building by a predetermined amount is 3 years. The operator can adjust the graphical representation shown in FIG. 30 to represent at least one of days, months, years, decades and or any other possible amount of time.

Referring now to FIG. 31, a user interface is shown, in accordance with an exemplary embodiment. The user interface can include the improvement measures dashboard. The user interface shown in FIG. 31 shows an expanded view of the ECMs that pertain to the building and a collapsed view of the predicted amount of time that pertains to each ECM. The user interface shown in FIG. 31 can be an extension of, a scroll down, an overlay or otherwise included in or with the user interfaces shown in FIG. 30. For example, the operator of the device displaying the user interface shown in FIG. 31 can hovering over, interact with or otherwise move at least one of the ECMs or the predicted amount of time to either expand or collapse the ECMs or the predicted amount of time.

Referring now to FIG. 32, a user interface is shown, in accordance with an exemplary embodiment. The user interface can include the improvement measures dashboard. The user interface can also include a view of the ECMs sorted by category that is similar to the view shown in at least one of FIGS. 25-28. The user interface includes a view of the ECMs associated with the emission category. The user interface shown in FIG. 32 can be an extension of, a scroll down, an overlay or otherwise included in or with at least one the user interfaces shown in FIG. 30 or 31. Additionally, the user interfaces shown in FIGS. 30, 31 and 32 can be included within a single user interface (e.g., the user interfaces are combined).

Referring now to FIG. 33, a user interface is shown, in accordance with an exemplary embodiment. The user interface can include the improvement measures plan dashboard. The user interface can provide information that pertains to the ECMs of building 1. The user interface can include the ECMs impact chart described herein. The ECMs impact chart can include the target value that pertains to the sustainability target and a progress towards the target. The progress towards the target can include the progress that has been made by incorporating, executing or otherwise performing ECMs. The improvement measures plan dashboard can include a list of completed ECMs and a list of planned ECMs. The operator of the device can filter, sort or other organize the information shown in FIG. 33 by selecting the icon below the view as icon. The information can be provided in relation to the building sustainability target, the building level goal, sustainability categories, the sub-targets that relate to the sustainability categories and/or any other possible combination. Additionally, the user interface shown in FIG. 33 can be displayed, shown or otherwise generated in response to the operator interacting with the view as icon shown in at least one FIGS. 14, 25, 29, 30 and/or 32 and selecting the estimated impact option.

Figure 34A:
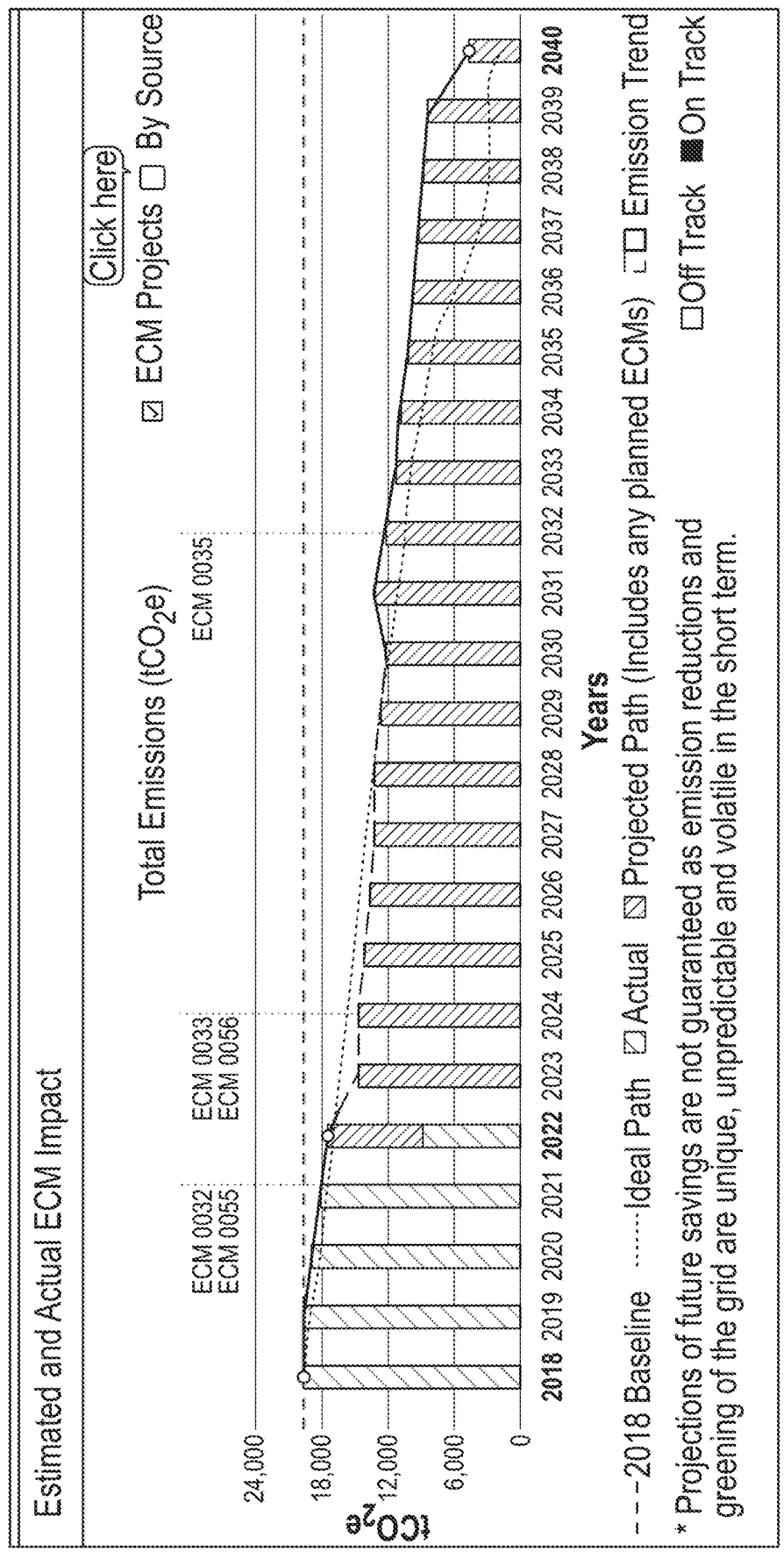
FIG. 34A is a user interface displaying a graphical representation of energy conservation measures tracking, according to an exemplary embodiment.

Referring now to FIG. 34A, a user interface is shown, in accordance with an exemplary embodiment. The user interface can include a graphical representation of ECM tracking. The graphical representation depicted by the user interface can be based on ECM projects. The graphical representation depicted by the user interface can also be based on the sources that contribute to parameters associated with the sustainability target. The user interface can include the baseline value that pertains to parameters associated with the sustainability target. For example, the user interface can include the baseline value of the total emission that pertain to a building (e.g., building 10). Similarly, the user interface can include the baseline value that pertains to at least one of the sustainability categories (e.g., emissions, energy, water, waste, etc.). The user interface can include the impact that at least one ECM can have on the value of the parameter. For example, FIG. 34A shows that ECM 0032 and ECM 0055 upon completion can reduce the carbon emissions from 20,000 to 18,000 tCO2e/yr. Similarly, FIG. 34A shows that ECM 0033 and ECM 0056 upon completion can reduce the carbons emissions from 18,000 to 15,000 tCO2e/yr. Additionally, FIG. 34A shows that ECM 0035 upon completion can reduce the carbon emissions from 15,000 to 12,000 tCO2e/yr. The operator of the device displaying the user interface shown in FIG. 34A can adjust, modify or otherwise change how the information is presented by hovering over, interacting with or selecting at least one of a show sources icon, a completed ECMs icon and/or a planned ECMs icon. The user interface show in FIG. 34A can be an extension of, a scroll down, an overlay or otherwise included in or with the user interface shown in FIG. 32.

Figure 34B:
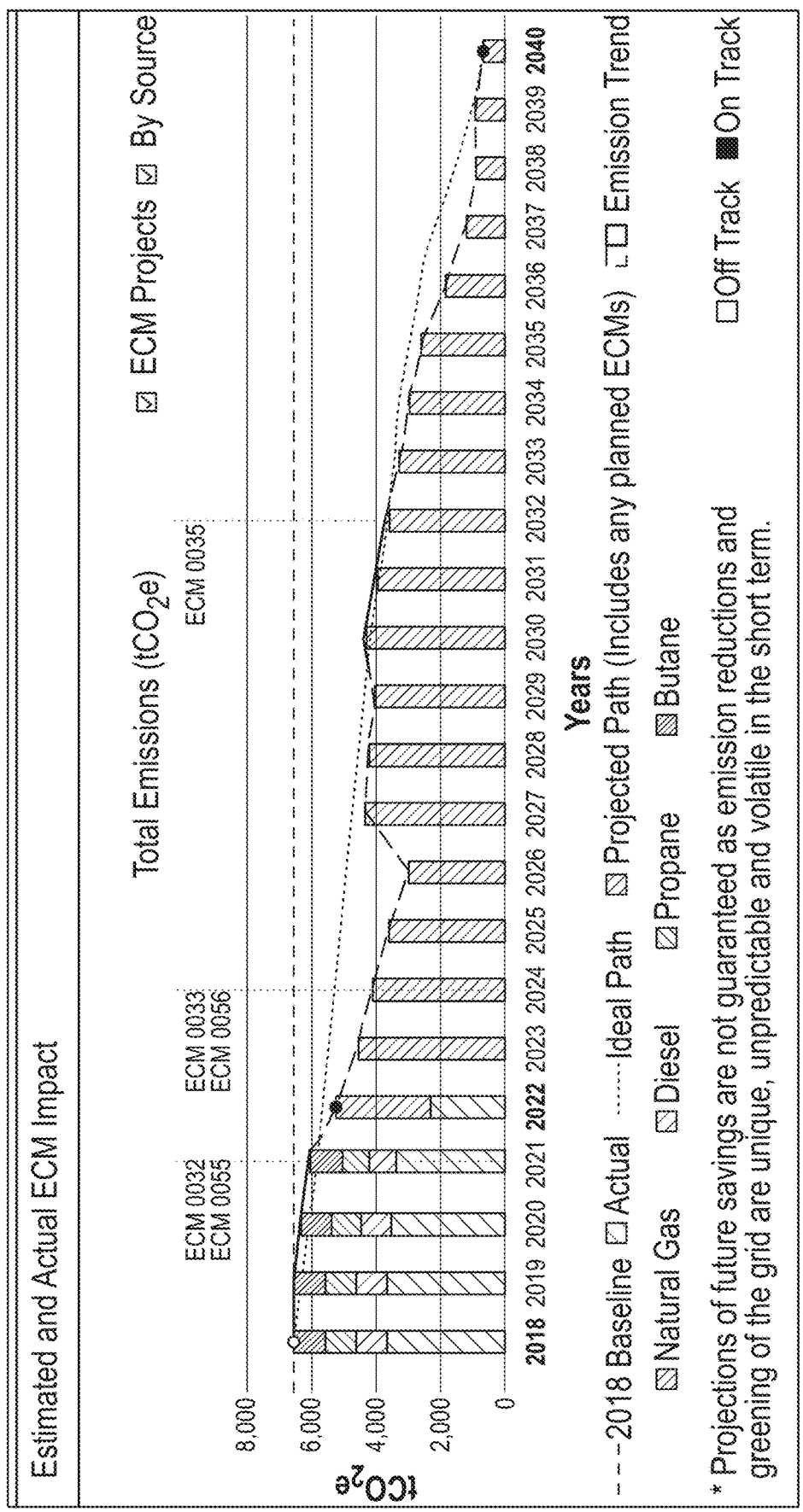
FIG. 34B is a user interface displaying a graphical representation of energy conservation measures tracking, according to an exemplary embodiment.

Referring now to FIG. 34B, a user interface is shown, in accordance with an exemplary embodiment. The user interface includes a graphical representation of ECM tracking including impacts contributed to ECM projects as well as a by source view. The by source view depicts the impact that ECM projects have to each source that contribute to the sustainability parameters and/or the sustainability target. FIG. 34B depicts an example of the ECM projects impacting natural gas consumption, diesel consumption, propane consumption, and butane consumption. The user interface shown in FIG. 34B can be and/or include information similar to that shown in FIG. 34A. Similarly, the user interface shown in FIG. 34B can be at least one of an extension to the user interface shown in FIG. 34A, a scroll down, an overlay or otherwise included in or with the user interface shown in FIG. 34A. The user interface shown in FIG. 34B can be generated responsive to an operator of the device displaying the user interface shown in FIG. 34B and/or FIG. 34A selecting the by source icon.

Figure 35:
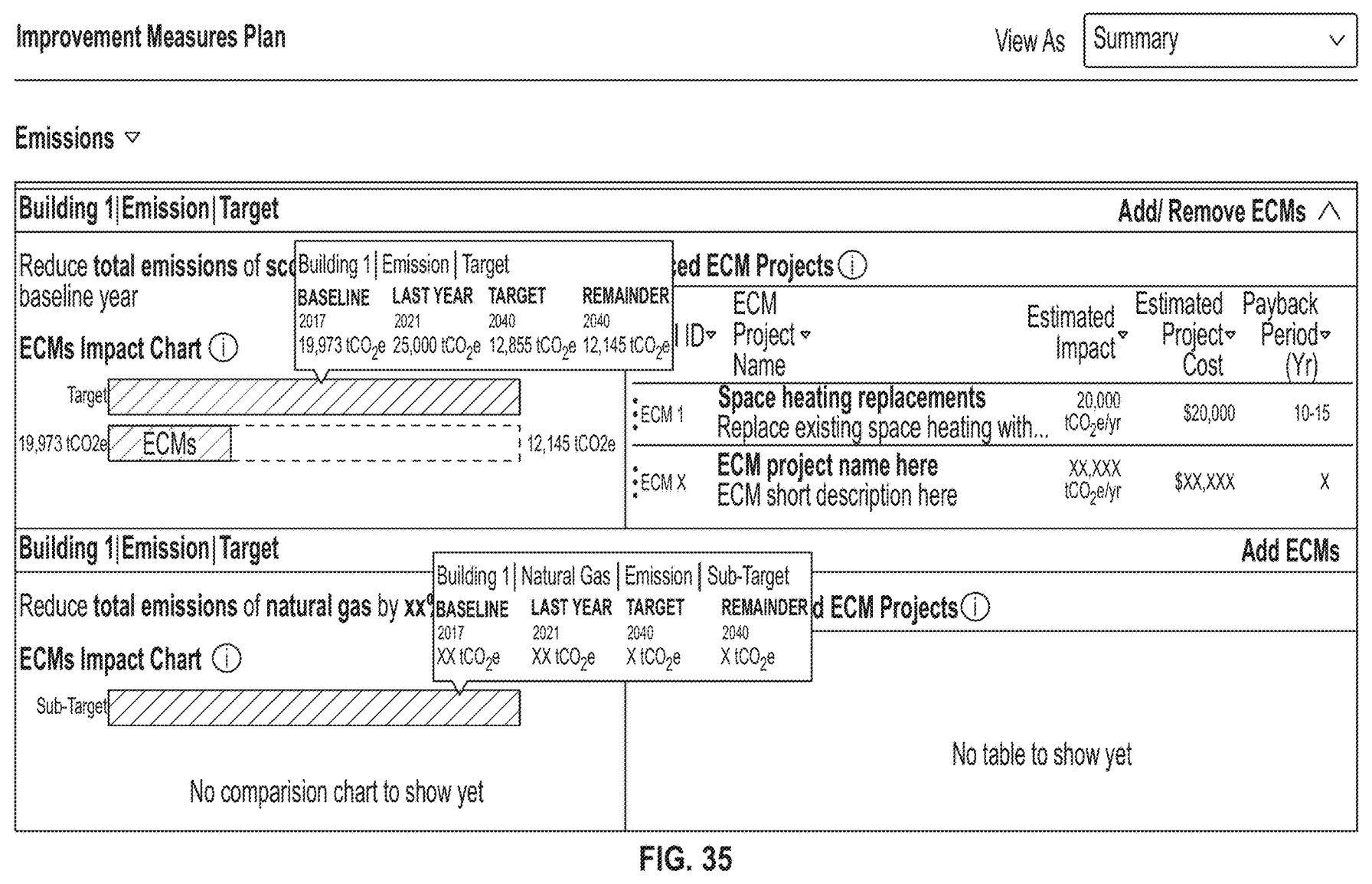

Referring now to FIG. 35, a user interface is shown, in accordance with an exemplary embodiment. The user interface can include an improvement measures plan dashboard. The improvement measures plan dashboard can include information about the same building to that of FIG. 14 and/or the improvement measures plan dashboard can include information about a different building to that of FIG. 14. The user interface can be generated in response to the operator selecting the next icon shown in FIG. 13. The improvement measures plan dashboard can include a view as icon. The operator of the device displaying the user interface shown in FIG. 35 can hover over, select or otherwise interact with the view as icon to adjust the view, appearance or presentation of the improvement measures plan. FIG. 35 can include information that pertains to the emission category associated with the building. Additionally, FIG. 35 shows that at least one ECM has been generated, established, customized or otherwise associated with the emission category of the building. FIG. 35 also includes information that pertains to the natural gas emission source that impacts the emissions category.

Figure 36:
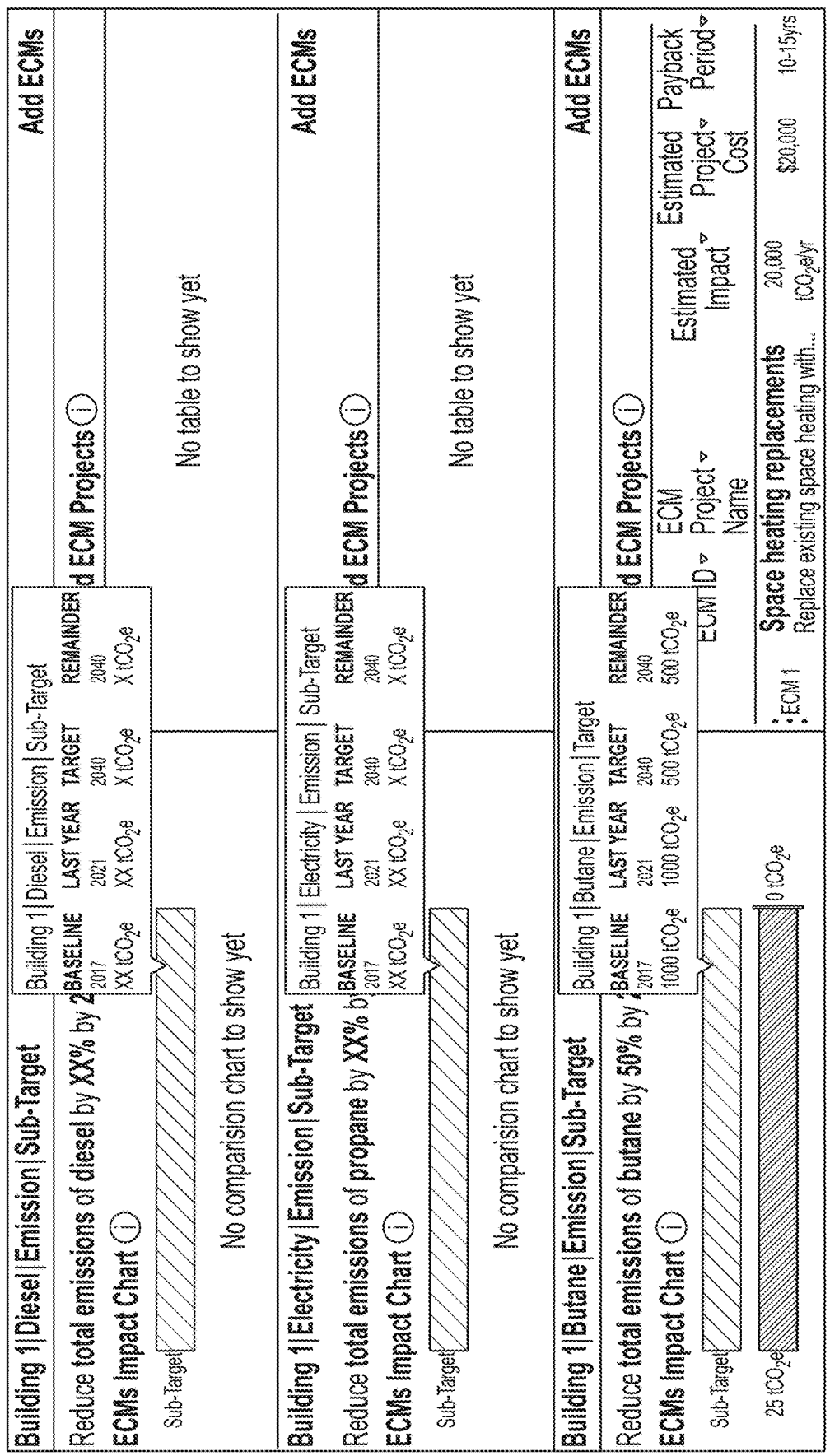
FIG. 36 is a user interface displaying an improvement measures plan dashboard, according to an exemplary embodiment.

Referring now to FIG. 36, a user interface is shown, in accordance with an exemplary embodiment. The user interface can include the improvement measures plan dashboard. The user interface can include at least one window that includes information that pertains to the diesel emission source, the electricity emission source and/or the butane emission source that pertain to the emission category shown in FIG. 35. The butane window can include a ECMs impact chart that indicates that an ECM has been established, executed or otherwise implemented that can result in the target value associated with butane being reached. The user interface show in FIG. 36 can be an extension of, a scroll down, an overlay or otherwise included in or with the user interface shown in FIG. 35. Additionally, the user interfaces shown in FIGS. 35 and 36 can be included within a single user interface (e.g., the user interfaces are combined).

Figure 37:
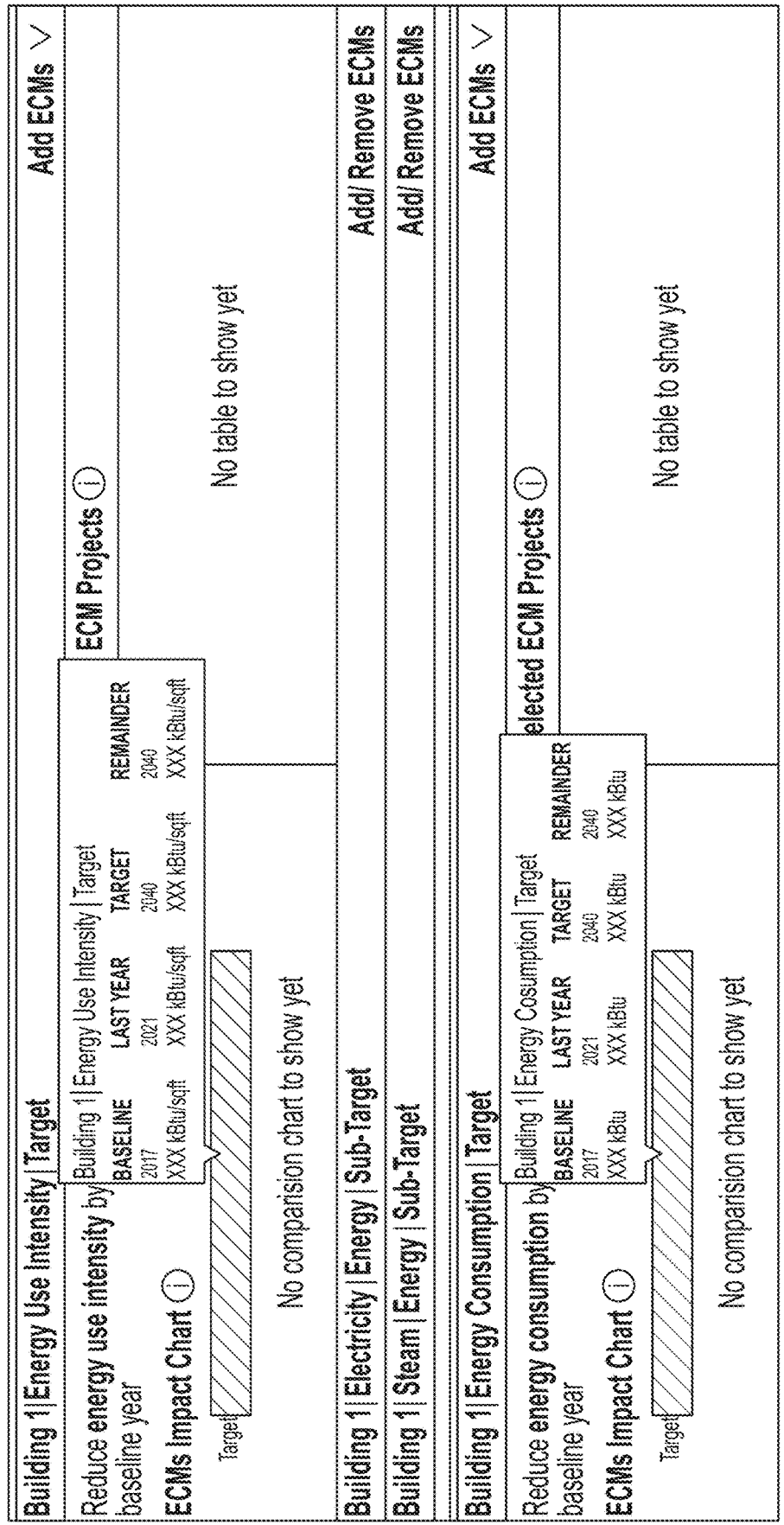
FIG. 37 is a user interface displaying an improvement measures plan dashboard, according to an exemplary embodiment.

Referring now to FIG. 37, a user interface is shown, in accordance with an exemplary embodiment. The user interface can include the improvement measures plan dashboard. The user interface can include at least one window that includes information that pertains to the energy sustainability category. The user interface can provide an indication that an ECM has not been established, executed or otherwise implemented in relation to the energy use intensity parameter and/or the energy consumption parameter. The user interface show in FIG. 37 can be an extension of, a scroll down, an overlay or otherwise included in or with the user interface shown in FIGS. 35 and/or 36. Additionally, the user interfaces shown in FIGS. 35, 36 and 37 can be included within a single user interface (e.g., the user interfaces are combined).

Referring now to FIG. 38, a user interface is shown, in accordance with an exemplary embodiment. The user interface can include the improvement measures plan dashboard. The user interface can include at least one window that includes information that pertains to the water sustainability category and/or the waste sustainability category. The user interface can provide an indication that an ECM has not been established, executed or otherwise implemented in relation to the water use intensity parameter and/or the waste parameter. The user interface show in FIG. 38 can be an extension of, a scroll down, an overlay or otherwise included in or with the user interface shown in FIGS. 35, 36 and/or 37. Additionally, the user interfaces shown in FIGS. 35, 36, 37 and/or 38 can be included within a single user interface (e.g., the user interfaces are combined).

Figure 39:
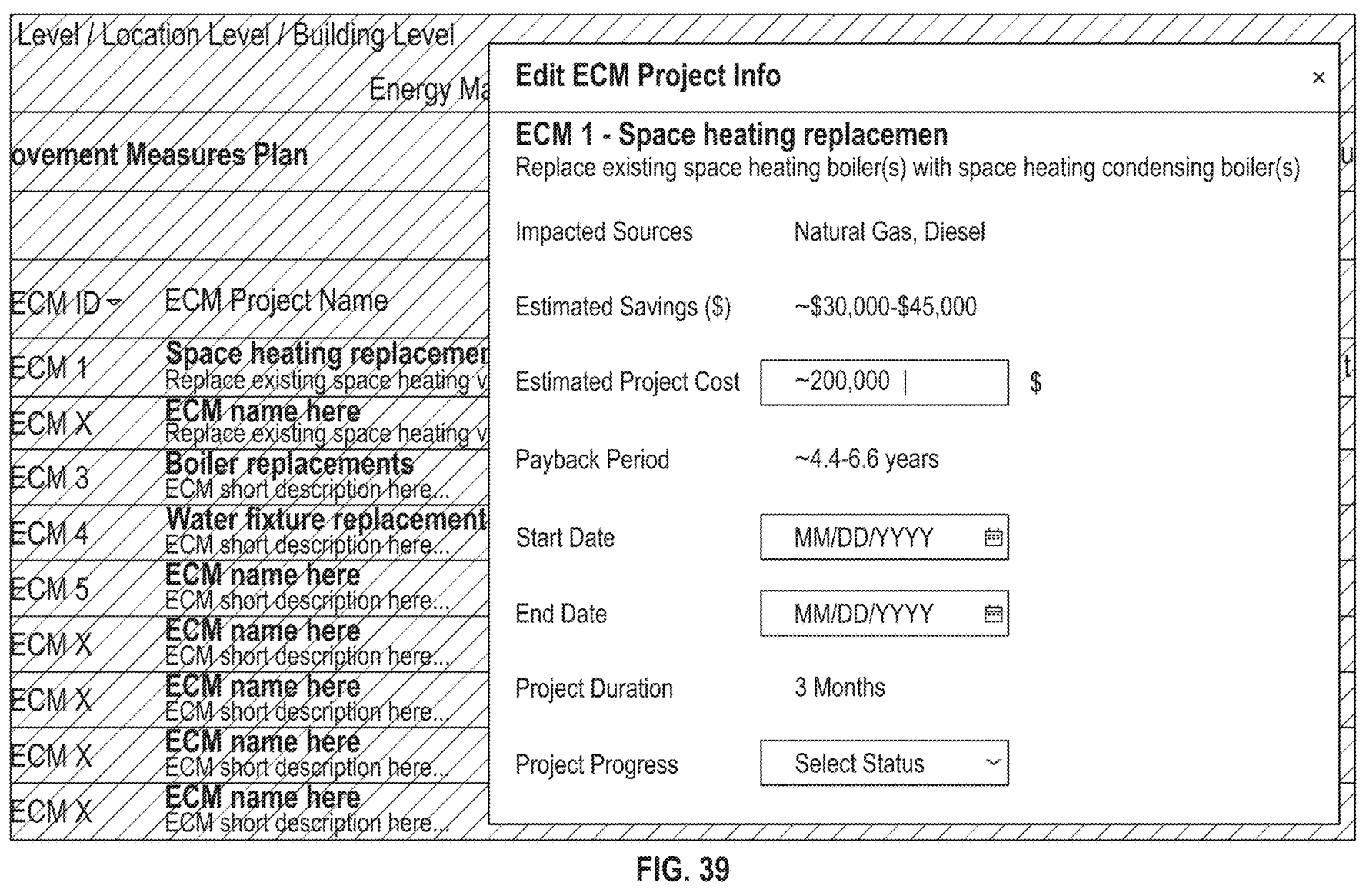

Referring now to FIG. 39, a user interface is shown, in accordance with an exemplary embodiment. The user interface can include an energy conservation window. The user interface shown in FIG. 39 can be a pop window, an overlay on top of and/or otherwise included in at least one of the user interfaces described herein. The energy conservation window can include a start date and an end date icon. The operator of the device display the user interface shown in FIG. 39 can hover over, interact with or otherwise select a start date and an end date for the ECM shown in FIG. 39. Additionally, the operator can select the status of the ECM. The status can be at least one established, paused, declined, accepted and/or any other possible status.

Figure 40:
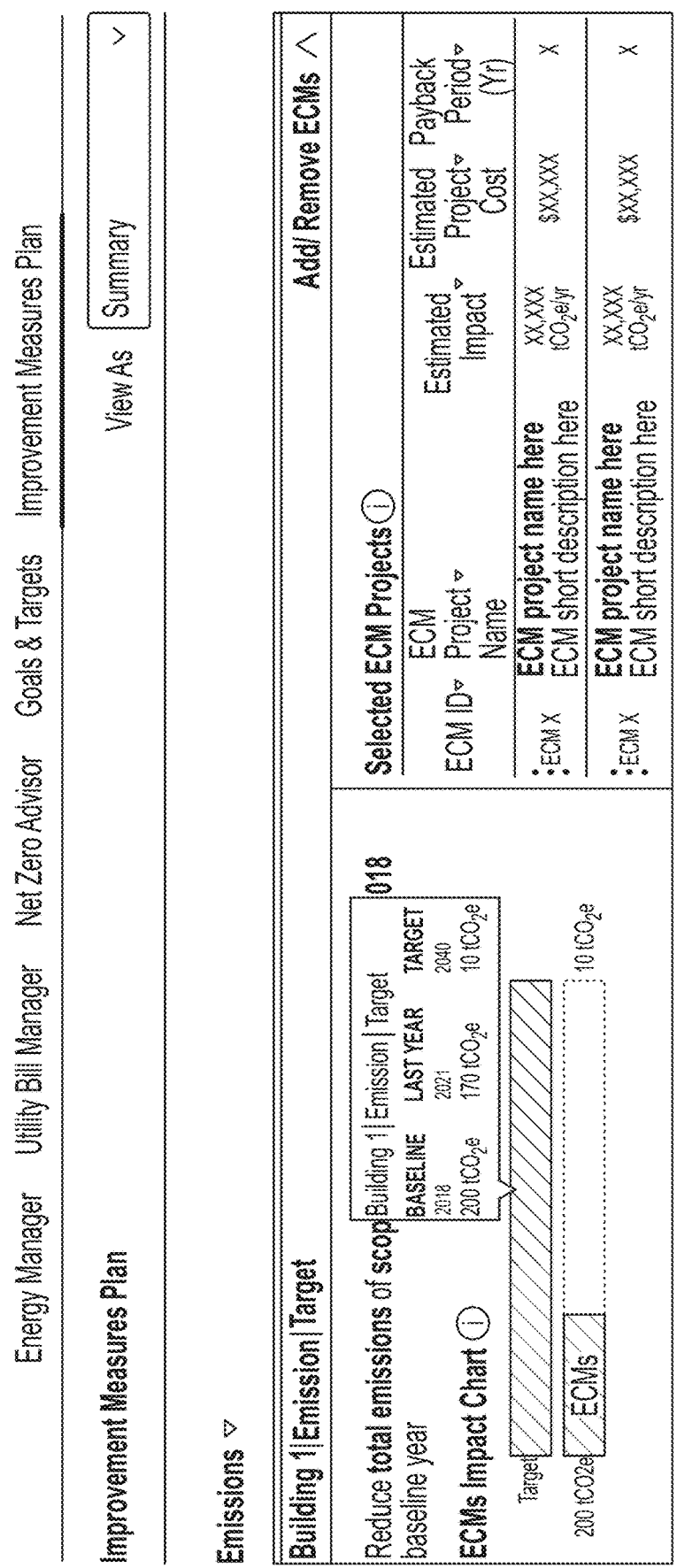
FIG. 40 is a user interface displaying an improvement measures plan dashboard, according to an exemplary embodiment.

Referring now to FIG. 40, a user interface is shown, in accordance with an exemplary embodiment. The user interface can include an improvement measures plan dashboard. The improvement measures plan dashboard can include information about the same building to that of FIG. 14 or 35 and/or the improvement measures plan dashboard can include information about a different building to that of FIG. 14 or 35. The user interface can be generated in response to the operator selecting the next icon shown in FIG. 13. The improvement measures plan dashboard can include a view as icon. The operator of the device displaying the user interface shown in FIG. 40 can hover over, select or otherwise interact with the view as icon to adjust the view, appearance or presentation of the improvement measures plan. FIG. 40 can include information that pertains to the emission sustainability category associated with the building. Additionally, FIG. 40 shows that at least one ECM has been generated, established, customized or otherwise associated with the emission category of the building.

Referring now to FIG. 41, a user interface is shown, in accordance with an exemplary embodiment. The user interface can include the improvement measures plan dashboard. The user interface can include at least one window that includes information that pertains to the natural gas emission source and the diesel emission source that pertain to the emission sustainability category shown in FIG. 40. The user interface show in FIG. 41 can be an extension of, a scroll down, an overlay or otherwise included in or with the user interface shown in FIG. 40. Additionally, the user interfaces shown in FIGS. 40 and 41 can be included within a single user interface (e.g., the user interfaces are combined).

Figure 42:
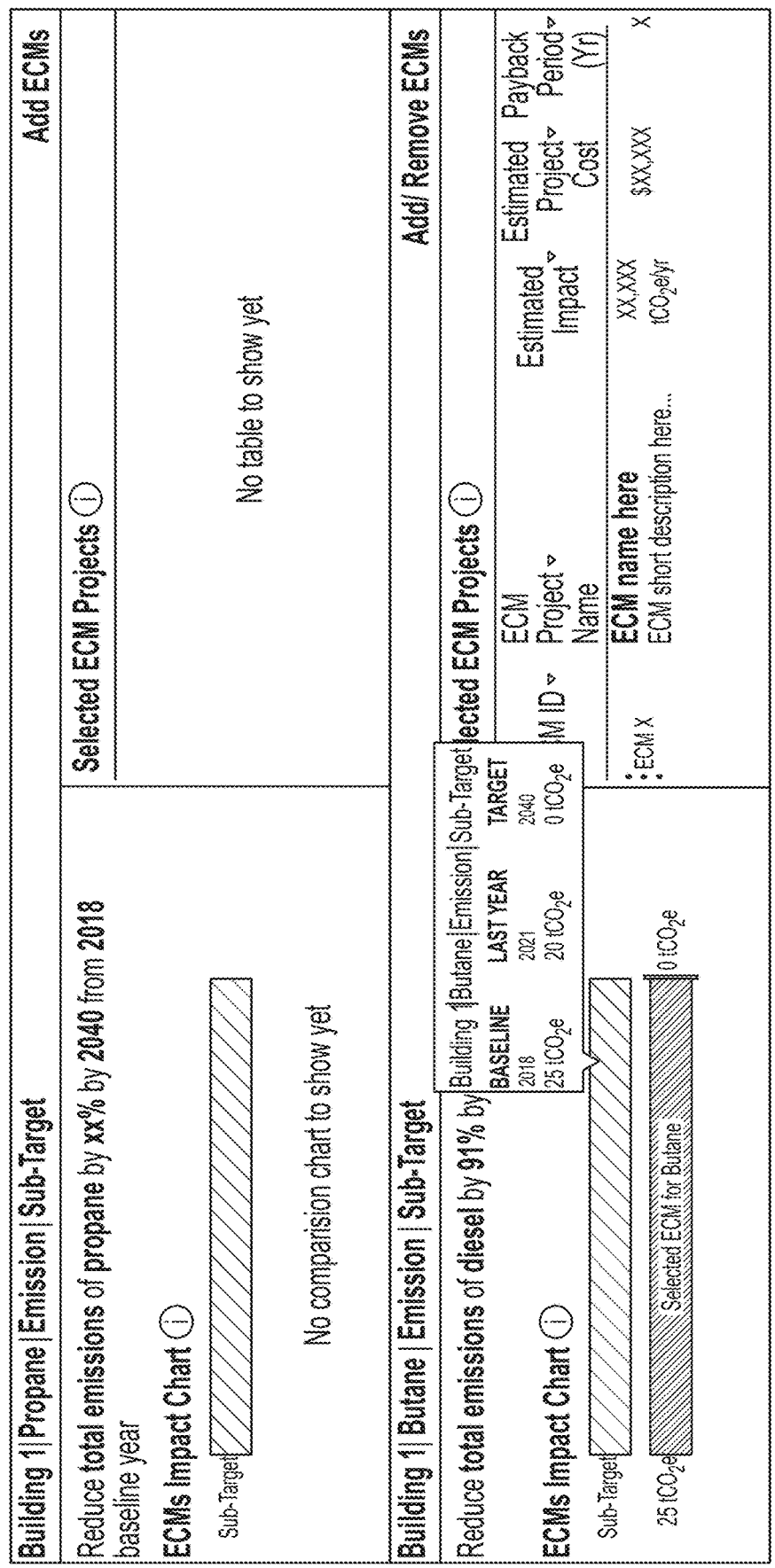
FIG. 42 is a user interface displaying an improvement measures plan dashboard, according to an exemplary embodiment.

Referring now to FIG. 42, a user interface is shown, in accordance with an exemplary embodiment. The user interface can include the improvement measures plan dashboard. The user interface can include at least one window that includes information that pertains to the propane emission source and the butane emission source that pertain to the emission sustainability category shown in FIG. 40. The butane window can include a ECMs impact chart that indicates that an ECM has been established, executed or otherwise implemented that can result in the target value associated with butane being reached. The butane window is also shown to include an add/remove ECMs icon given that an ECM has been established for butane. Additionally the propane window is shown to only have the add ECMs icon given that an ECM has not yet been established for propane. The user interface show in FIG. 42 can be an extension of, a scroll down, an overlay or otherwise included in or with the user interfaces shown in FIGS. 40 and/or 41. Additionally, the user interfaces shown in FIGS. 40, 41 and 42 can be included within a single user interface (e.g., the user interfaces are combined).

Figure 43:
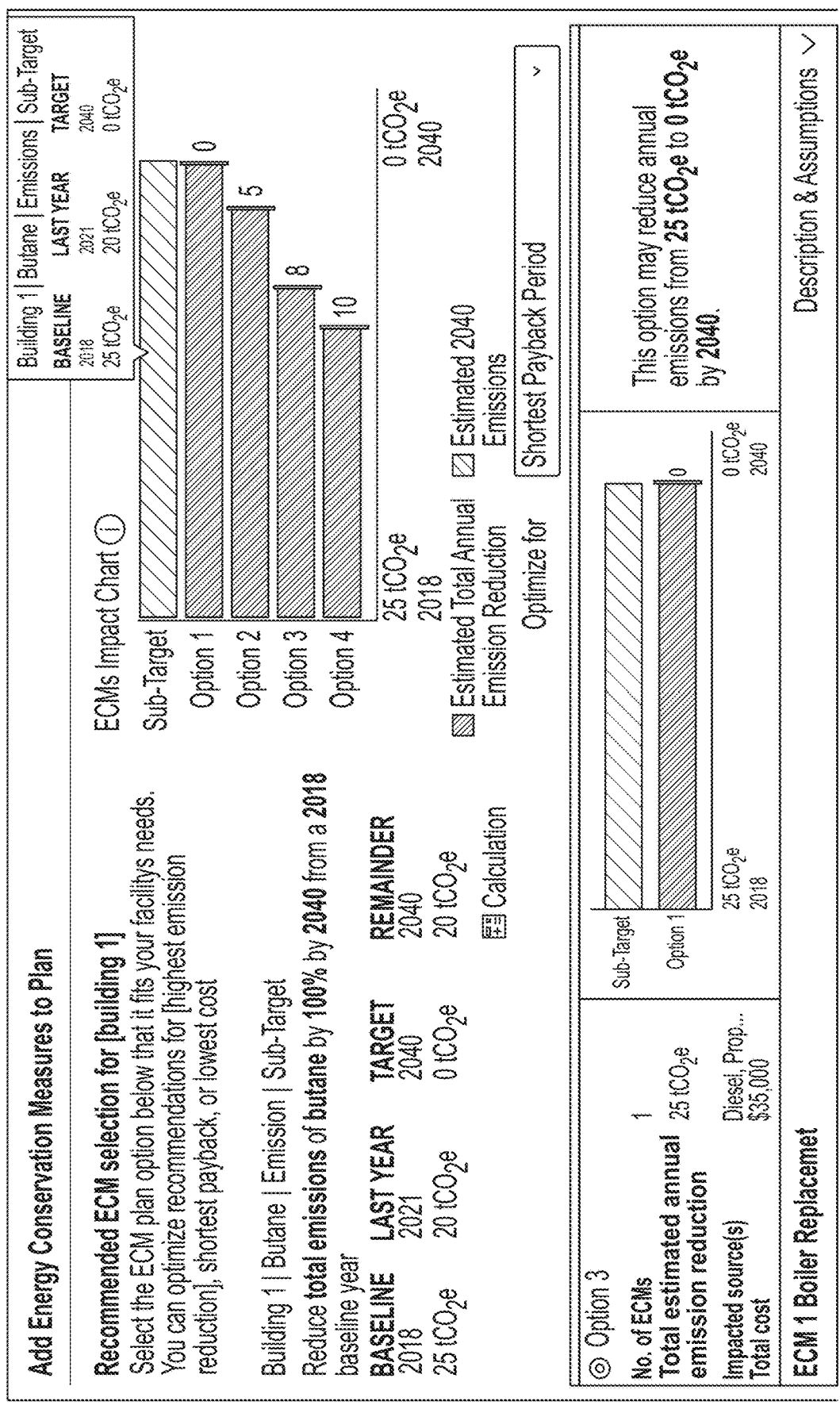
FIG. 43 is a user interface displaying an energy conservation measure window, according to an exemplary embodiment.

Referring now to FIG. 43, a user interface is shown, in accordance with an exemplary embodiment. The user interface can include an energy conservation measure window. The user interface shown in FIG. 43 can be generated in response to an operator selecting at least one of the add ECM icons shown in at least one of FIGS. 14-16, 25-28, 35-38 and/or 40-42. The user interface shown in FIG. 43 can be displayed, provided, shown or otherwise presented as an overlay on top of at least one of the user interfaces shown in FIGS. 14-16, 25-28, 35-38, and/or 40-42. The user interface shown in FIG. 43 can also be generated as a new user interface that replaces a user interface previously shown by a device.

The user interface shown in FIG. 43 can include a ECMs impact chart. The ECMs impact chart can include a graphical representation of at least one sub-target goal that pertains to the sustainability target and/or the energy conservation protocols that were generated and/or obtained by the ECM manager 1105. The ECMs impact chart can include a sub-target portion and at least one portion that pertains to at least one option (e.g., at least one FIM, action, etc.). The ECMs impact chart can show the impact that each option can have. FIG. 43 shows that the energy conservation measure window pertains to the butane emissions associated with building 1. FIG. 43 can also include at least one window that pertains to the options included in the ECMs impact chart.

FIG. 43 shows that option 3 pertains to replacing a boiler. The windows that pertain to the options can be filtered, sort or otherwise organized using an optimize for icon. The optimize for icon can include at least one option. For example the optimize for icon can include a highest emission reduction option, a shortest payback period option and/or a lowest cost option. FIG. 43 depicts an example of the option windows being sorted by the shortest payback period option. The user interface can also include a description and assumptions icon that can provide additional information that pertains to a particular option window.

Referring now to FIG. 44, a user interface is shown, in accordance with an exemplary embodiment. The user interface can include an option window that pertains to at least one option that was included in an ECMs impact chart. The user interface can also include a customize icon and an accept and finish icon. The operator of the device displaying the user interface shown in FIG. 43 can select the customize icon to customize at least one of the options shown in the user interface. The operator can select the accept and finish icon to establish at least one option that has been selected by the operator. The empty circle next to option 2 indicates that that operator has yet to select option 2. Option 2, once selected, can be established responsive to the operator selecting the accept and finish icon and/or option 2 can be customized responsive to the operator selecting the customize icon. The user interface shown in FIG. 44 can be an extension of, a scroll down, an overlay or otherwise included in or with the user interface shown in FIG. 43. Similarly, the information shown in FIG. 44 can be displayed or shown in the user interface shown in FIG. 43. Additionally, the user interfaces shown in FIGS. 43 and 44 can be included within a single user interface (e.g., the user interfaces are combined).

Referring now to FIG. 45, a user interface is shown, in accordance with an exemplary embodiment. The user interface can include an energy conservation measure window. The user interface shown in FIG. 45 can be generated in response to an operator selecting at least one of the add/remove ECM icons shown in at least one of FIGS. 25-28, 35-37, 40 and/or 42. The user interface shown in FIG. 45 can be displayed, provided, shown or otherwise presented as an overlay on top of at least one of the user interfaces shown in FIGS. 25-28, 35-37, 40 and/or 42. The user interface shown in FIG. 45 can also be generated as a new user interface that replaces a user interface previously shown by a device.

Referring now to FIG. 46, a user interface is shown, in accordance with an exemplary embodiment. The user interface can include an energy conservation measure window. The user interface shown in FIG. 46 can be generated in response to an operator selecting at least one of the add ECM icons shown in at least one of FIGS. 14-16, 25-28, 35-38 and/or 40-42. The user interface shown in FIG. 46 can be displayed, provided, shown or otherwise presented as an overlay on top of at least one of the user interfaces shown in FIGS. 14-16, 25-28, 35-38, and/or 40-42. The user interface shown in FIG. 46 can also be generated as a new user interface that replaces a user interface previously shown by a device.

The user interface shown in FIG. 46 can include a ECMs impact chart. The ECMs impact chart can include a graphical representation of at least one sub-target goal that pertains to the sustainability target and/or the energy conservation protocols that were generated and/or obtained by the ECM manager 1105. The ECMs impact chart can include a sub-target portion and at least one portion that pertains to at least one option (e.g., at least one FIM, action, etc.). The ECMs impact chart can show the impact that each option can have. FIG. 46 shows that the energy conservation measure window pertains to the butane emissions associated with building 1. FIG. 46 can also include at least one window that pertains to the options included in the ECMs impact chart.

FIG. 46 shows that option 1 pertains to replacing a boiler. The windows that pertain to the options can be filtered, sort or otherwise organized using an optimize for icon. The optimize for icon can include at least one option. For example the optimize for icon can include a highest emission reduction option, a shortest payback period option and/or a lowest cost option. FIG. 46 depicts an example of the option windows being sorted by the highest emission reduction option. The user interface can also include a description and assumptions icon can provide additional information that pertains to a particular option window.

Figure 47:
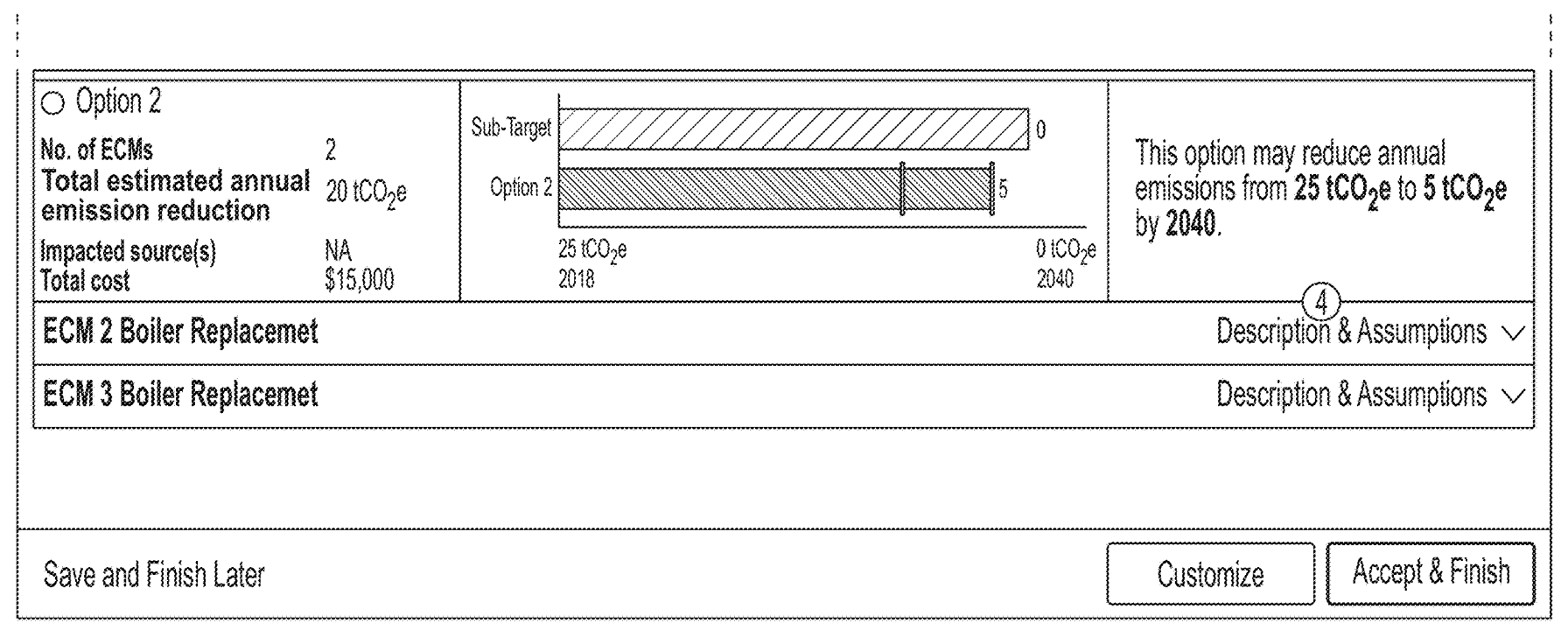

Referring now to FIG. 47, a user interface is shown, in accordance with an exemplary embodiment. The user interface can include an option window that pertains to at least one option that was included in an ECMs impact chart. The user interface can also include a customize icon and an accept and finish icon. The operator of the device displaying the user interface shown in FIG. 47 can select the customize icon to customize at least one of the options shown in the user interface. The operator can select the accept and finish icon to establish at least one option that has been selected by the operator. The empty circle next to option 2 indicates that that operator has yet to select option 2. Option 2, once selected, can be established responsive to the operator selecting the accept and finish icon and/or option 2 can be customized responsive to the operator selecting the customize icon. The user interface shown in FIG. 47 can be an extension of, a scroll down, an overlay or otherwise included in or with the user interface shown in FIG. 46. Similarly, the information shown in FIG. 47 can be displayed or shown in the user interface shown in FIG. 46. Additionally, the user interfaces shown in FIGS. 46 and 47 can be included within a single user interface (e.g., the user interfaces are combined).

Referring now to FIG. 48A, a user interface is shown, in accordance with an exemplary embodiment. The user interface can include a customization window that pertains to the improvement measures plan. The user interface shown in FIG. 48A can be generated in response to the operator selecting the customize icon shown in at least one of FIGS. 18, 20, 44 and/or 47. The user interface shown in FIG. 48A can be displayed, provided, shown or otherwise presented as an overlay on top of at least one of the user interfaces shown in FIGS. 18, 20, 44 and/or 47. The user interface shown in FIG. 48A can also be generated as a new user interface that replaces a user interface previously shown by a device.

FIG. 48A shows that an operator of the device displaying the user interface has selected the ECM that pertains to space heating replacements and burner replacements. The operator can select an accept and finish icon to establish the selected ECMs. The operator can select a back to recommendations icon to return the user interface shown in at least one of FIGS. 18, 20, 44 and/or 47.

Referring now to FIG. 48B, a user interface is shown, in accordance with an exemplary embodiment. The user interface shown in FIG. 48B can be and/or include information similar to that shown in FIG. 48A. Similarly, the user interface shown in FIG. 48B can be at least one of an extension to the user interface shown in FIG. 48A, a scroll down, an overlay or otherwise included in or with the user interface shown in FIG. 48A.

Referring now to FIG. 49, a user interface is shown, in accordance with an exemplary embodiment. The user interface can include an energy conservation measure window. The user interface shown in FIG. 49 can be generated in response to an operator selecting at least one of the add/remove ECM icons shown in at least one of FIGS. 25-28, 35-37, 40 and/or 42. The user interface shows that the operator of the device has selected the ECM that pertains to space heating replacements and burner replacements. The operator can select a yes icon to complete the removal of the selected ECMs from the energy conservation protocols. The operator can select a back icon to cancel the removal of the selected ECMS. The user interface shown in FIG. 49 can be displayed, provided, shown or otherwise presented as an overlay on top of at least one of the user interfaces shown in FIGS. 25-28, 35-37, 40 and/or 42. The user interface shown in FIG. 459 can also be generated as a new user interface that replaces a user interface previously shown by a device.

Figure 50:
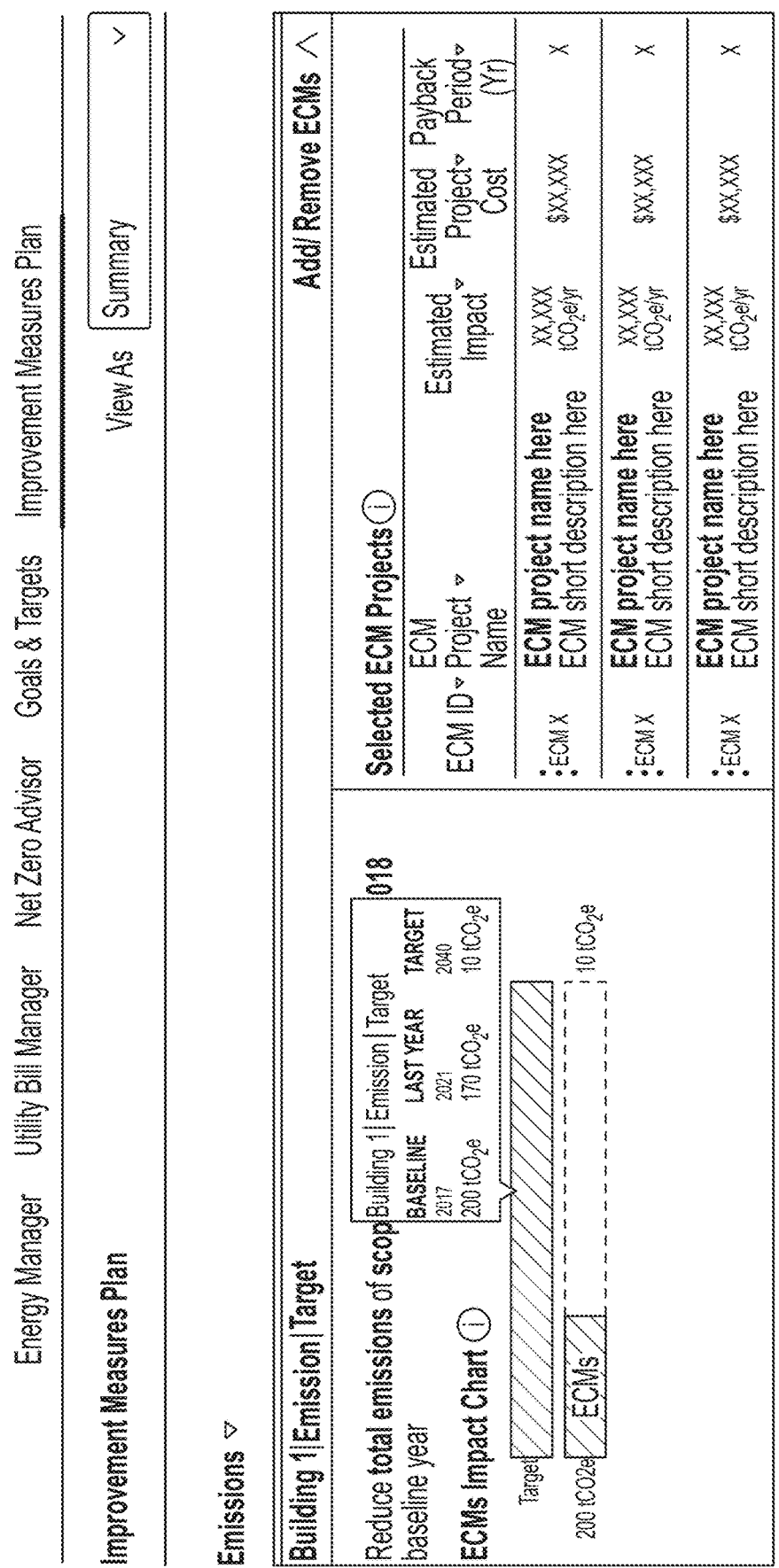
FIG. 50 is a user interface displaying an improvement measures plan dashboard, according to an exemplary embodiment.

Referring now to FIG. 50, a user interface is shown, in accordance with an exemplary embodiment. The user interface can include an improvement measures plan dashboard. The improvement measures plan dashboard can include information about the same building to that of FIG. 14, 35, or 40 and/or the improvement measures plan dashboard can include information about a different building to that of FIG. 14, 35 or 40. The user interface can be generated in response to the operator selecting the next icon shown in FIG. 13. The improvement measures plan dashboard can include a view as icon. The operator of the device displaying the user interface shown in FIG. 50 can hover over, select or otherwise interact with the view as icon to adjust the view, appearance or presentation of the improvement measures plan. FIG. 50 can include information that pertains to the emission sustainability category associated with the building. Additionally, FIG. 40 shows that at least one ECM has been generated, established, customized or otherwise associated with the emission category of the building.

Figure 51:
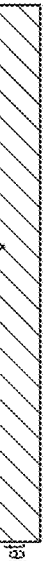
FIG. 51 is a user interface displaying an improvement measures plan dashboard, according to an exemplary embodiment.

Referring now to FIG. 51, a user interface is shown, in accordance with an exemplary embodiment. The user interface can include the improvement measures plan dashboard. The user interface can include at least one window that includes information that pertains to the natural gas emission source and the diesel emission source that pertain to the emission sustainability category shown in FIG. 50. The user interface show in FIG. 51 can be an extension of, a scroll down, an overlay or otherwise included in or with the user interface shown in FIG. 50. Additionally, the user interfaces shown in FIGS. 50 and 51 can be included within a single user interface (e.g., the user interfaces are combined).

Figure 52:
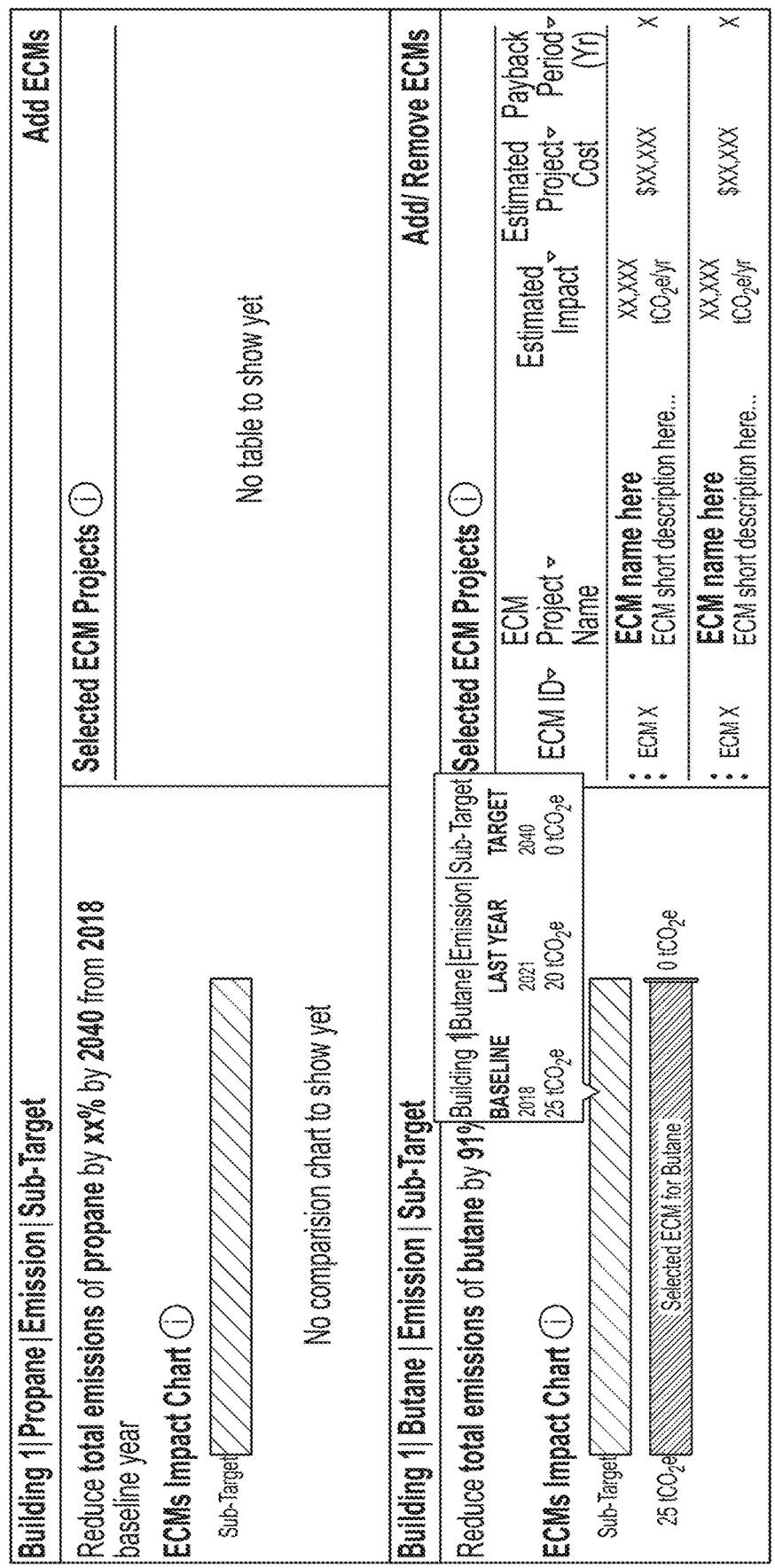
FIG. 52 is a user interface displaying an improvement measures plan dashboard, according to an exemplary embodiment.

Referring now to FIG. 52, a user interface is shown, in accordance with an exemplary embodiment. The user interface can include the improvement measures plan dashboard. The user interface can include at least one window that includes information that pertains to the propane emission source and the butane emission source that pertain to the emission sustainability category shown in FIG. 50. The butane window can include a ECMs impact chart that indicates that an ECM has been established, executed or otherwise implemented that can result in the target value associated with butane being reached. The butane window is also shown to include an add/remove ECMs icon given that an ECM has been established for butane. Additionally the propane window is shown to only have the add ECMs icon given that an ECM has not yet been established for propane. The user interface show in FIG. 52 can be an extension of, a scroll down, an overlay or otherwise included in or with the user interfaces shown in FIGS. 50 and/or 51. Additionally, the user interfaces shown in FIGS. 50, 51 and 52 can be included within a single user interface (e.g., the user interfaces are combined).

Figure 53A:
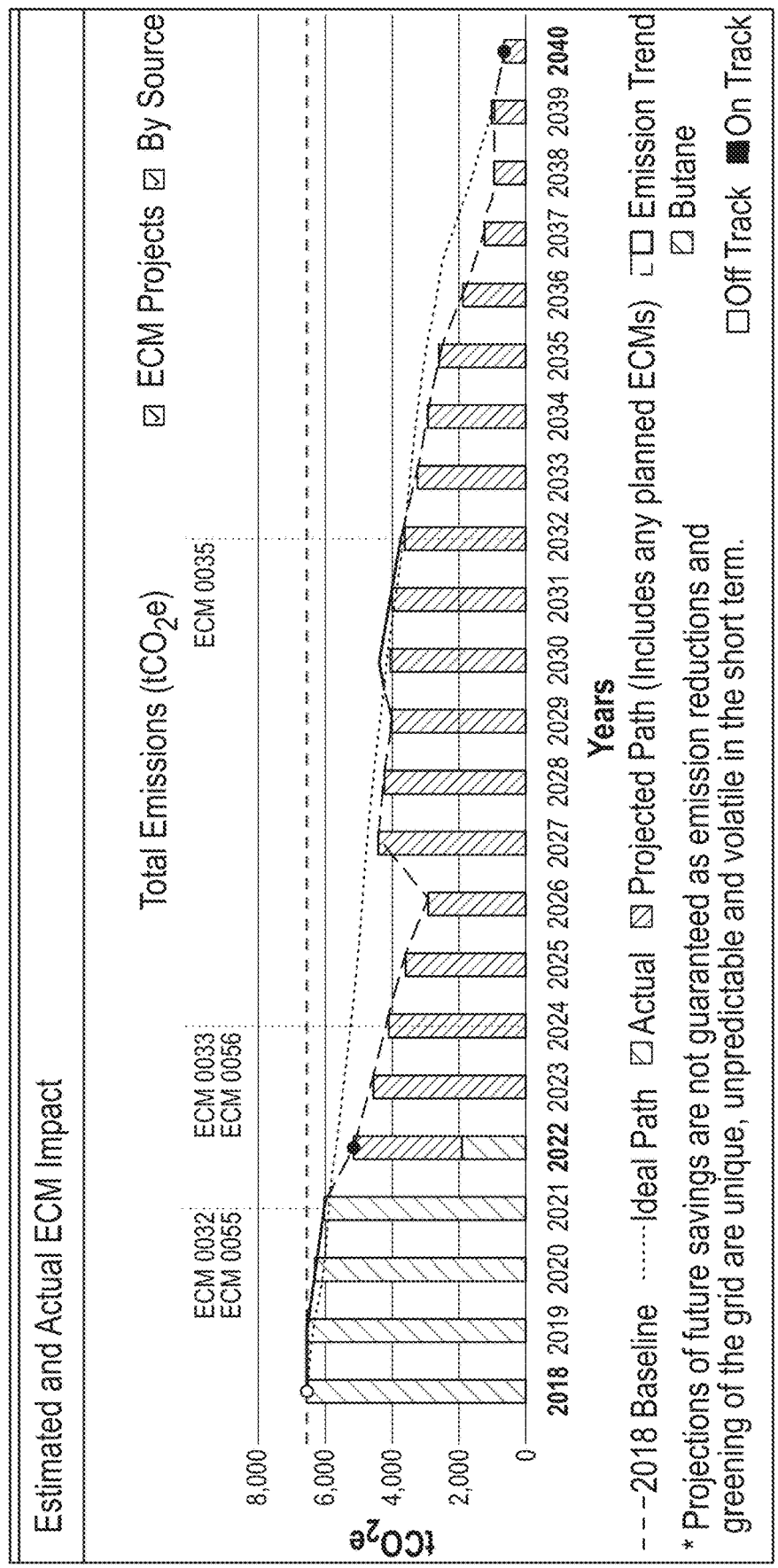
FIG. 53A is a user interface displaying a graphical representation of energy conservation measure tracking, according to an exemplary embodiment.

Referring now to FIG. 53A, a user interface is shown, in accordance with an exemplary embodiment. The user interface can include a graphical representation of ECM tracking. The graphical representation depicted by the user interface can be based on ECM projects. The graphical representation depicted by the user interface can also be based on the sources that contribute to parameters associated with the sustainability target. The user interface can include the baseline value that pertains to parameters associated with the sustainability target. For example, the user interface can include the baseline value of the total emission that pertain to a building (e.g., building 10). Similarly, the user interface can include the baseline value that pertains to at least one of the sustainability categories (e.g., emissions, energy, water, waste, etc.). The user interface can include the impact that at least one ECM can have on the value of the parameter. For example, FIG. 53A shows that ECM 0032 and ECM 0055 upon completion can reduce the carbon emissions from 6,200 to 6,000 tCO2e/yr. Similarly, FIG. 53A shows that ECM 0033 and ECM 0056 upon completion can reduce the carbons emissions from 6,000 to 4,000 tCO2e/yr. Additionally, FIG. 53A shows that ECM 0035 upon completion can reduce the carbon emissions from 4,000 to 3,800 tCO2e/yr. The operator of the device displaying the user interface shown in FIG. 53A can adjust, modify or otherwise change how the information is presented by hovering over, interacting with or selecting at least one of a show sources icon, a completed ECMs icon and/or a planned ECMs icon. The user interface show in FIG. 53A can be an extension of, a scroll down, an overlay or otherwise included in or with the user interface shown in FIG. 32.

Referring now to FIG. 53B, a user interface is shown, in accordance with an exemplary embodiment. The user interface includes a graphical representation of ECM tracking including impacts contributed to ECM projects as well as a by source view. The by source view depicts the impact that ECM projects have to each source that contribute to the sustainability parameters and/or the sustainability target. FIG. 53B depicts an example of the ECM projects impacting natural gas consumption, diesel consumption, propane consumption, and butane consumption. The user interface shown in FIG. 53B can be and/or include information similar to that shown in FIG. 53A. Similarly, the user interface shown in FIG. 53B can be at least one of an extension to the user interface shown in FIG. 53A, a scroll down, an overlay or otherwise included in or with the user interface shown in FIG. 53A. The user interface shown in FIG. 53B can be generated responsive to an operator of the device displaying the user interface shown in FIG. 53B and/or FIG. 53A selecting the by source icon.

Figure 54:
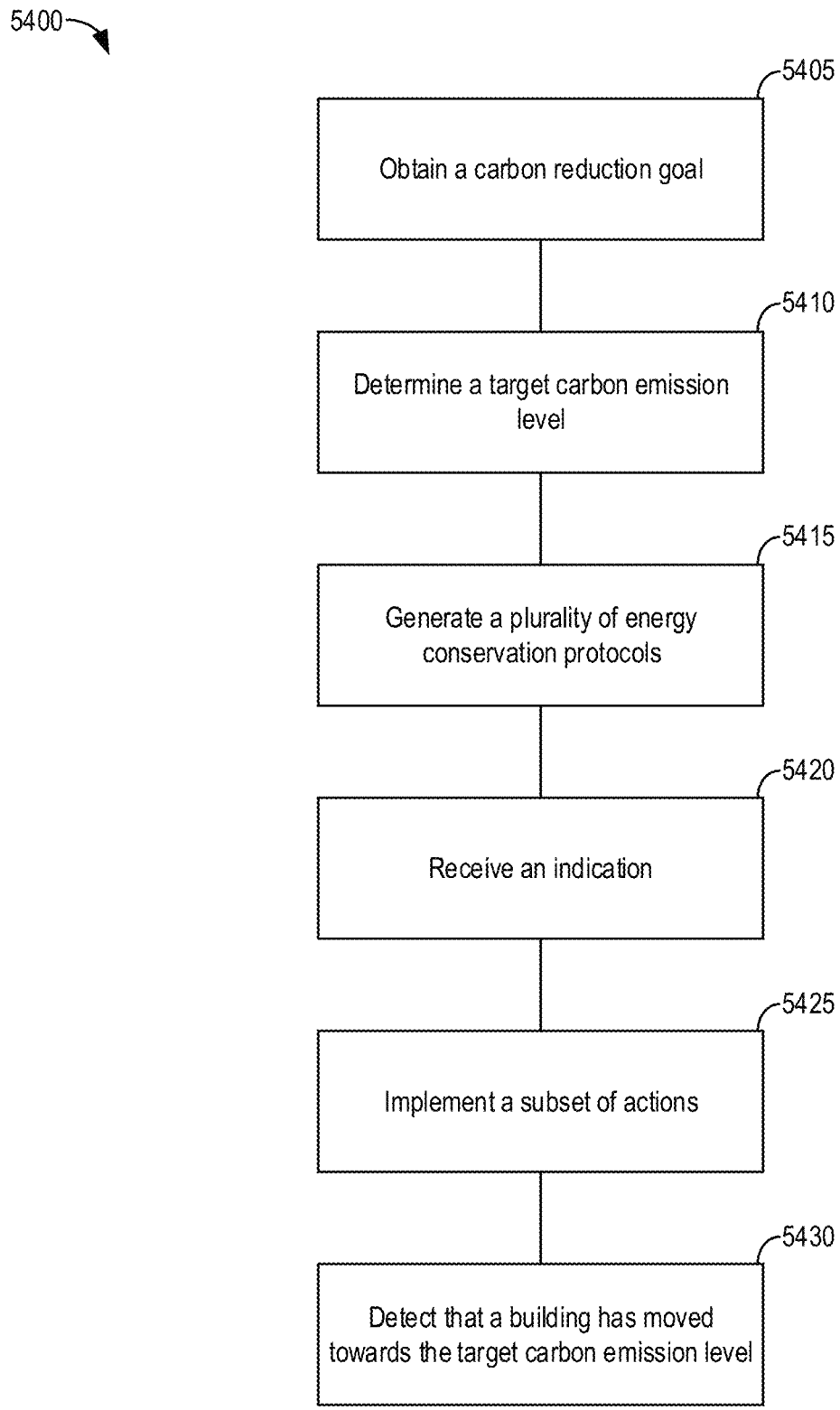
FIG. 54 is a block diagram of a process for reducing carbon emissions, according to an exemplary embodiment.

FIG. 54 depicts a flow diagram of a process 5400 for reducing carbon emissions for a building, according to an exemplary embodiment. The building can be and/or include the building 10. The building 10 can be or be included in at least one location of a business. For example, the building 10 can be located in a first campus of a business and the business can include a plurality of campuses. The building 10 can contribute to the sustainability of itself and/or the sustainability of the business. The building 10 can include a number of pieces of building equipment. The pieces of building equipment can contribute to a sustainability performance of the building 10 (e.g., the sustainability performances described herein). At least one step of the process 5400 can be performed by the ECM Manager 1105 and/or a component thereof. For example, the ECM generator 1130 can perform at least one step of the process 5400. The process 5400 can also be performed by any computing device and/or system described herein. The process 5400 can be performed before the construction of the building 10, during the construction of the building 10, after the completion of the construction of the building 10, and/or among other possible points in time.

In step 5405, a carbon reduction goal can be obtained. The carbon reduction goal can pertain to and/or be associated with the building 10. The carbon reduction goal can be included in a sustainability goal for the building 10. Similarly, the carbon reduction goal can be the sustainability goal for the building 10. The carbon reduction goal can be obtained from a data source and/or a user device. For example, the carbon reduction goal can be obtained from the user device 318. The communication component 1120 can obtain the carbon reduction goal from the user device 318.

In some embodiments, the carbon reduction goal can be established for the building 10. For example, the company and/or the entity responsible for the building 10 can establish the carbon reduction goal for the building 10. The carbon reduction goal can be established by performing steps similar to the steps described in U.S. Provisional Patent application No. 63/336,935 filed Apr. 29, 2022 to establish a business level goal (e.g., a sustainability goal) or target sustainability level, a location level goal or target, a building level goal or target and/or a building sub-target goal. The establishing of the carbon reduction goal can cause the user device to display a user interface. For example, the user interface shown in FIG. 13 can be displayed on the user device responsive to establishing the carbon reduction goal.

The communication component 1120 can, responsive to obtaining the carbon reduction goal, communicate with the sustainability component 1125. The communication component 1120 can provide the carbon reduction goal to the sustainability component 1125. The sustainability component 1125 can determine a baseline carbon emission level for the building 10. The sustainability component 1125 can determine the baseline carbon emission level for the building 10 by retrieving data stored in the database 1140. For example, the sustainability component 1125 can retrieve data pertaining to equipment emissions and then determine the baseline carbon emission level for the building 10. The baseline carbon emission level for the building 10 can be an average value over a period of time (e.g., the average yearly emission level over the past 5 years). The baseline carbon emission level for the building 10 can also be a recent value (e.g., the carbon emission level of the building 10 in the previous year). The baseline carbon emission level for the building 10 can also be based on a duration of time with respect to operation of the building 10. For example, the baseline carbon emission level for the building 10 can be a total carbon emission of the building 10 in the last three months.

In step 5410, a target carbon emission level can be determined. The target carbon emission level can pertain to the building 10. The target carbon emission level can be determined using the baseline carbon emission level and the carbon reduction goal. For example, the sustainability component 1125 can use the carbon reduction goal obtained in step 5405 and the baseline carbon emission level determined in step 5405 to determine the target carbon emission level.

The target carbon emission level can be a carbon emission value and the carbon emission value, if reached by the building 10, can result in the building 10 achieving the carbon reduction goal for the building 10. For example, the carbon reduction goal can be a goal to reduce carbon emissions for the building 10 by 90%. To continue this example, the baseline carbon emissions for the building 10 can be 10,000 tCO2e/yr. The sustainability component 1125 can, using the carbon reduction goal of 90% and the baseline carbon emissions level of 10,000 tCO2e/yr., determine a target carbon emission level of 1,000 tCO2e/yr.

In step 5415, a plurality of energy conservation protocols can be generated. The ECM generator 1130 can generate the energy conservation protocols. The energy conservation protocols can be and/or included in a plurality of ECMs. The energy conservation protocols can include a plurality of actions. The plurality of actions can be and/or include ECMs, FIMs, and/or among other possible actions that can be taken to improve the sustainability of the building 10. The plurality of actions can meet at least a portion of the carbon reduction goal and/or at least a portion of the target emission level. For example, a first energy conservation protocol can include actions, that when implemented, that result in the carbon emissions of the building 10 being reduced.

The ECM generator 1130 can generate the energy conservation protocols using the baseline carbon emission level determined in step 5405 and the target carbon emission level determined in step 5410. For example, the ECM generator 1130 can use a difference between the target emission level and the baseline carbon emission level to the determine ECMs that can be included in the energy conservation protocols. The ECM generator 1130 can also use data stored in the database 1140 to determine a plurality of impacts associated with the ECMs and/or the energy conservation protocols. The impacts can include expected runtime values, expected efficiency numbers, and/or among other possible information. The ECM generator 1130 can use the impacts to generate ECMs that can meet the target carbon emission level and the carbon reduction goal. The ECM generator 1130 can, in response to generating the energy conservation protocols, communicate with the communication component 1120. The ECM generator 1130 can provide, to the communication component 1120, the energy conservation protocols.

The communication component 1120 can, in response to receiving the energy conservation protocols, provide the energy conservation protocols. For example, the communication component 1120 can provide the energy conservation protocols generated in step 5415 to the data source 1110 or the user device 318. The providing of the energy conservation protocols, by the communication component 1120, can cause the user device 318 to display, via a user interface associated with the user device 318, at least a portion of the energy conservation protocols. For example, the user interface displayed by the user device 318 can display, show, present or otherwise include the energy conservation protocols and the actions included in the energy conservation protocols. The user interface can include at least one selectable element and the operator of the device displaying the user interface can interact with the selectable elements to accept the ECMS, the energy conservation protocols and/or the actions included in the ECMs and/or the energy conservation protocols. For example, the user interface can include information similar to that shown in FIG. 23 and the operator can select the accept and finish icon to accept the selected ECMs.

In step 5420, an indication can be received. The communication component 1120 can receive the indication. The indication can be received from the user device 318. The indication can be an indication to accept a subset of the plurality of actions include in the energy conservation protocols. For example, a first energy conservation protocol can include a plurality of actions and an operator of the device displaying the first energy conservation protocol can select an icon to accept a subset of the plurality of actions. The operator selecting the icon can result in the communication component 1120 receiving the indication to accept. The communication component 1120 can provide the indication to accept the subset of the plurality of actions to the ECM generator 1130.

In step 5425, a subset of actions can be implemented. The subset of actions can be the subset of actions that were accepted by the operator in step 5420. The ECM generator 1130 can implement, responsive to the communication component 1120 providing the indication to the ECM generator 1130, the subset of actions. The ECM generator 1130 implementing the subset of actions included in the first energy conservation protocol can include at least one of establishing, modifying, updating, changing or otherwise proceeding with the subset of actions included in the first energy conservation protocol. The implementing of the subset of actions can include the controller 1135 controlling and/or operating at least one piece of building equipment based on the subset of actions. For example, the subset of actions can include control strategies and the controller 1135 can use the control strategies to control pieces of building equipment.

In step 5430, a change in the carbon emission level of the building can be detected. For example, the monitor component 1205 can detect that the building 10 has moved towards the target carbon emission level that was obtained in step 5405. For example, the monitor component 1205 can determine a current carbon emission level of the building 10 and the monitor component 1205 can determine that the current carbon emission level is smaller than the baseline carbon emission level. The monitor component 1205 can detect that the building 10 has moved towards the target carbon emission level responsive to the subset of actions having been implemented in step 5425.

While the user interfaces described herein are described as having given number values and the user interfaces illustrated in the figures are shown to include given numerical values, the information shown in the user interfaces can include numerical values that are similar to the values described herein and/or the user interfaces can include numerical values that are different than the values described herein.

The user interfaces described herein can be generated in response to the ECM manager 1105 and/or components thereof providing signals, to at least one device (e.g., the user device 318), that cause the device to display, via an interface, the user interfaces. Additionally, any information or data that is received, monitored, generated or that otherwise pertains to the systems described herein can also be included in the user interfaces described herein.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS), the BMS including one or more memory devices storing instructions thereon that, when executed by one or more processors, cause the one or more processors to:
   obtain a sustainability goal established for a building, the building including a plurality of pieces of building equipment, and wherein the sustainability goal pertains to a sustainability performance of the building;
   determine, using a baseline value for the sustainability performance of the building and the sustainability goal, a target sustainability level for the building;
   generate, using the baseline value for the sustainability performance of the building and the target sustainability level, a plurality of energy conservation protocols, wherein a first energy conservation protocol of the plurality of energy conservation protocols includes a plurality of actions that meet at least a portion of the sustainability goal or at least a portion of the target sustainability level for the building, wherein generating the plurality of energy conservation protocols comprises:
      detecting a difference between one or more predetermined operational metrics pertaining to at least one piece of building equipment of the plurality of pieces of building equipment and operational data pertaining to the at least one piece of building equipment; and
      generating a set of actions that adjust operation of the at least one piece of building equipment to decrease the difference between the one or more predetermined operational metrics and the operational data;
   receive an indication to accept a subset of the plurality of actions included in the first energy conservation protocol; and
   implement, responsive to receiving the indication to accept the subset of the plurality of actions, the subset of the plurality of actions included in the first energy conservation protocol.

2. The BMS of claim 1, wherein implementing the subset of the plurality of actions included in the first energy conservation protocol includes:
   controlling, using one or more control actions that pertain to the subset of the plurality of actions included in the first energy conservation protocol, the at least one piece of building equipment of the plurality of pieces of building equipment; and
   detecting, responsive to controlling the at least one piece of building equipment of the plurality of pieces of building equipment, that the building has moved towards the target sustainability level.

3. The BMS of claim 1, wherein the instructions cause the one or more processors to:
   detect that a first piece of building equipment of the plurality of pieces of building equipment has been replaced by a second piece of building equipment, wherein the second piece of building equipment performs a role similar to that of the first piece of building equipment;
   determine, responsive to the second piece of building equipment replacing the first piece of building equipment, an impact of the second piece of building equipment to at least one of the sustainability goal or the target sustainability level; and
   provide, to a user device, the impact of the second piece of building equipment to at least one of the sustainability goal or the target sustainability level.

4. The BMS of claim 1, wherein the instructions cause the one or more processors to:
   detect, using operational data of the building, an equipment fault condition for the at least one piece of building equipment of the plurality of pieces of equipment;
   determine that the equipment fault condition impacts the sustainability goal;
   update at least one energy conservation protocol of the plurality of energy conservation protocols to include a first action that addresses at least a portion of the equipment fault condition; and
   execute the at least one energy conservation protocol of the plurality of energy conservation protocols, wherein the at least one energy conservation protocol of the plurality of energy conservation protocols addresses the equipment fault condition.

5. The BMS of claim 1, wherein the instructions cause the one or more processors to:
   cause a device to display an element, wherein the element includes at least one of the sustainability goal, a current value for the sustainability performance of the building, or at least one energy conservation protocol of the plurality of energy conservation protocols;
   receive an indication to update at least a portion of the element, wherein the indication includes a user defined energy conservation protocol; and
   update the element to include the user defined energy conservation protocol.

6. The BMS of claim 1, wherein the instructions cause the one or more processors to:
   execute at least one energy conservation protocol of the plurality of energy conservation protocols;
   determine, using operational data for the building, a current value for the sustainability performance of the building, wherein the current value for the sustainability performance of the building is determined in response to a predetermined amount of time;
   determine a second difference between the current value for the sustainability performance of the building and the baseline value for the sustainability performance of the building; and
   determine, responsive to the second difference being larger than a predetermined threshold, that the at least one energy conservation protocol of the plurality of energy conservation protocols has moved the sustainability performance of the building towards the target sustainability level.

7. The BMS of claim 1, wherein the instructions cause the one or more processors to:
monitor, using operational data for the building, a status of a particular action included in at least one energy conservation protocol of the plurality of energy conservation protocols;
determine, responsive to monitoring the status of the particular action, that the status of the particular action has remained the same;
cause a device to display an element, wherein the element includes a notice to execute the particular action; and
determine, using second operational data for the building, that the particular action has been executed.

8. The BMS of claim 1, wherein determining the target sustainability level for the building includes:
determining a second difference between the baseline value for the sustainability performance of the building and the sustainability goal;
generating, using the second difference between the baseline value for the sustainability performance of the building and the sustainability goal, a sustainability value that meets the sustainability goal; and
determining an amount of time to reach the sustainability value, wherein the amount of time is established by the sustainability goal.

9. The BMS of claim 1, wherein generating the plurality of energy conservation protocols further includes:
determining, using the operational data pertaining to the at least one piece of building equipment of the plurality of pieces of building equipment, a role in the baseline value for the sustainability performance of the building for the at least one piece of building equipment of the plurality of pieces of building equipment;
wherein generating the set of actions comprises generating, responsive to detecting the difference between the one or more predetermined operational metrics and the operational data, a set of actions that adjust the role in the baseline value for the sustainability performance of the building for the at least one piece of building equipment by decreasing the difference between the one or more predetermined operational metrics and the operational data.

10. A method for reducing carbon emissions for a building, the method comprising:
obtaining, by one or more processors, a sustainability goal comprising a carbon reduction goal established for the building, the building including a plurality of pieces of building equipment;
determining, by the one or more processors using a baseline carbon emission level for the building and the carbon reduction goal, a target sustainability level comprising a target carbon emission level for the building;
generating, by the one or more processors using the baseline carbon emission level and the target carbon emission level, a plurality of energy conservation protocols, wherein a first energy conservation protocol of the plurality of energy conservation protocols includes a plurality of actions that meet at least a portion of the carbon reduction goal or at least a portion of the target carbon emission level for the building, wherein generating the plurality of energy conservation protocols comprises:
detecting a difference between one or more predetermined operational metrics pertaining to at least one piece of building equipment of the plurality of pieces of building equipment and operational data pertaining to the at least one piece of building equipment; and
generating a set of actions that adjust operation of the at least one piece of building equipment to decrease the difference between the one or more predetermined operational metrics and the operational data;
receiving, by the one or more processors, an indication to accept a subset of the plurality of actions included in the first energy conservation protocol;
implementing, by the one or more processors responsive to receiving the indication to accept the subset of the plurality of actions, the subset of the plurality of actions included in the first energy conservation protocol; and
detecting, by the one or more processors responsive to implementing the subset of the plurality of actions included in the first energy conservation protocol, that the building has moved towards the target carbon emission level.

11. The method of claim 10, further comprising:
detecting, by the one or more processors, that a first piece of building equipment of the plurality of pieces of building equipment has been replaced by a second piece of building equipment, wherein the second piece of building equipment performs a role similar to that of the first piece of building equipment;
determining, by the one or more processors responsive to the second piece of building equipment replacing the first piece of building equipment, an impact of the second piece of building equipment to at least one of the carbon reduction goal or the target carbon emission level; and
providing, by the one or more processors to a user device, the impact of the second piece of building equipment to at least one of the carbon reduction goal or the target carbon emission level.

12. The method of claim 10, further comprising:
detecting, by the one or more processors using operational data of the building, an equipment fault condition for the at least one piece of building equipment of the plurality of pieces of equipment;
determining, by the one or more processors, that the equipment fault condition impacts the carbon reduction goal;
updating, by the one or more processors, at least one energy conservation protocol of the plurality of energy conservation protocols to include a first action that addresses at least a portion of the equipment fault condition; and
executing, by the one or more processors, the at least one energy conservation protocol of the plurality of energy conservation protocols, wherein the at least one energy conservation protocol of the plurality of energy conservation protocols addresses the equipment fault condition.

13. The method of claim 10, further comprising:
causing, by the one or more processors, a device to display an element, wherein the element includes at least one of the carbon reduction goal, a current carbon emission level or at least one energy conservation protocol of the plurality of energy conservation protocols;

receiving, by the one or more processors, an indication to update at least a portion of the element, wherein the indication includes a user defined energy conservation protocol; and updating, by the one or more processors, the element to include the user defined energy conservation protocol.

14. The method of claim 10, further comprising:

executing, by the one or more processors, at least one energy conservation protocol of the plurality of energy conservation protocols;

determining, by the one or more processors using operational data for the building, a current carbon emission level, wherein the current carbon emission level is determined in response to a predetermined amount of time;

determining, by the one or more processors, a second difference between the current carbon emission level and the baseline carbon emission level; and determining, by the one or more processors responsive to the second difference being larger than a predetermined threshold, that the at least one energy conservation protocol of the plurality of energy conservation protocols has moved the sustainability of the building towards the target carbon emission level.

15. The method of claim 10, further comprising:

monitoring, by the one or more processors using operational data for the building, a status of a particular action included in at least one energy conservation protocol of the plurality of energy conservation protocols;

determining, by the one or more processors responsive to monitoring the status of the particular action, that the status of the particular action has remained the same;

causing, by the one or more processors, a device to display an element, wherein the element includes a notice to execute the particular action; and determining, by the one or more processors using second operational data for the building, that the particular action has been executed.

16. The method of claim 10, wherein determining the target carbon emission level for the building includes:

determining, by the one or more processors, a second difference between the baseline carbon emission level and the carbon reduction goal;

generating, by the one or more processors using the second difference between the baseline carbon emission level and the carbon reduction goal, a sustainability value that meets the carbon reduction goal; and determining, by the one or more processors an amount of time to reach the sustainability value, wherein the amount of time is established by the carbon reduction goal.

17. The method of claim 10, wherein generating the plurality of energy conservation protocols further includes:

determining, by the one or more processors using the operational data pertaining to the at least one piece of building equipment of the plurality of pieces of building equipment, a role in the baseline carbon emission level for the at least one piece of building equipment of the plurality of pieces of building equipment;

wherein generating the set of actions comprises generating, by the one or more processors responsive to detecting the difference between the one or more predetermined operational metrics and the operational data, a set of actions that adjust the role in the baseline carbon emission level for the at least one piece of building equipment by decreasing the difference between the one or more predetermined operational metrics and the operational data.

18. One or more non-transitory storage media having instructions stored thereon that, when executed by one or more processors, cause the one or more processors to implement operations comprising:

obtaining a sustainability goal established for a building, the building including a plurality of pieces of building equipment, and wherein the sustainability goal pertains to a sustainability performance of the building;

determining, using a baseline value for the sustainability performance of the building and the sustainability goal, a target sustainability level for the building;

generating, using the baseline value for the sustainability performance of the building and the target sustainability level, a plurality of energy conservation protocols, wherein a first energy conservation protocol of the plurality of energy conservation protocols includes a plurality of actions that meet at least a portion of the sustainability goal or at least a portion of the target sustainability level for the building, wherein generating the plurality of energy conservation protocols comprises:

detecting a difference between one or more predetermined operational metrics pertaining to at least one piece of building equipment of the plurality of pieces of building equipment and operational data pertaining to the at least one piece of building equipment; and generating a set of actions that adjust operation of the at least one piece of building equipment to decrease the difference between the one or more predetermined operational metrics and the operational data;

receiving an indication to accept a subset of the plurality of actions included in the first energy conservation protocol;

controlling, using one or more control actions that pertain to the subset of the plurality of actions included in the first energy conservation protocol, the at least one piece of building equipment of the plurality of pieces of building equipment; and detecting, responsive to controlling the at least one piece of building equipment of the plurality of pieces of building equipment, that the building has moved towards the target sustainability level.

19. The one or more non-transitory storage media of claim 18, the operations further comprising:

detecting that a first piece of building equipment of the plurality of pieces of building equipment has been replaced by a second piece of building equipment, wherein the second piece of building equipment performs a role similar to that of the first piece of building equipment;

determining, responsive to the second piece of building equipment replacing the first piece of building equipment, an impact of the second piece of building equipment to at least one of the sustainability goal or the target sustainability level; and providing, to a user device, the impact of the second piece of building equipment to at least one of the sustainability goal or the target sustainability level.

20. The one or more non-transitory storage media of claim 18, the operations further comprising:

detecting, using operational data of the building, an equipment fault condition for the at least one piece of building equipment of the plurality of pieces of equipment;

determining that the equipment fault condition impacts the sustainability goal;
updating at least one energy conservation protocol of the plurality of energy conservation protocols to include a first action that addresses at least a portion of the equipment fault condition; and
executing the at least one energy conservation protocol of the plurality of energy conservation protocols, wherein the at least one energy conservation protocol of the plurality of energy conservation protocols addresses the equipment fault condition.

\* \* \* \* \*